(12) United States Patent
Munne et al.

(10) Patent No.: US 11,071,295 B2
(45) Date of Patent: Jul. 27, 2021

(54) CRYOSTORAGE DEVICE FOR OOCYTES AND EMBRYOS DURING CRYOPRESERVATION

(71) Applicant: Overture Life, Inc., New York, NY (US)

(72) Inventors: Santiago Munne, Madrid (ES); Tamara Martin Villalba, Madrid (ES); Jonathan Patrick Casey, Cambridge (GB); Peter Lee Crossley, Cambridge (GB); Hannah Victoria Hare, Cambridge (GB); Rebecca Helen Wray, Cambridge (GB); Michael Ian Walker, Cambridge (GB); Edwin James Stone, Cambridge (GB); Michelle Louise Seth-Smith, Madrid (ES)

(73) Assignee: Overture Life, Inc., New York, NY (US)

(*) Notice: Subject to any disclaimer, the term of this patent is extended or adjusted under 35 U.S.C. 154(b) by 0 days.

(21) Appl. No.: 16/725,004

(22) Filed: Dec. 23, 2019

(65) Prior Publication Data
US 2020/0221690 A1    Jul. 16, 2020

Related U.S. Application Data

(60) Provisional application No. 62/785,819, filed on Dec. 28, 2018.

(51) Int. Cl.
*A01N 1/02* (2006.01)
*G01N 1/42* (2006.01)
*B01L 3/02* (2006.01)

(52) U.S. Cl.
CPC ............ *A01N 1/0252* (2013.01); *A01N 1/02* (2013.01); *A01N 1/0221* (2013.01);
(Continued)

(58) Field of Classification Search
CPC ..... A01N 1/0263; A01N 1/0268; B01L 3/021; B01L 3/0217
See application file for complete search history.

(56) References Cited

U.S. PATENT DOCUMENTS 5,217,693 A * 6/1993 Anderson ................ A01N 1/02
422/513
5,545,562 A     8/1996 Cassou et al.
(Continued)

FOREIGN PATENT DOCUMENTS

CN    203040526 U    7/2013
EP    2765181 B1     7/2016
(Continued)

OTHER PUBLICATIONS

510(k) Premarket Notification Summary for Kitazato's Cryotop CL, K112695, Kitazato Bio Pharma Co., Ltd., Shizuoka, Japan, Dec. 12, 2012, pp. 1-4.
(Continued)

*Primary Examiner* — Jonathan M Hurst
(74) *Attorney, Agent, or Firm* — Wilson Sonsini Goodrich & Rosati

(57) ABSTRACT

Described herein are devices, systems, and methods to facilitate cryopreservation of a cell or a mass of a plurality of cells such as oocytes or embryos. A device of the disclosure can, for example, store oocytes or embryos during the vitrification and/or warming processes of in vitro fertilization.

20 Claims, 17 Drawing Sheets

(52) U.S. Cl.
CPC ......... *A01N 1/0242* (2013.01); *A01N 1/0263* (2013.01); *A01N 1/0268* (2013.01); *G01N 1/42* (2013.01); *B01L 3/021* (2013.01); *B01L 3/0217* (2013.01)

(56) References Cited

U.S. PATENT DOCUMENTS

| | | | |
|---|---|---|---|
| 5,770,158 A * | 6/1998 | Eischen | B01L 3/022 422/520 |
| 6,838,278 B2 | 1/2005 | Fortino | |
| 7,316,896 B2 * | 1/2008 | Kuwayama | A01N 1/02 422/550 |
| 7,709,268 B1 | 5/2010 | Edwards et al. | |
| 7,984,616 B2 | 7/2011 | Fuhr et al. | |
| 2004/0259072 A1 | 12/2004 | Kuwayama et al. | |
| 2005/0287512 A1 * | 12/2005 | Cullis | A01N 1/0268 435/1.3 |
| 2008/0233633 A1 | 9/2008 | Clairaz et al. | |
| 2010/0311036 A1 | 12/2010 | He | |
| 2013/0137080 A1 | 5/2013 | Henderson et al. | |
| 2013/0260452 A1 | 10/2013 | Toner et al. | |
| 2014/0308655 A1 * | 10/2014 | Mogas | A61D 19/04 435/2 |
| 2015/0237848 A1 | 8/2015 | Schmitt et al. | |
| 2020/0146280 A1 * | 5/2020 | Silverman | A01N 1/0221 |

FOREIGN PATENT DOCUMENTS

| | | |
|---|---|---|
| GB | 2452562 A | 3/2009 |
| WO | WO-2004042341 A2 | 5/2004 |
| WO | WO-2011070973 A1 | 6/2011 |
| WO | WO-2013098825 A1 | 7/2013 |
| WO | WO-2014106286 A1 | 7/2014 |

OTHER PUBLICATIONS

International Search Report and Written Opinion dated May 5, 2020 for International Application Serial No. PCT/US2019/068299, (19 pages).

* cited by examiner

CRYOSTORAGE DEVICE FOR OOCYTES AND EMBRYOS DURING CRYOPRESERVATION

CROSS-REFERENCE

This application claims the benefit of U.S. Provisional Application No. 62/785,819 filed on Dec. 28, 2018, which is incorporated herein by reference in its entirety.

BACKGROUND

Assisted reproduction is a large and growing market. A growing number of women are choosing to cryopreserve their oocytes while young for later use in assisted reproduction technologies such as in vitro fertilization (IVF). During the IVF process, many patients produce a surplus of viable embryos, which can be preserved to initiate future pregnancies.

SUMMARY

In some embodiments, the disclosure provides a cryostorage device comprising:
(a) a capillary element comprising a first elongated body, wherein the first elongated body comprises:
  (i) a bottom opening located at a bottom end of the first elongated body;
  (ii) a top opening located at a top end of the first elongated body; and
  (iii) a hollow portion inside the first elongated body connecting the top opening to the bottom opening, wherein the hollow portion has a diameter that is regular over a length of a region of the hollow portion;
(b) a slidable plunger comprising a top end, a bottom end, and a second elongated body connecting the top end of the slidable plunger to the bottom end of the slidable plunger,
wherein:
  at least a portion of the slidable plunger is within the hollow portion of the capillary element;
  the slidable plunger is configured to actuate through the top opening;
  a diameter of the slidable plunger is regular over a length of a portion of the slidable plunger; and
  the diameter of the slidable plunger is no greater than the diameter of the hollow portion; and
(c) a content comprising:
  (i) a cell; and
  (ii) a volume of media;
wherein:
  the content is within a section of the hollow portion located between the bottom opening and the bottom end of the slidable plunger; and
  the volume of media, which when contained in the section of the hollow portion, cools at an average rate of at least about 200° C./minute upon submersion of the section of the hollow portion into a coolant.

In some embodiments, the disclosure provides a method comprising:
(a) inserting a portion of a cryo-storage device into a vessel containing a content,
wherein:
  the content comprises:
    a volume of media; and
    a cell; and
  the cryo-storage device comprises:
    (I) a capillary element comprising a first elongated body, wherein the first elongated body comprises:
      (i) a bottom opening located at a bottom end of the first elongated body;
      (ii) a top opening located at a top end of the first elongated body; and
      (iii) a hollow portion inside the first elongated body connecting the top opening to the bottom opening, wherein the hollow portion has a diameter that is regular over a length of a region of the hollow portion;
    (II) a slidable plunger comprising a top end, a bottom end, and a second elongated body connecting the top end of the slidable plunger to the bottom end of the slidable plunger, wherein:
      at least a portion of the slidable plunger is within the hollow portion of the capillary element;
      the slidable plunger is configured to actuate through the top opening;
      a diameter of the slidable plunger is regular over a length of a portion of the slidable plunger; and
      the diameter of the slidable plunger is no greater than the diameter of the hollow portion; and
(b) after step (a), loading the capillary element with the content, thereby generating a loaded section of the capillary element.

In some embodiments, the disclosure provides a cryostorage device comprising:
(a) a capillary element comprising a first elongated body, wherein the first elongated body comprises:
  (i) a bottom opening located at a bottom end of the first elongated body;
  (ii) a top opening located at a top end of the first elongated body; and
  (iii) a hollow portion inside the first elongated body connecting the top opening to the bottom opening, wherein the hollow portion has a diameter that is regular over a length of a region of the hollow portion;
(b) a slidable plunger comprising a top end, a bottom end, and a second elongated body connecting the top end of the slidable plunger to the bottom end of the slidable plunger,
wherein:
  at least a portion of the slidable plunger is within the hollow portion of the capillary element;
  the slidable plunger is configured to actuate through the top opening;
  a diameter of the slidable plunger is regular over a length of a portion of the slidable plunger; and
  the diameter of the slidable plunger is no greater than the diameter of the hollow portion; and
(c) a content comprising:
  (i) a cell; and
  (ii) a volume of media;
wherein:
  the content is within a section of the hollow portion located between the bottom opening and the bottom end of the slidable plunger; and
  when the section of the hollow portion containing the content is contacted with a coolant:
    the content vitrifies; and
    a membrane of the cell does not rupture.

In some embodiments, the disclosure provides a method comprising:

(a) cooling a loaded section of a cryo-storage device, wherein:
the loaded section contains a content comprising:
a volume of media; and
a cell; and
the cryo-storage device comprises:
(I) a capillary element comprising a first elongated body, wherein the first elongated body comprises:
(i) a bottom opening located at a bottom end of the first elongated body;
(ii) a top opening located at a top end of the first elongated body; and
(iii) a hollow portion inside the first elongated body connecting the top opening to the bottom opening, wherein the hollow portion has a diameter that is regular over a length of a region of the hollow portion;
(II) a slidable plunger comprising a top end, a bottom end, and a second elongated body connecting the top end of the slidable plunger to the bottom end of the slidable plunger, wherein:
at least a portion of the slidable plunger is within the hollow portion of the capillary element;
the slidable plunger is configured to actuate through the top opening;
a diameter of the slidable plunger is regular over a length of a portion of the slidable plunger; and
the diameter of the slidable plunger is no greater than the diameter of the hollow portion.

In some embodiments, the disclosure provides a method comprising:
(a) loading a portion of a cryo-storage device with a content; and
(b) after (a), cooling the content by submerging the portion of the cryo-storage device into liquid nitrogen;
wherein when, in a controlled study:
vitrification media is loaded into the cryo-storage device to generate a loaded section of the cryo-storage device;
the loaded section of the cryo-storage device is submerged in liquid nitrogen such that the liquid nitrogen does not contact the vitrification media;
the loaded section of the cryo-storage device moves in a repetitive motion while submerged in liquid nitrogen; and
the vitrification media cools with an average rate of at least about 900° C./minute as measured by a thermocouple in contact with the vitrification media.

In some embodiments, the disclosure provides a cryo-storage device, wherein when, in a controlled study:
vitrification media is loaded into the cryo-storage device to generate a loaded section of the cryo-storage device;
the loaded section of the cryo-storage device is submerged in liquid nitrogen such that the liquid nitrogen does not contact the vitrification media;
the loaded section of the cryo-storage device moves in a repetitive motion while submerged in liquid nitrogen; and
the vitrification media cools with an average rate of at least about 900° C./minute as measured by a thermocouple in contact with the vitrification media.

INCORPORATION BY REFERENCE

All publications, patents, and patent applications mentioned in this specification are herein incorporated by reference to the same extent as if each individual publication, patent, or patent application was specifically and individually indicated to be incorporated by reference.

DETAILED DESCRIPTION

Figure 1:
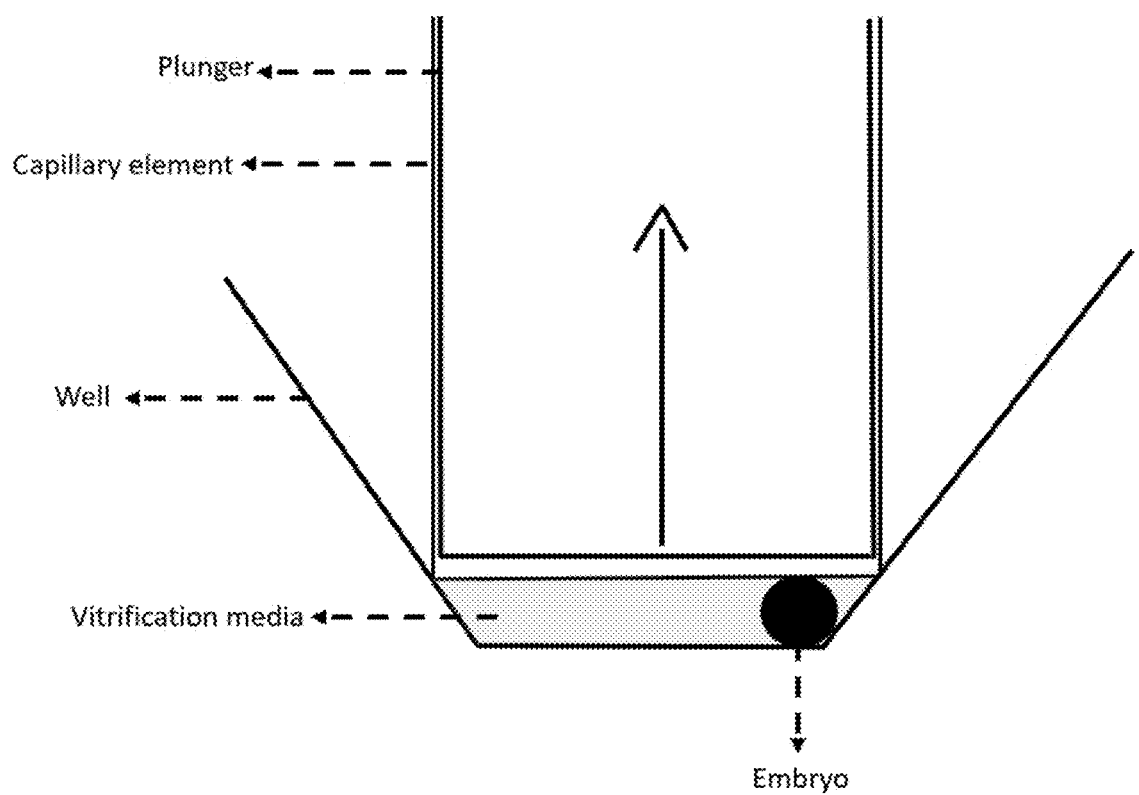
FIG. 1 shows a schematic representation of insertion of the capillary element of a cryo-storage device of the disclosure into a single well with a narrowed bottom. The narrow bottom can facilitate embryo pickup by the capillary element due to the fit of the capillary element into the narrow well bottom where solution containing the embryo is located.

Described herein are devices, systems, and methods to facilitate cryopreservation of a cell or a mass of a plurality of cells. Non-limiting examples of cells include ova and oocytes. Non-limiting examples of masses of pluralities of cells include cumulus oocyte complexes, zygotes, blastocysts, and embryos.

In some embodiments, a device of the disclosure comprises a capillary and a slidable plunger. A slidable plunger can be slidable along the capillary element. Devices, systems, and methods disclosed herein can facilitate the cryostorage of cells and masses of pluralities of cells by, for example, decreasing ice crystal formation during the vitrification process. Decreased ice crystal formation can, for example, lead to increased oocyte and/or embryo viability following cryopreservation.

Vitrification During IVF.

IVF involves the fertilization of a female ovum outside of the body. Prior to IVF, an ovum must be retrieved from a female subject. Non-limiting examples of female subjects include a human, non-human primate, dog, cow, horse, pig, sheep, goat, cat, buffalo, guinea pig, hamster, rabbit, rat, and mouse. Prior to ovum retrieval, a female's ovarian follicles can be stimulated via the administration of one or more hormones or agents including, for example, inhibin, an inhibin and activin mixture, clomiphene citrate, human menopausal gonadotropins such as follicle stimulating hormone (FSH), and a mixture of FSH and luteinizing hormone (LH), and/or human chorionic gonadotropins. Following stimulation, ovarian follicle development can be monitored using ultrasound.

Upon development of ovarian follicles, follicular fluid containing oocytes surrounded by cumulus cells (i.e. the cumulus oocyte complex), can be retrieved. The retrieval of oocytes can occur through various methods including, for example, transvaginal ultrasound-guided follicular aspiration, perurethral/transvesical ultrasonographic puncture, or through laparoscopic methods. In some embodiments, immature oocytes can be retrieved and allowed to mature in vitro. In some embodiments, oocytes can be developed from ovarian stem cells, mesenchymal stem cells, or ovarian tissue.

Following retrieval, oocytes can be isolated from follicular fluid, washed and placed in a receptacle such as a dish. After about 2 to about 6 hours, eggs are fertilized with sperm via direct injection of sperm into each ovum (intracytoplasmic sperm injection), or by mixing of sperm and oocytes in a dish under conditions that facilitate fertilization.

Following insemination, oocytes and sperm are incubated for about 16 hours. Following incubation, the fertilized oocytes (now zygotes), are washed and cultured in vitro in previously prepared cultured dishes to day 3 post fertilization. On day 3 of culture, the embryo culture media is changed, and the embryo is cultured to day 5 post fertilization. Embryo culture conditions can include a temperature approximating that found in vivo (37° C.), sub-ambient concentration of oxygen (usually 5%) and elevated concentrations of carbon dioxide (5-6%). In some cases, oil is used to cover embryo cultures to maintain, for example, stable temperature, osmolality, and pH.

Following day 5 post fertilization, embryo biopsy and testing such as preimplantation genetic screening can occur. Embryos can be moved to transfer media, and the embryo transfer process can occur. To facilitate embryo transfer, a speculum can be inserted into the vagina of a subject to open the vaginal walls. A catheter is then passed through the cervix and into the uterine cavity. The optimal placement of the catheter within the uterus is 1-2 cm from the uterine fundus, and, in some instances, catheter placement is guided with ultrasound. Following catheter placement, one or more embryos are passed through the catheter and into the uterus where implantation can occur. Implantation of the embryo into the uterine wall results in pregnancy.

The IVF process is not always continuous and can involve the long-term term storage of a cell or mass of a plurality of cells such as an oocyte or embryo. To facilitate long-term storage, a cell and/or mass of a plurality of cells (e.g. oocytes and/or embryos) can be cryopreserved. During the IVF process cryopreservation of an oocyte or embryo can occur following oocyte retrieval or embryo culture (just prior to the transfer step), respectively. Cryopreserving oocytes can allow a patient to choose to fertilize the oocyte at a later date, for example after a suitable partner or sperm donor has been identified. Cryopreservation of embryos can allow a patient to initiate multiple pregnancies from a single IVF procedure, while also controlling the timing of the pregnancies.

Cells or masses of pluralities of cells such as oocytes and/or embryos can be cryopreserved through, for example, the vitrification process or slow freezing. Unlike slow freezing, vitrification can allow solidification of cells/masses of pluralities of cells and the extracellular milieu into a glass like state while avoiding crystallization and the formation of ice crystals inside cells/masses of pluralities of cells. Ice crystal formation can facilitate cell membrane rupture; thus, the prevention of ice crystals can lead to increased viability of cells or masses of pluralities of cells (e.g. ova, oocytes, zygotes, blastocysts, embryos) following cryopreservation.

During the vitrification process, cells or masses of pluralities of cells are exposed to vitrification media (also referred to as vitrification solution). In some embodiments, vitrification media contains cryoprotectant agents (CPAs). Exposure to CPAs can allow rapid dehydration of cells which helps to prevent ice crystal formation. In some embodiments, vitrification media contains a mix of CPAs, for example, a combination of ethylene glycol, dimethyl sulphoxide (DMSO), and sucrose. In some embodiments, using a combination of CPAs can decrease the toxicity of a CPA containing solution. In some embodiments, cells and/or masses of pluralities of cells are exposed to increasing concentrations of CPAs during the vitrification process.

Once exposed to the desired concentration of CPAs, cells or masses of pluralities of cells, along with a vitrification media containing CPAs, are loaded into a cryo-storage device and rapidly cooled by, for example, submerging the cryo-storage device in liquid nitrogen. Rapid cooling of the vitrification media causes the liquid inside cells to become increasingly viscous until the molecules are immobilized, leaving molecules in the liquid state and imparting the properties of a solid with a glassy, non-crystalline consistency.

Throughout vitrification, rapid cooling rates and the presence of CPAs can avoid the formation of ice crystals, with increased cooling rates and/or increased CPA concentrations each decreasing the likelihood of crystal formation. However, high concentrations of CPAs can be harmful towards cells/masses of pluralities of cells. Thus, effective vitrification methods that can increase cooling rates while decreasing CPA concentrations are advantageous.

Cooling rates during the vitrification process can be increased by, for example, decreasing the volume of media containing cells or masses of pluralities of cells to be vitrified. Additionally, or alternatively, cooling rates can be increased by minimizing the thermal path between the cooling source (e.g. liquid nitrogen) and cells/masses of pluralities of cells and surrounding media. Decreased media volumes and/or thermal paths can also be improve warming rates during the reversal of vitrification. Quick warming can be beneficial towards the reversal of vitrification as slow warming can lead to cell damage due to recrystallization of liquids in the environment of cells/masses of pluralities of cells.

Cryo-storage Devices.

Disclosed herein is a cryo-storage device for cells and/or masses of pluralities of cells such as ova, oocytes, zygotes, blastocysts, and embryos. A cryo-storage device of the disclosure can facilitate easy loading and unloading of cells and/or masses of pluralities of cells from the device and the effective vitrification and storage of cells and/or masses of pluralities of cells.

In some embodiments, a cryo-storage device disclosed herein provides a closed system for oocytes/embryos. A closed system cryo-storage device can avoid direct contact of cells and/or masses of pluralities of cells with the coolant (e.g. liquid nitrogen) during vitrification, while in an open system cells/masses of pluralities of cells directly contact the coolant. Thus, compared to an open system device, a closed system device can decrease the risk of contamination and/or disease transmission.

To maintain a high cooling rate of cells, masses of pluralities of cells, and/or surrounding media during vitrification, a cryo-storage device of the disclosure can be designed to minimize the thermal path between a coolant, such as liquid nitrogen, and cells, masses of pluralities of cells, and/or surrounding media. Additionally, or alternatively, a cryo-storage device of the disclosure can be designed to minimize the volume of media loaded into the device with cells/masses of pluralities of cells. Decreased media volumes in the device can increase cooling rates of, for example, ova, oocytes, blastocysts, zygotes, or embryos upon exposure to liquid nitrogen or another coolant.

In some embodiments, a device of the disclosure can minimize the need for ancillary components and manual interactions by a user during methods of using the device. Minimization of ancillary components and manual interactions can facilitate effective vitrification and storage of cells and/or masses of pluralities of cells by reducing the opportunities for the introduction of human error into the process of vitrification.

Plungers and capillary elements: A cryo-storage device of the disclosure can comprise a capillary element and a plunger fitting inside the capillary element. In some embodiments, the plunger is a slidable plunger. In some embodiments, a cryo-storage device can further comprise an elongated casing, with the capillary element and slidable plunger contained within a first end of the casing. The slidable plunger can control the flow of fluid in and out of the capillary element through positive displacement. In some embodiments, a capillary element is rigid. A rigid capillary element can facilitate precise positioning of a capillary element by a user or automated system and can facilitate precise position and/or insertion of the capillary element into a well by a user or automated system. In some embodiments a capillary element is flexible.

A capillary element of a cryo-storage device disclosed herein can comprise an elongated body, wherein the elongated body comprises a bottom opening, a top opening, and a hollow portion inside the elongated body connecting the top opening to the bottom opening. In some embodiments, a hollow portion of a capillary element is cylindrical or about cylindrical. The bottom opening of a capillary element can be located at a bottom end of elongated body while the top opening of a capillary element can be located at a top end of elongated body. In some embodiments, the top opening, the bottom opening, and the cross section of a capillary element are the same shape. For example, a capillary element disclosed herein can have a top opening, a bottom opening, and a cross section that is elliptical, circular, rectangular, triangular, octagonal, pentangular, hexangular, or heptangular in shape. In some embodiments, a hollow portion can have a diameter that is regular over the length of the hollow portion or a portion of the length of the hollow portion. The diameter of a component can refer to the length of a straight line passing through the middle of the component's cross section (e.g. a rectangular, elliptical, or circular cross section) from one edge of the cross section to the opposite edge.

A capillary element can comprise and/or be made of, for example, polyethylene, polyvinyl chloride, medical grade styrene-butadiene copolymer, polypropylene, polyesters such as polyethylene terephthalate, and polybutylene terephthalate; polyolefins such as polyethylene, ultra-high-molecular-weight polyethylene, polypropylene, ethylene-propylene copolymer, and ethylene-vinyl acetate copolymer; styrene resins such as polystyrene, methacrylate-styrene copolymer, and methacrylate-butylene-styrene copolymer; and polyamides such as nylon. In some embodiments, a capillary element can comprise and/or be made of low molecular weight polyethylene. In some embodiments, a capillary element can contain a heat sealable resin, for example, as an inner layer located within the hollow portion.

In some embodiments, a capillary element has a cross-sectional area that is constant or about constant across the capillary element's full length or a portion thereof. The cross-sectional area of a capillary element can be larger than the area of a top opening and a bottom opening that are equal in size due to the thickness of the elongated body connecting the top opening and the bottom opening. A capillary element can have a hollow portion with a cross-sectional area (i.e. an inner cross-sectional area) that is equal to the area of a top opening and a bottom opening that are equal in size. In some embodiments, the top opening and the bottom opening are the same shape and have the same dimensions which are equal to the dimensions of the hollow portion of a capillary element. For example, a capillary element can be a hollow cylinder with circular openings of diameter d and a perimeter p, where d is equal to the diameter of the hollow portion of the capillary element and p is equal to the perimeter of the hollow portion. The diameter of a capillary element can be larger than the diameter of the hollow portion of a capillary element due to the thickness of the elongated body surrounds the hollow portion.

The external perimeter of a plunger (e.g. a slidable plunger) can fit into the hollow portion of the capillary element, to allow for accurate and controllable aspiration when the plunger slides inside the capillary element during loading of the capillary element. A slidable plunger can, for example, be cylindrical or about cylindrical. In some embodiments, the plunger is inserted through the top end of the capillary element and cells and/or masses of pluralities of cells are loaded through the bottom end of the capillary element. In some embodiments, a plunger (e.g. a slidable plunger) is a metal plunger and a capillary element is made of coolant (e.g. liquid nitrogen) resistant material. The plunger and capillary element can have any external shape and can be complementary. The shape of a plunger can be described by a plunger's cross section. The shape of a capillary element can be described by the capillary element's cross section. For example, a plunger or capillary element of the disclosure can have an elliptical, circular, rectangular, triangular, octagonal, pentangular, hexangular, or heptangular cross section. In some embodiments, a capillary element with a circular cross section minimizes the thermal path and maximizes the cooling rate experienced by cells and/or masses of pluralities of cells loaded within the capillary element.

In some embodiments, a plunger (e.g. a slidable plunger) of the disclosure comprises a top end and a bottom end connected by an elongated body. In a cryo-storage device of the disclosure, at least a portion of a slidable plunger can be within the hollow portion of the capillary element. In some embodiments, a slidable plunger (or portion thereof) fits within the hollow portion of a capillary element. A slidable plunger can be configured to actuate through the top opening of a capillary element. A slidable plunger can have a diameter that is regular over the length of the slidable plunger. A slidable plunger can have a diameter that is regular over a portion of the length of the slidable plunger. In some embodiments, a cryo-storage device comprises a slidable plunger with a diameter that is no greater than the diameter of the cryo-storage device's capillary element. In some embodiments, the bottom end of a slidable plunger is inserted through the top end of a capillary element and the top end of the plunger is bent at an angle to form a bent end. In some embodiments, the top end of a plunger is bent at an angle of about 15 degrees to about 100 degrees. In some embodiment, the top end of a plunger is bent at an angle of about 15 degrees to about 30 degrees, about 15 degrees to about 45 degrees, about 15 degrees to about 60 degrees, about 15 degrees to about 75 degrees, about 15 degrees to about 90 degrees, about 15 degrees to about 100 degrees, about 30 degrees to about 45 degrees, about 30 degrees to about 60 degrees, about 30 degrees to about 75 degrees, about 30 degrees to about 90 degrees, about 30 degrees to about 100 degrees, about 45 degrees to about 60 degrees, about 45 degrees to about 75 degrees, about 45 degrees to about 90 degrees, about 45 degrees to about 100 degrees, about 60 degrees to about 75 degrees, about 60 degrees to about 90 degrees, about 60 degrees to about 100 degrees, about 75 degrees to about 90 degrees, about 75 degrees to about 100 degrees, or about 90 degrees to about 100 degrees. In some embodiment, the top end of a plunger is bent at an angle of about 15 degrees, about 30 degrees, about 45 degrees, about 60 degrees, about 75 degrees, about 90 degrees, or about 100 degrees. In some embodiment, the top end of a plunger is bent at an angle of at least about 15 degrees, about 30 degrees, about 45 degrees, about 60 degrees, about 75 degrees, or about 90 degrees. In some embodiment, the top end of a plunger is bent at an angle of at most about 30 degrees, about 45 degrees, about 60 degrees, about 75 degrees, about 90 degrees, or about 100 degrees. In some embodiments, a plunger protrudes out of the top opening of a capillary element with the top end of a plunger being located outside of the capillary element. In some embodiments a bent end of a plunger allows a capillary element-plunger complex to interface with a pipettor. The pipettor can, for example, allow for ergonomic handling of a cryo-storage device and control actuation of the plunger and loading/unloading of the device.

In some embodiments, the capillary element of a cryo-storage device defines a volume to be loaded with cells and/or masses of pluralities of cells, as well as air, media, and/or additional cells. Fitted inside a capillary element can be a slidable plunger. For example, a capillary element can be a hollow cylindrical tube with a circular cross section and the plunger can be a rod with a circular cross section fitting inside the cylindrical tube. In some embodiments, the plunger is a rod with a bent top end that is located outside of the capillary element. In some embodiments, a slidable plunger can be movable to allow for loading and unloading of a content (e.g. cells/masses of pluralities of cells, air, a volume of media, and/or additional cells). For example, retraction of a plunger that is within a capillary element can load the capillary element with a content such that the content is located within a section of the capillary element located between the bottom opening of the capillary element and the bottom end of the slidable plunger. Additionally, insertion of the plunger into the capillary element can allow for unloading of the content. The use of a plunger rather than air to control the loading of cells and/or masses of pluralities of cells and media can reduce the volume of air in the capillary element at the point of vitrification and warming. Reduction of air volume can reduce the likelihood of cell damage (e.g. cell membrane rupture) during vitrification and/or warming.

Sealing of plungers and capillary elements: In some embodiments, a seal is present between a plunger and the inner walls of the capillary element in a cryo-storage device of the disclosure. A seal can seal a slidable plunger to the hollow portion of a capillary element and can be formed by, for example, the fit of the plunger into the hollow portion of a capillary element (e.g. an interference fit) or by a sealing device. In some embodiments, the fit between a slidable plunger into a capillary element that forms a seal is a tight fit. In some embodiments, the seal between a plunger and a capillary element is a pneumatic seal.

In some embodiments, a seal is formed between a slidable plunger and a capillary element by a sealing device. Non-limiting examples of sealing devices include lip seals, piston seals, rod seals, wiper seals, V-seals, and O-rings. A sealing device of the disclosure can be employed between the plunger and the capillary element. In some embodiments, a seal is formed by a chemical seal or lubricant, such as vacuum grease.

Heat transfer through capillary elements: A capillary element of the disclosure can facilitate rapid heat transfer through the capillary element. For example, a capillary element can facilitate heat transfer from the contents of a capillary element to/from an external environment. In some embodiments, the content of a capillary element can comprise, for example, a cell or a mass of a plurality of cells and a volume of media. In some embodiments, a capillary element loaded with media and one or more cells and/or masses of pluralities of cells can facilitate the rapid transfer of heat from the media—cell/mass of a plurality of cells mixture to a liquid nitrogen bath allowing for rapid vitrification. Conversely, a capillary element containing a vitrified cell/mass of a plurality of cells can facilitate the rapid transfer of heat from a warming solution (also referred to as warming media) to the contents of the capillary element allowing for rapid warming of the cell/mass of a plurality of cells. To facilitate rapid heat transfer, a capillary element of the disclosure can be designed to have a high thermal conductivity and/or specific heat capacity.

The thermal conductivity of a material indicates the material's ability to conduct heat. Thermal conductivity is represented by the equation $q=-k\nabla T$, wherein q is the heat flux k is the thermal conductivity, and $\nabla T$ is the temperature gradient. Thus, heat flux is greater through a material with a high thermal conductivity compared to a material with a lower conductivity, Heat flux can be measured in, for example, units of watts per meter-kelvin (W/m·K).

The heat flux of a material can be measured using methods such as, for example, Searle's bar method and Lee's disc method. In some instances, the method used to measure the thermal conductivity of a material can be chosen based on the expected conductive property of the material. For example, Searle's bar method can be used to measure the thermal conductivity of a material expected to be a good conductor of heat such as metal, and Lee's disc method can be used to measure the thermal conductivity of a poor conductor of heat such as glass. Searle's bar method measures the thermal conductivity of a material by heating a bar of the material on one side with steam and cooling the bar on the other side by water while the length of the bar is thermally insulated. The thermal conductivity of the material can then be calculated using the equation $k=-C_w(L/A)(\Delta m/\Delta t)(\Delta T_{water}/\Delta T_{bar})$, where $C_w$ is the specific heat of water, $\Delta m$ is the mass of water collected during time $\Delta t$, $\Delta T_{water}$ is difference in the temperature of water before and after the water has gone through the bar, L is the length of the bar, $\Delta T_{bar}$ is the temperature difference between each end of the bar, A is the cross-sectional area of the bar, and k is the thermal conductivity of the material.

Lee's disc method measures thermal conductivity by placing a sample between two metal discs with thermometers inserted into the metal discs. A steam camber is placed on top of the top metal disc and the setup is suspended in air to remove conduction effects. Steam is then used to heat the top metal disc causing heat to be transferred from the top metal disc, through the sample and to the bottom metal disc. After a period of time, each disc reaches a different steady temperature that can be recorded and later used to calculate thermal conductivity. The steam chamber is then removed along with the top metal disc and poor conductor. The bottom disc is then heated to about 10° C. above the equilibrium temperature and allowed to cool to room temperature with an insulating material placed on top of the disc. The temperature during this cooling process can be recorded with respect to time to generate a cooling curve, which can be used to calculate the thermal conductivity of the poor conductor. Thermal conductivity can then be calculated using the equation $k=[mc(dT/dt)\times]/[A(T_2-T_1)]$, where k is the thermal conductivity, $T_2$ is the temperature of the top disc at steady state, $T_1$ is the temperature of the bottom disc at steady state, x is the thickness of the sample between the top and bottom disc, A is the surface area of the sample, dT/dt is the rate of cooling of the bottom disc after placing the insulating material on top, in is the mass of the sample, and c is the specific heat of the sample.

In some embodiments, a capillary element of the disclosure comprises and/or is made up of a material with a thermal conductivity of about 0.05 W/m·K to about 10 W/m·K. In some embodiments, a capillary element of the disclosure comprises and/or is made up of a material with a thermal conductivity of about 0.05 W/m·K to about 0.1 W/m·K, about 0.05 W/m·K to about 0.2 W/m·K, about 0.05 W/m·K to about 0.3 W/m·K, about 0.05 W/m·K to about 0.33 W/m·K, about 0.05 W/m·K to about 0.5 W/m·K, about 0.05 W/m·K to about 1 W/m·K, about 0.05 W/m·K to about 5 W/m·K, about 0.05 W/m·K to about 10 W/m·K, about 0.1 W/m·K to about 0.2 W/m·K, about 0.1 W/m·K to about 0.3 W/m·K, about 0.1 W/m·K to about 0.33 W/m·K, about 0.1 W/m·K to about 0.5 W/m·K, about 0.1 W/m·K to about 1 W/m·K, about 0.1 W/m·K to about 5 W/m·K, about 0.1 W/m·K to about 10 W/m·K, about 0.2 W/m·K to about 0.3 W/m·K, about 0.2 W/m·K to about 0.33 W/m·K, about 0.2 W/m·K to about 0.5 W/m·K, about 0.2 W/m·K to about 1 W/m·K, about 0.2 W/m·K to about 5 W/m·K, about 0.2 W/m·K to about 10 W/m·K, about 0.3 W/m·K to about 0.33 W/m·K, about 0.3 W/m·K to about 0.5 W/m·K, about 0.3 W/m·K to about 1 W/m·K, about 0.3 W/m·K to about 5 W/m·K, about 0.3 W/m·K to about 10 W/m·K, about 0.33 W/m·K to about 0.5 W/m·K, about 0.33 W/m·K to about 1 W/m·K, about 0.33 W/m·K to about 5 W/m·K, about 0.33 W/m·K to about 10 W/m·K, about 0.5 W/m·K to about 1 W/m·K, about 0.5 W/m·K to about 5 W/m·K, about 0.5 W/m·K to about 10 W/m·K, about 1 W/m·K to about 5 W/m·K, about 1 W/m·K to about 10 W/m·K, or about 5 W/m·K to about 10 W/m·K. In some embodiments, a capillary element of the disclosure comprises and/or is made up of a material with a thermal conductivity of about 0.05 W/m·K, about 0.1 W/m·K, about 0.2 W/m·K, about 0.3 W/m·K, about 0.33 W/m·K, about 0.5 W/m·K, about 1 W/m·K, about 5 W/m·K, or about 10 W/m·K. In some embodiments, a capillary element of the disclosure comprises and/or is made up of a material with a thermal conductivity of at least about 0.05 W/m·K, at least about 0.1 W/m·K, at least about 0.2 W/m·K, at least about 0.3 W/m·K, at least about 0.33 W/m·K, at least about 0.5 W/m·K, at least about 1 W/m·K, or at least about 5 W/m·K. In some embodiments, a capillary element of the disclosure comprises and/or is made up of a material with a thermal conductivity of at most about 0.1 W/m·K, at most about 0.2 W/m·K, at most about 0.3 W/m·K, at most about 0.33 W/m·K, at most about 0.5 W/m·K, at most about 1 W/m·K, at most about 5 W/m·K, or at most about 10 W/m·K.

The heat capacity of a material is the amount of heat to be supplied to a given mass of material to produce a unit change in the temperature of the material. Specific heat capacity is the heat capacity of a sample normalized by mass. Specific heat capacity can be measured in, for example, units of joules per ° C.-kilogram (J/° C.·kg) In some embodiments, a capillary element of the disclosure comprises and/or is made up of a material with a specific heat capacity of about 1,000 J/° C.·kg to about 3,000 J/° C.·kg. In some embodiments, a capillary element of the disclosure comprises and/or is made up of a material with a specific heat capacity of about 1,000 J/° C.·kg to about 1,250 J/° C.·kg about 1,000 J/° C.·kg to about 1,500 J/° C.·kg, about 1,000 J/° C.·kg to about 1,550 J/° C.·kg about 1,000 J/° C.·kg to about 1.750 J/° C.·kg, about 1,000 J/° C.·kg to about 1,900 J/° C.·kg, about 1,000 J/° C.·kg to about 2,000 J/° C.·kg, about 1,000 J/° C.·kg to about 2,250 J/° C.·kg, about 1,000 J/° C.·kg to about 2,500 J/° C.·kg, about 1,000 J/° C.·kg to about 3,000 J/° C.·kg, about 1,250 J/° C.·kg to about 1,500 J/° C.·kg, about 1,250 J/° C.·kg to about 1,550 J/° C.·kg, about 1,250 J/° C.·kg to about 1,750 J/° C.·kg, about 1,250 J/° C.·kg to about 1,900 J/° C.·kg, about 1,250 J/° C.·kg to about 2,000 J/° C.·kg, about 1,250 J/° C.·kg to about 2,250 J/° C.·kg, about 1,250 J/° C.·kg to about 2,500 J/° C.·kg, about 1,250 J/° C.·kg to about 3,000 J/° C.·kg, about 1,500 J/° C.·kg to about 1,550 J/° C.·kg, about 1,500 J/° C.·kg to about 1,750 J/° C.·kg, about 1,500 J/° C.·kg to about 1,900 J/° C.·kg, about 1,500 J/° C.·kg to about 2,000 J/° C.·kg, about 1,500 J/° C.·kg to about 2,250 J/° C.·kg, about 1,500 J/° C.·kg to about 2,500 J/° C.·kg, about 1,500 J/° C.·kg to about 3,000 J/° C.·kg, about 1,550 J/° C.·kg to about 1,750 J/° C.·kg, about 1,550 J/° C.·kg to about 1,900 J/° C.·kg, about 1,550 J/° C.·kg to about 2,000 J/° C.·kg, about 1,550 J/° C.·kg to about 2,250 J/° C.·kg, about 1,550 J/° C.·kg to about 2,500 J/° C.·kg, about 1,550 J/° C.·kg to about 3,000 J/° C.·kg, about 1,750 J/° C.·kg to about 1,900 J/° C.·kg, about 1,750 J/° C.·kg to about 2,000 J/° C.·kg, about 1,750 J/° C.·kg to about 2,250 J/° C.·kg, about 1,750 J/° C.·kg to about 2,500 J/° C.·kg, about 1,750 J/° C.·kg to about 3,000 J/° C.·kg, about 1,900 J/° C.·kg to about 2,000 J/° C.·kg, about 1,900 J/° C.·kg to about 2,250 J/° C.·kg, about 1,900 J/° C.·kg to about 2,500 J/° C.·kg, about 1,900 J/° C.·kg to about 3,000 J/° C.·kg, about 2,000 J/° C.·kg to about 2,250 J/° C.·kg, about 2,000 J/° C.·kg to about 2,500 J/° C.·kg, about 2,000 J/° C.·kg to about 3,000 J/° C.·kg, about 2,250 J/° C.·kg to about 2,250 J/° C.·kg, about 2,250 J/° C.·kg to about 3,000 J/° C.·kg, or about 2,500 J/° C.·kg to about 3,000 J/° C.·kg. In some embodiments, a capillars element of the disclosure comprises and/or is made up of a material with a specific heat capacity of about 1.000 J/° C.·kg, about 1,250 J/° C.·kg, about 1,500 J/° C.·kg, about 1,550 J/° C.·kg, about 1,750 J/°

C.·kg, about 1,900 J/° C.·kg, about 2,000 J/° C.·kg, about 2,250 J/° C.·kg, about 2,500 J/° C.·kg, or about 3,000 J/° C.·kg. In some embodiments, a capillary element of the disclosure comprises and/or is made up of a material with a specific heat capacity of at least about 1,000 J/° C.·kg, at least about 1,250 J/° C.·kg, at least about 1,500 J/° C.·kg, at least about 1,550 J/° C.·kg, at least about 1,750 J/° C.·kg, at least about 1,900 J/° C.·kg, at least about 2,000 J/° C.·kg, at least about 2,250 J/° C.·kg, or at least about 2,500 J/° C.·kg. In some embodiments, a capillars element of the disclosure comprises and or is made up of a material with a specific heat capacity of at most about 1,250 J/° C.·kg, at most about 1,500 J/° C.·kg, at most about 1,550 J/° C.·kg, at most about 1.750 J/° C.·kg, at most about 1,900 J/° C.·kg, at most about 2,000 J/° C.·kg, at most about 2,250 J/° C.·kg, at most about 2,500 J/° C.·kg, or at most about 3,000 J/° C.·kg.

Displacement mechanisms: A cryo-storage device of the disclosure can further comprise a displacement mechanism responsible for controlling the movement of the slidable plunger along the capillary element. The mechanism can be, for example, a slider or a latch mechanism with a spring, a lever, an air bulb or a button. The device or the displacement mechanism can include indicators, such as markings on the capillary, or haptic feedback, that guide a user of the device or directly control the maximum volume of fluid (e.g. liquid and/or air) that the capillary can intake. For example, fixed end-stops that accurately limit the travel of the mechanism and hence the volume displaced in the capillary can be present in a cryo-storage device disclosed herein.

In some embodiments, a cryo-storage device disclosed herein has a displacement mechanism that is a sliding clip with a grip for holding the plunger. The displacement mechanism can be movable along the casing of a cryo-storage device. Further, a displacement mechanism that is a latch mechanism can comprise a button connected to the plunger and a spring placed between the button and a support inside the casing.

Reusable/disposable components: In some embodiments, a cryo-storage device disclosed herein is a single-use, disposable device. Alternatively, a cryo-storage device of the disclosure can comprise a reusable component and a disposable component. For example, a cryo-storage device can have a latch mechanism comprising the plunger divided into two parts, with one end of an elongated body connected to a button and the opposite end connected to a grip that holds the plunger fitting inside the capillary, allowing the storage device to be disposable and the displacement mechanism to be reusable. In some embodiments, the displacement mechanism can be a pipettor. A pipettor can allow ergonomic handling of a device and improve ease of loading and unloading cells or masses of pluralities of cells.

In some embodiments, a cryo-storage device comprises a pipettor interfaced with a capillary element and a slidable plunger. A pipettor can comprise an elongated casing with a top end and a bottom end. A capillary element, a slidable plunger, and/or portions thereof (e.g. the top ends of the capillary element and slidable plunger) can each be inserted into the bottom end of the elongated casing of a pipettor. In some embodiments, a capillary element and/or slidable plunger can be connected to a tab to facilitate an interface between the capillary element and/or slidable plunger and the pipettor. For example, the pipettor can comprise a clamping mechanism that clamps onto a tab that connects a capillary element and/or slidable plunger to a bottom end of the elongated casing of the pipettor. A pipettor can also comprise a pipetting plunger. A pipetting plunger can have a top end, a bottom end, and an elongated body connecting the top end to the bottom end. In some embodiments, the bottom end of a pipetting plunger is within an elongated casing and the top end of the pipetting plunger is outside the elongated casing. A pipetting plunger can move along a longitudinal axis of an elongated casing. A pipetting plunger can be configured so that actuation of the pipetting plunger can control the movement (e.g. actuation) of a slidable plunger. For example, movement of a pipetting plunger can be used to move a slidable plunger along a longitudinal axis of the capillary element, which can control loading and/or unloading of the capillary element. In some embodiments, a pipetting plunger is directly connected to a slidable plunger. In some embodiments, a pipetting plunger is indirectly connected to a slidable plunger.

In some embodiments, a pipetting plunger can comprise a button operatively connected to a top end of a pipetting plunger and configured so that pushing of the button causes the pipetting plunger to actuate through the elongated casing. Additionally, or alternatively, a pipetting plunger can comprise a protrusion on the elongated body of the pipetting plunger. A spring that is wrapped around the elongated body of the pipetting plunger can be located below a protrusion on the elongated body. In some embodiments, the presence of a spring and protrusion in a pipettor can improve accurate loading and unloading of a capillary element interfaced with the pipettor.

Covers/sheaths: A cryo-storage device of the disclosure can, in some embodiments, comprise a sheath or cover that can be placed over the tip of a capillary element. A sheath or cover can provide protection for the tip of a capillary before and after loading of a cell/mass of a plurality of cells, air, media, and/or additional cells. In some embodiments, the sheath or cover provides mechanical protection of the contents (e.g. media and cells/masses of pluralities of cells) of the capillary element when the capillary element is introduced into a liquid nitrogen storage tank after the capillary has been loaded. A sheath or cover can be fitted to a capillary element to provide for sealing of the capillary elements and the contents of the capillary element from external fluids. In some embodiments, a sheath or cover can slide along a casing and be moved over the tip of the capillary element. A sliding sheath or cover can make a cryo-storage device easier to use by integrating all protective components into a single device. When a sheath or cover is incorporated into a device, a simple sliding motion can be used to cover the functional region of a capillary element. The sheath can be of different materials such as, for example, metal (e.g. steel) or plastic.

In some embodiments, the sheath is a gripping placed over the outside of the straw. A sheath can carry an identifier for identifying a patient or donor. In some embodiments, the sheath is made of a polymer material.

In some embodiments, a sheath or cover of the disclosure comprises and/or is made up of a material with a thermal conductivity of about 0.05 W/m·K to about 60 W/m·K. In some embodiments, a sheath or cover of the disclosure comprises and/or is made up of a material with a thermal conductivity of about 0.05 W/m·K to about 0.1 W/m·K, about 0.05 W/m·K to about 0.2 W/m·K, about 0.05 W/m·K to about 0.3 W/m·K, about 0.05 W/m·K to about 0.33 W/m·K, about 0.05 W/m·K to about 0.5 W/m·K, about 0.05 W/m·K to about 1 W/m·K, about 0.05 W/m·K to about 5 W/m·K, about 0.05 W/m·K to about 60 W/m·K, about 0.1 W/m·K to about 0.2 W/m·K, about 0.1 W/m·K to about 0.3 W/m·K, about 0.1 W/m·K to about 0.33 W/m·K, about 0.1 W/m·K to about 0.5 W/m·K, about 0.1 W/m·K to about 1 W/m·K, about 0.1 W/m·K to about 5 W/m·K, about 0.1

W/m·K to about 60 W/m·K, about 0.2 W/m·K to about 0.3 W/m·K, about 0.2 W/m·K to about 0.33 W/m·K, about 0.2 W/m·K to about 0.5 W/m·K, about 0.2 W/m·K to about 1 W/m·K, about 0.2 W/m·K to about 5 W/m·K, about 0.2 W/m·K to about 60 W/m·K, about 0.3 W/m·K to about 0.33 W/m·K, about 0.3 W/m·K to about 0.5 W/m·K, about 0.3 W/m·K to about 1 W/m·K, about 0.3 W/m·K to about 5 W/m·K, about 0.3 W/m·K to about 60 W/m·K, about 0.33 W/m·K to about 0.5 W/m·K, about 0.33 W/m·K to about 1 W/m·K, about 0.33 W/m·K to about 5 W/m·K, about 0.33 W/m·K to about 60 W/m·K, about 0.5 W/m·K to about 1 W/m·K, about 0.5 W/m·K to about 5 W/m·K, about 0.5 W/m·K to about 60 W/m·K, about 1 W/m·K to about 5 W/m·K, about 1 W/m·K to about 10 W/m·K, or about 5 W/m·K to about 60 W/m·K. In some embodiments, a sheath or cover of the disclosure comprises and/or is made up of a material with a thermal conductivity of about 0.05 W/m·K, about 0.1 W/m·K, about 0.2 W/m·K, about 0.3 W/m·K, about 0.33 W/m·K, about 0.5 W/m·K, about 1 W/m·K, about 5 W/m·K, about 50.2 W/m·K, or about 60 W/m·K. In some embodiments, a sheath or cover of the disclosure comprises and/or is made up of a material with a thermal conductivity of at least about 0.05 W/m·K, at least about 0.1 W/m·K, at least about 0.2 W/m·K, at least about 0.3 W/m·K, at least about 0.33 W/m·K, at least about 0.5 W/m·K, at least about 1 W/m·K, or at least about 5 W/m·K. In some embodiments, a sheath or cover of the disclosure comprises and/or is made up of a material with a thermal conductivity of at most about 0.1 W/m·K, at most about 0.2 W/m·K, at most about 0.3 W/m·K, at most about 0.33 W/m·K, at most about 0.5 W/m·K, at most about 1 W/m·K, at most about 5 W/m·K, or at most about 60 W/m·K.

In some embodiments, a sheath or cover of the disclosure comprises and/or is made up of a material with a specific heat of about 100 J/° C.·kg to about 3,000 J/° C.·kg. In some embodiments, a sheath or cover of the disclosure comprises and/or is made up of a material with a specific heat capacity of about 100 J/° C.·kg to about 250 J/° C.·kg, about 100 J/° C.·kg to about 420 J/° C.·kg, about 100 J/° C.·kg to about 500 J/° C.·kg, about 100 J/° C.·kg to about 750 J/° C.·kg, about 100 J/° C.·kg to about 1,000 J/° C.·kg, about 100 J/° C.·kg to about 1,500 J/° C.·kg, about 100 J/° C.·kg to about 2,000 J/° C.·kg, about 100 J/° C.·kg to about 2,500 J/° C.·kg, about 100 J/° C.·kg to about 3,000 J/° C.·kg, about 250 J/° C.·kg to about 420 J/° C.·kg, about 250 J/° C.·kg to about 500 J/° C.·kg, about 250 J/° C.·kg to about 750 J/° C.·kg, about 250 J/° C.·kg to about 1,000 J/° C.·kg, about 250 J/° C.·kg to about 1,500 J/° C.·kg, about 250 J/° C.·kg to about 2,000 J/° C.·kg, about 250 J/° C.·kg to about 2,500 J/° C.·kg, about 250 J/° C.·kg to about 3,000 J/° C.·kg, about 420 J/° C.·kg to about 500 J/° C.·kg, about 420 J/° C.·kg to about 750 J/° C.·kg, about 420 J/° C.·kg to about 1,000 J/° C.·kg, about 420 J/° C.·kg to about 1,500 J/° C.·kg, about 420 J/° C.·kg to about 2,000 J/° C.·kg, about 420 J/° C.·kg to about 2,500 J/° C.·kg, about 420 J/° C.·kg to about 3,000 J/° C.·kg, about 500 J/° C.·kg to about 750 J/° C.·kg, about 500 J/° C.·kg to about 1,000 J/° C.·kg, about 500 J/° C.·kg to about 1,500 J/° C.·kg, about 500 J/° C.·kg to about 2,000 J/° C.·kg, about 500 J/° C.·kg to about 2,500 J/° C.·kg, about 500 J/° C.·kg to about 3,000 J/° C.·kg, about 750 J/° C.·kg to about 1,000 J/° C.·kg, about 750 J/° C.·kg to about 1,500 J/° C.·kg, about 750 J/° C.·kg to about 2,000 J/° C.·kg, about 750 J/° C.·kg to about 2,500 J/° C.·kg, about 750 J/° C.·kg to about 3,000 J/° C.·kg, about 1,000 J/° C.·kg to about 1,500 J/° C.·kg, about 1,000 J/° C.·kg to about 2,000 J/° C.·kg, about 1,000 J/° C.·kg to about 2,500 J/° C.·kg, about 1,000 J/° C.·kg to about 3,000 J/° C.·kg, about 1,500 J/° C.·kg to about 2,000 J/° C.·kg, about 1,500 J/° C.·kg to about 2,500 J/° C.·kg, about 1,500 J/° C.·kg to about 3,000 J/° C.·kg, about 2,000 J/° C.·kg to about 2,500 J/° C.·kg, about 2,000 J/° C.·kg to about 3,000 J/° C.·kg, or about 2,500 J/° C.·kg to about 3,000 J/° C.·kg. In some embodiments, a sheath or cover of the disclosure comprises and/or is made up of a material with a specific heat capacity of about 100 J/° C.·kg, about 250 J/° C.·kg, about 420 J/° C.·kg, about 500 J/° C.·kg, about 750 J/° C.·kg, about 1,000 J/° C.·kg, about 1,500 J/° C.·kg, about 2,000 J/° C.·kg, about 2,500 J/° C.·kg, or about 3,000 J/° C.·kg. In some embodiments, a sheath or cover of the disclosure comprises and/or is made up of a material with a specific heat capacity of at least about 100 J/° C.·kg, at least about 250 J/° C.·kg, at least about 420 J/° C.·kg, at least about 500 J/° C.·kg, at least about 750 J/° C.·kg, at least about 1,000 J/° C.·kg, at least about 1,500 J/° C.·kg, at least about 2,000 J/° C.·kg, or at least about 2,500 J/° C.·kg. In some embodiments, a sheath or cover of the disclosure comprises and/or is made up of a material with a specific heat capacity of at most about 250 J/° C.·kg, at most about 420 J/° C.·kg, at most about 500 J/° C.·kg, at most about 750 J/° C.·kg, at most about 1,000 J/° C.·kg, at most about 1,500 J/° C.·kg, at most about 2,000 J/° C.·kg, at most about 2,500 J/° C.·kg, or at most about 3,000 J/° C.·kg.

Air spaces: In some embodiments, the media within the capillary element contacts the plunger allowing for a direct volume displacement action. In some embodiments, an air space between the tip of the plunger and the contents (e.g. media and oocytes/embryos) of the capillary element, provides an air spring within the system and a cell/mass of a plurality of cells do not contact the plunger. Further, an air space can form between the liquid containing a cell/mass of a plurality of cells and the tip of the capillary element that is on the distal end of the device (the end of the capillary that is furthest from the plunger). The presence of an air space at the distal end of the capillary element can allow for the capillary element to be heat sealed at the distal end to close access to capillary contents. The air space can serve to minimize heat transfer to a cell/mass of a plurality of cells during the heat-sealing process of a heat-sealable capillary element. In some embodiments, a heat-sealable capillary element is made of plastic. For unloading the storage device, the previously heated tip of the capillary element can be cut down. The presence of an air space at the distal end of the capillary can help to prevent accidental loss of a cell/mass of a plurality of cells when the tip is cut after warming the device.

Identifiers: In some embodiments, a cryo-storage device disclosed herein comprises an identifier for identifying a patient or donor. An identifier can be, for example, located on the surface of part of the device such as a capillary element or elongated casing. Non-limiting examples of identifiers include, for example, a bar code, a quick response (QR) code, a data matrix, hand or machine written text, a two-dimensional bar code, a radio frequency identification (RFID) tag, machine recognizable text, machine recognizable symbols, liquid nitrogen resistant adhesive containing identifying markings, and an electronic chip. In some embodiments, a cryo-storage device can be labelled with an identifier after loading of a cell/mass of a plurality of cells.

Indications/feedback: In some embodiments, a cryo-storage device of the disclosure comprises guide lines or indications drawn on the capillary or on another part of the device, for example on a casing or on a displacement mechanism. Such guide lines or indications can aid the user in filling appropriate volumes of air/fluid into the device during manual use. In some embodiments, a cryo-storage device comprises a haptic feedback mechanism to aid the user in filling appropriate volumes into the device.

Device Dimensions.

Cryo-storage device: In some embodiments, a cryo-storage device of the disclosure has a length of about 50 mm to about 225 mm. In some embodiments, a cryo-storage device of the disclosure has a length of about 50 mm to about 75 mm, about 50 mm to about 100 mm, about 50 mm to about 130 mm, about 50 mm to about 150 mm, about 50 mm to about 175 mm, about 50 mm to about 200 mm, about 50 mm to about 225 mm, about 75 mm to about 100 mm, about 75 mm to about 130 mm, about 75 mm to about 150 mm, about 75 mm to about 175 mm, about 75 mm to about 200 mm, about 75 mm to about 225 mm, about 100 mm to about 130 mm, about 100 mm to about 150 mm, about 100 mm to about 175 mm, about 100 mm to about 200 mm, about 100 mm to about 225 mm, about 130 mm to about 150 mm, about 130 mm to about 175 mm, about 130 mm to about 200 mm, about 130 mm to about 225 mm, about 150 mm to about 175 mm, about 150 mm to about 200 mm, about 150 mm to about 225 mm, about 175 mm to about 200 mm, about 175 mm to about 225 mm, or about 200 mm to about 225 mm. In some embodiments, a cryo-storage device of the disclosure has a length of about 50 mm, about 75 mm, about 100 mm, about 130 mm, about 150 mm, about 175 mm, about 200 mm, or about 225 mm. In some embodiments, a cryo-storage device of the disclosure has a length of at least about 50 mm, at least about 75 mm, at least about 100 mm, at least about 130 mm, at least about 150 mm, at least about 175 mm, or at least about 200 mm. In some embodiments, a cryo-storage device of the disclosure has a length of at most about 75 mm, at most about 100 mm, at most about 130 mm, at most about 150 mm, at most about 175 mm, at most about 200 mm, or at most about 225 mm.

In some embodiments, a cryo-storage device of the disclosure has a cross-sectional area of about 5 mm to about 50 mm. In some embodiments, a cryo-storage device of the disclosure has a cross-sectional area of about 5 $mm^2$ to about 10 $mm^2$, about 5 $mm^2$ to about 15 $mm^2$, about 5 $mm^2$ to about 20 $mm^2$, about 5 $mm^2$ to about 25 $mm^2$, about 5 $mm^2$ to about 30 $mm^2$, about 5 $mm^2$ to about 35 $mm^2$, about 5 $mm^2$ to about 40 $mm^2$, about 5 $mm^2$ to about 45 $mm^2$, about 5 $mm^2$ to about 50 $mm^2$, about 10 $mm^2$ to about 15 $mm^2$, about 10 $mm^2$ to about 20 $mm^2$, about 10 $mm^2$ to about 25 $mm^2$, about 10 $mm^2$ to about 30 $mm^2$, about 10 $mm^2$ to about 35 $mm^2$, about 10 $mm^2$ to about 40 $mm^2$, about 10 $mm^2$ to about 45 $mm^2$, about 10 $mm^2$ to about 50 $mm^2$, about 15 $mm^2$ to about 20 $mm^2$, about 15 $mm^2$ to about 25 $mm^2$, about 15 $mm^2$ to about 30 $mm^2$, about 15 $mm^2$ to about 35 $mm^2$, about 15 $mm^2$ to about 40 $mm^2$, about 15 $mm^2$ to about 45 $mm^2$, about 15 $mm^2$ to about 50 $mm^2$, about 20 $mm^2$ to about 25 $mm^2$, about 20 $mm^2$ to about 30 $mm^2$, about 20 $mm^2$ to about 35 $mm^2$, about 20 $mm^2$ to about 40 $mm^2$, about 20 $mm^2$ to about 45 $mm^2$, about 20 $mm^2$ to about 50 $mm^2$, about 25 $mm^2$ to about 30 $mm^2$, about 25 $mm^2$ to about 35 $mm^2$, about 25 $mm^2$ to about 40 $mm^2$, about 25 $mm^2$ to about 45 $mm^2$, about 25 $mm^2$ to about 50 $mm^2$, about 30 $mm^2$ to about 35 $mm^2$, about 30 $mm^2$ to about 40 $mm^2$, about 30 $mm^2$ to about 45 $mm^2$, about 30 $mm^2$ to about 50 $mm^2$, about 35 $mm^2$ to about 40 $mm^2$, about 35 $mm^2$ to about 45 $mm^2$, about 35 $mm^2$ to about 50 $mm^2$, about 40 $mm^2$ to about 45 $mm^2$, about 40 $mm^2$ to about 50 $mm^2$, or about 45 $mm^2$ to about 50 $mm^2$. In some embodiments, a cryo-storage device of the disclosure has a cross-sectional area of about 5 $mm^2$, about 10 $mm^2$, about 15 $mm^2$, about 20 $mm^2$, about 25 $mm^2$, about 30 $mm^2$, about 35 $mm^2$, about 40 $mm^2$, about 45 $mm^2$, or about 50 $mm^2$. In some embodiments, a cryo-storage device of the disclosure has a cross-sectional area of at least about 5 $mm^2$, at least about 10 $mm^2$, at least about 15 $mm^2$, at least about 20 $mm^2$, at least about 25 $mm^2$, at least about 30 $mm^2$, at least about 35 $mm^2$, at least about 40 $mm^2$, or at least about 45 $mm^2$. In some embodiments, a cryo-storage device of the disclosure has a cross-sectional area of at most about 10 $mm^2$, at most about 15 $mm^2$, at most about 20 $mm^2$, at most about 25 $mm^2$, at most about 30 $mm^2$, at most about 35 $mm^2$, at most about 40 $mm^2$, at most about 45 $mm^2$, or at most about 50 $mm^2$.

Elongated casing: A cryo-storage device of the disclosure can comprise an elongated casing. In some embodiments, the elongated casing has a length of about 50 mm to about 200 mm. In some embodiments, the elongated casing has a length of about 50 mm to about 75 mm, about 50 mm to about 100 mm, about 50 mm to about 125 mm, about 50 mm to about 150 mm, about 50 mm to about 175 mm, about 50 mm to about 200 mm, about 75 mm to about 100 mm, about 75 mm to about 125 mm, about 75 mm to about 150 mm, about 75 mm to about 175 mm, about 75 mm to about 200 mm, about 100 mm to about 125 mm, about 100 mm to about 150 mm, about 100 mm to about 175 mm, about 100 mm to about 200 mm, about 125 mm to about 150 mm, about 125 mm to about 175 mm, about 125 mm to about 200 mm, about 150 mm to about 175 mm, about 150 mm to about 200 mm, or about 175 mm to about 200 mm. In some embodiments, the elongated casing has a length of about 50 mm, about 75 mm, about 100 mm, about 125 mm, about 150 mm, about 175 mm, or about 200 mm. In some embodiments, the elongated casing has a length of at least about 50 mm, at least about 75 mm, at least about 100 mm, at least about 125 mm, at least about 150 mm, or at least about 175 mm. In some embodiments, the elongated casing has a length of at most about 75 mm, at most about 100 mm, at most about 125 mm, at most about 150 mm, at most about 175 mm, or at most about 200 mm.

Capillary element: To maintain high cooling and/or warming rates of a cell, mass of a plurality of cells, and/or surrounding media during vitrification, a cryo-storage device of the disclosure can be designed to minimize the thermal path between a coolant, such as liquid nitrogen, and a cell, mass of a plurality of cells, and/or surrounding media. The thermal path between a coolant (e.g. liquid nitrogen) and a cell, mass of a plurality of cells, and/or surrounding media in a cryo-storage device can be minimized by, for example, lessening the wall thickness of a capillary element, lessening the cross-sectional area of a capillary element, lessening the diameter of the hollow portion (i.e. internal diameter) of a capillary element, lessening the volume of a capillary element, and/or lessening the diameter of a capillary element.

In some embodiments, the capillary element of a cryo-storage device has a hollow portion with a diameter of about 0.1 mm to about 2 mm. In some embodiments, the capillary element of a cryo-storage device has a hollow portion with a diameter of about 0.1 mm to about 0.2 mm, about 0.1 mm to about 0.3 mm, about 0.1 mm to about 0.4 mm, about 0.1 mm to about 0.5 mm, about 0.1 mm to about 0.6 mm, about 0.1 mm to about 0.7 mm, about 0.1 mm to about 0.8 mm, about 0.1 mm to about 0.9 mm, about 0.1 mm to about 1 mm, about 0.1 mm to about 1.5 mm, about 0.1 mm to about 2 mm, about 0.2 mm to about 0.3 mm, about 0.2 mm to about 0.4 mm, about 0.2 mm to about 0.5 mm, about 0.2 mm to about 0.6 mm, about 0.2 mm to about 0.7 mm, about 0.2 mm to about 0.8 mm, about 0.2 mm to about 0.9 mm, about 0.2 mm to about 1 mm, about 0.2 mm to about 1.5 mm, about 0.2 mm to about 2 mm, about 0.3 mm to about 0.4 mm, about 0.3 mm to about 0.5 mm, about 0.3 mm to about 0.6 mm, about 0.3 mm to about 0.7 mm, about 0.3 mm to about 0.8 mm, about 0.3 mm to about 0.9 mm, about 0.3 mm to about 1 mm, about 0.3 mm to about 1.5 mm, about 0.3 mm to about 2 mm, about 0.4 mm to about 0.5 mm, about 0.4 mm to about 0.6 mm, about 0.4 mm to about 0.7 mm, about 0.4 mm to about 0.8 mm, about 0.4 mm to about 0.9 mm, about 0.4 mm to about 1 mm, about 0.4 mm to about 1.5 mm, about 0.4 mm to about 2 mm, about 0.5 mm to about 0.6 mm, about 0.5 mm to about 0.7 mm, about 0.5 mm to about 0.8 mm, about 0.5 mm to about 0.9 mm, about 0.5 mm to about 1 mm, about 0.5 mm to about 1.5 mm, about 0.5 mm to about 2 mm, about 0.6 mm to about 0.7 mm, about 0.6 mm to about 0.8 mm, about 0.6 mm to about 0.9 mm, about 0.6 mm to about 1 mm, about 0.6 mm to about 1.5 mm, about 0.6 mm to about 2 mm, about 0.7 mm to about 0.8 mm, about 0.7 mm to about 0.9 mm, about 0.7 mm to about 1 mm, about 0.7 mm to about 1.5 mm, about 0.7 mm to about 2 mm, about 0.8 mm to about 0.9 mm, about 0.8 mm to about 1 mm, about 0.8 mm to about 1.5 mm, about 0.8 mm to about 2 mm, about 0.9 mm to about 1 mm, about 0.9 mm to about 1.5 mm, about 0.9 mm to about 2 mm, about 1 mm to about 1.5 mm, about 1 mm to about 2 mm, or about 1.5 mm to about 2 mm. In some embodiments, the capillary element of a cryo-storage device has a hollow portion with a diameter of about 0.1 mm, about 0.2 mm, about 0.3 mm, about 0.4 mm, about 0.5 mm, about 0.6 mm, about 0.7 mm, about 0.8 mm, about 0.9 mm, about 1 mm, about 1.5 mm, or about 2 mm. In some embodiments, the capillary element of a cryo-storage device has a hollow portion with a diameter of at least about 0.1 mm, at least about 0.2 mm, at least about 0.3 mm, at least about 0.4 mm, at least about 0.5 mm, at least about 0.6 mm, at least about 0.7 mm, at least about 0.8 mm, at least about 0.9 mm, at least about 1 mm, or at least about 1.5 mm. In some embodiments, the capillary element of a cryo-storage device has a hollow portion with a diameter of at most about 0.2 mm, at most about 0.3 mm, at most about 0.4 mm, at most about 0.5 mm, at most about 0.6 mm, at most about 0.7 mm, at most about 0.8 mm, at most about 0.9 mm, at most about 1 mm, at most about 1.5 mm, or at most about 2 mm.

In some embodiments, the hollow portion of a capillary element has an average diameter over the length of the hollow portion of about 0.1 mm to about 2 mm. In some embodiments, the hollow portion of a capillary element has an average diameter over the length of the hollow portion of about 0.1 mm to about 0.2 mm, about 0.1 mm to about 0.3 mm, about 0.1 mm to about 0.4 mm, about 0.1 mm to about 0.5 mm, about 0.1 mm to about 0.6 mm, about 0.1 mm to about 0.7 mm, about 0.1 mm to about 0.8 mm, about 0.1 mm to about 0.9 mm, about 0.1 mm to about 1 mm, about 0.1 mm to about 1.5 mm, about 0.1 mm to about 2 mm, about 0.2 mm to about 0.3 mm, about 0.2 mm to about 0.4 mm, about 0.2 mm to about 0.5 mm, about 0.2 mm to about 0.6 mm, about 0.2 mm to about 0.7 mm, about 0.2 mm to about 0.8 mm, about 0.2 mm to about 0.9 mm, about 0.2 mm to about 1 mm, about 0.2 mm to about 1.5 mm, about 0.2 mm to about 2 mm, about 0.3 mm to about 0.4 mm, about 0.3 mm to about 0.5 mm, about 0.3 mm to about 0.6 mm, about 0.3 mm to about 0.7 mm, about 0.3 mm to about 0.8 mm, about 0.3 mm to about 0.9 mm, about 0.3 mm to about 1 mm, about 0.3 mm to about 1.5 mm, about 0.3 mm to about 2 mm, about 0.4 mm to about 0.5 mm, about 0.4 mm to about 0.6 mm, about 0.4 mm to about 0.7 mm, about 0.4 mm to about 0.8 mm, about 0.4 mm to about 0.9 mm, about 0.4 mm to about 1 mm, about 0.4 mm to about 1.5 mm, about 0.4 mm to about 2 mm, about 0.5 mm to about 0.6 mm, about 0.5 mm to about 0.7 mm, about 0.5 mm to about 0.8 mm, about 0.5 mm to about 0.9 mm, about 0.5 mm to about 1 mm, about 0.5 mm to about 1.5 mm, about 0.5 mm to about 2 mm, about 0.6 mm to about 0.7 mm, about 0.6 mm to about 0.8 mm, about 0.6 mm to about 0.9 mm, about 0.6 mm to about 1 mm, about 0.6 mm to about 1.5 mm, about 0.6 mm to about 2 mm, about 0.7 mm to about 0.8 mm, about 0.7 mm to about 0.9 mm, about 0.7 mm to about 1 mm, about 0.7 mm to about 1.5 mm, about 0.7 mm to about 2 mm, about 0.8 mm to about 0.9 mm, about 0.8 mm to about 1 mm, about 0.8 mm to about 1.5 mm, about 0.8 mm to about 2 mm, about 0.9 mm to about 1 mm, about 0.9 mm to about 1.5 mm, about 0.9 mm to about 2 mm, about 1 mm to about 1.5 mm, about 1 mm to about 2 mm, or about 1.5 mm to about 2 mm. In some embodiments, the hollow portion of a capillary element has an average diameter over the length of the hollow portion of about 0.1 mm, about 0.2 mm, about 0.3 mm, about 0.4 mm, about 0.5 mm, about 0.6 mm, about 0.7 mm, about 0.8 mm, about 0.9 mm, about 1 mm, about 1.5 mm, or about 2 mm. In some embodiments, the hollow portion of a capillary element has an average diameter over the length of the hollow portion of at least about 0.1 mm, at least about 0.2 mm, at least about 0.3 mm, at least about 0.4 mm, at least about 0.5 mm, at least about 0.6 mm, at least about 0.7 mm, at least about 0.8 mm, at least about 0.9 mm, at least about 1 mm, or at least about 1.5 mm. In some embodiments, the hollow portion of a capillary element has an average diameter over the length of the hollow portion of at most about 0.2 mm, at most about 0.3 mm, at most about 0.4 mm, at most about 0.5 mm, at most about 0.6 mm, at most about 0.7 mm, at most about 0.8 mm, at most about 0.9 mm, at most about 1 mm, at most about 1.5 mm, or at most about 2 mm.

The hollow portion of a capillary element of the disclosure can have, for example, an elliptical, circular, rectangular, triangular, octagonal, pentangular, hexangular, or heptangular cross section. In some embodiments, the hollow portion of a capillary element of the disclosure has a cross-sectional area of about 0.03 $mm^2$ to about 5 $mm^2$. In some embodiments, the hollow portion of a capillary element of the disclosure has a cross-sectional area of about 0.03 $mm^2$ to about 0.05 $mm^2$, about 0.03 $mm^2$ to about 0.1 $mm^2$, about 0.03 $mm^2$ to about 0.5 $mm^2$, about 0.03 $mm^2$ to about 1 $mm^2$, about 0.03 $mm^2$ to about 1.5 $mm^2$, about 0.03 $mm^2$ to about 2 $mm^2$, about 0.03 $mm^2$ to about 2.5 $mm^2$, about 0.03 $mm^2$ to about 5 $mm^2$, about 0.05 $mm^2$ to about 0.1 $mm^2$, about 0.05 $mm^2$ to about 0.5 $mm^2$, about 0.05 $mm^2$ to about 1 $mm^2$, about 0.05 $mm^2$ to about 1.5 $mm^2$, about 0.05 $mm^2$ to about 2 $mm^2$, about 0.05 $mm^2$ to about 2.5 $mm^2$, about 0.05 $mm^2$ to about 5 $mm^2$, about 0.1 $mm^2$ to about 0.5 $mm^2$, about 0.1 $mm^2$ to about 1 $mm^2$, about 0.1 $mm^2$ to about 1.5 $mm^2$, about 0.1 $mm^2$ to about 2 $mm^2$, about 0.1 $mm^2$ to about 2.5 $mm^2$, about 0.1 $mm^2$ to about 5 $mm^2$, about 0.5 $mm^2$ to about 1 $mm^2$, about 0.5 $mm^2$ to about 1.5 $mm^2$, about 0.5 $mm^2$ to about 2 $mm^2$, about 0.5 $mm^2$ to about 2.5 $mm^2$, about 0.5 $mm^2$ to about 5 $mm^2$, about 1 $mm^2$ to about 1.5 $mm^2$, about 1 $mm^2$ to about 2 $mm^2$, about 1 $mm^2$ to about 2.5 $mm^2$, about 1 $mm^2$ to about 5 $mm^2$, about 1.5 $mm^2$ to about 2 $mm^2$, about 1.5 $mm^2$ to about 2.5 $mm^2$, about 1.5 $mm^2$ to about 5 $mm^2$, about 2 $mm^2$ to about 2.5 $mm^2$, about 2 $mm^2$ to about 5 $mm^2$, or about 2.5 $mm^2$ to about 5 $mm^2$. In some embodiments, the hollow portion of a capillary element of the disclosure has a cross-sectional area of about 0.03 $mm^2$, about 0.05 $mm^2$, about 0.1 $mm^2$, about 0.5 $mm^2$, about 1 $mm^2$, about 1.5 $mm^2$, about 2 $mm^2$, about 2.5 $mm^2$, or about 5 $mm^2$. In some embodiments, the hollow portion of a capillary element of the disclosure has a cross-sectional area of at least about 0.03 mm$^2$, at least about 0.05 mm$^2$, at least about 0.1 mm$^2$, at least about 0.5 mm$^2$, at least about 1 mm$^2$, at least about 1.5 mm$^2$, at least about 2 mm$^2$, or at least about 2.5 mm$^2$. In some embodiments, the hollow portion of a capillary element of the disclosure has a cross-sectional area of at most about 0.05 mm$^2$, at most about 0.1 mm$^2$, at most about 0.5 mm$^2$, at most about 1 mm$^2$, at most about 1.5 mm$^2$, at most about 2 mm$^2$, at most about 2.5 mm$^2$, or at most about 5 mm$^2$.

The diameter or average diameter of a capillary element (e.g. a cylindrical or about cylindrical capillary element) can be greater than the diameter of the hollow portion of a capillary element due to the thickness of the elongated body of the capillary element. In some embodiments, a capillary element of a cryo-storage device of the disclosure has a diameter of about 0.2 mm to about 2.5 mm. In some embodiments, a capillary element of a cryo-storage device of the disclosure has a diameter of about 0.2 mm to about 0.3 mm, about 0.2 mm to about 0.4 mm, about 0.2 mm to about 0.5 mm, about 0.2 mm to about 0.6 mm, about 0.2 mm to about 0.7 mm, about 0.2 mm to about 0.8 mm, about 0.2 mm to about 0.9 mm, about 0.2 mm to about 1 mm, about 0.2 mm to about 1.5 mm, about 0.2 mm to about 2 mm, about 0.2 mm to about 2.5 mm, about 0.3 mm to about 0.4 mm, about 0.3 mm to about 0.5 mm, about 0.3 mm to about 0.6 mm, about 0.3 mm to about 0.7 mm, about 0.3 mm to about 0.8 mm, about 0.3 mm to about 0.9 mm, about 0.3 mm to about 1 mm, about 0.3 mm to about 1.5 mm, about 0.3 mm to about 2 mm, about 0.3 mm to about 2.5 mm, about 0.4 mm to about 0.5 mm, about 0.4 mm to about 0.6 mm, about 0.4 mm to about 0.7 mm, about 0.4 mm to about 0.8 mm, about 0.4 mm to about 0.9 mm, about 0.4 mm to about 1 mm, about 0.4 mm to about 1.5 mm, about 0.4 mm to about 2 mm, about 0.4 mm to about 2.5 mm, about 0.5 mm to about 0.6 mm, about 0.5 mm to about 0.7 mm, about 0.5 mm to about 0.8 mm, about 0.5 mm to about 0.9 mm, about 0.5 mm to about 1 mm, about 0.5 mm to about 1.5 mm, about 0.5 mm to about 2 mm, about 0.5 mm to about 2.5 mm, about 0.6 mm to about 0.7 mm, about 0.6 mm to about 0.8 mm, about 0.6 mm to about 0.9 mm, about 0.6 mm to about 1 mm, about 0.6 mm to about 1.5 mm, about 0.6 mm to about 2 mm, about 0.6 mm to about 2.5 mm, about 0.7 mm to about 0.8 mm, about 0.7 mm to about 0.9 mm, about 0.7 mm to about 1 mm, about 0.7 mm to about 1.5 mm, about 0.7 mm to about 2 mm, about 0.7 mm to about 2.5 mm, about 0.8 mm to about 0.9 mm, about 0.8 mm to about 1 mm, about 0.8 mm to about 1.5 mm, about 0.8 mm to about 2 mm, about 0.8 mm to about 2.5 mm, about 0.9 mm to about 1 mm, about 0.9 mm to about 1.5 mm, about 0.9 mm to about 2 mm, about 0.9 mm to about 2.5 mm, about 1 mm to about 1.5 mm, about 1 mm to about 2 mm, about 1 mm to about 2.5 mm, about 1.5 mm to about 2 mm, about 1.5 mm to about 2.5 mm, or about 2 mm to about 2.5 mm. In some embodiments, a capillary element of a cryo-storage device of the disclosure has a diameter of about 0.2 mm, about 0.3 mm, about 0.4 mm, about 0.5 mm, about 0.6 mm, about 0.7 mm, about 0.8 mm, about 0.9 mm, about 1 mm, about 1.5 mm, about 2 mm, or about 2.5 mm. In some embodiments, a capillary element of a cryo-storage device of the disclosure has a diameter of at least about 0.2 mm, at least about 0.3 mm, at least about 0.4 mm, at least about 0.5 mm, at least about 0.6 mm, at least about 0.7 mm, at least about 0.8 mm, at least about 0.9 mm, at least about 1 mm, at least about 1.5 mm, or at least about 2 mm. In some embodiments, a capillary element of a cryo-storage device of the disclosure has a diameter of at most about 0.3 mm, at most about 0.4 mm, at most about 0.5 mm, at most about 0.6 mm, at most about 0.7 mm, at most about 0.8 mm, at most about 0.9 mm, at most about 1 mm, at most about 1.5 mm, at most about 2 mm, or at most about 2.5 mm.

In some embodiments, a capillary element of a cryo-storage device of the disclosure has an average diameter over the length of the capillary element of about 0.2 mm to about 2.5 mm. In some embodiments, a capillary element of a cryo-storage device of the disclosure has an average diameter over the length of the capillary element of about 0.2 mm to about 0.3 mm, about 0.2 mm to about 0.4 mm, about 0.2 mm to about 0.5 mm, about 0.2 mm to about 0.6 mm, about 0.2 mm to about 0.7 mm, about 0.2 mm to about 0.8 mm, about 0.2 mm to about 0.9 mm, about 0.2 mm to about 1 mm, about 0.2 mm to about 1.5 mm, about 0.2 mm to about 2 mm, about 0.2 mm to about 2.5 mm, about 0.3 mm to about 0.4 mm, about 0.3 mm to about 0.5 mm, about 0.3 mm to about 0.6 mm, about 0.3 mm to about 0.7 mm, about 0.3 mm to about 0.8 mm, about 0.3 mm to about 0.9 mm, about 0.3 mm to about 1 mm, about 0.3 mm to about 1.5 mm, about 0.3 mm to about 2 mm, about 0.3 mm to about 2.5 mm, about 0.4 mm to about 0.5 mm, about 0.4 mm to about 0.6 mm, about 0.4 mm to about 0.7 mm, about 0.4 mm to about 0.8 mm, about 0.4 mm to about 0.9 mm, about 0.4 mm to about 1 mm, about 0.4 mm to about 1.5 mm, about 0.4 mm to about 2 mm, about 0.4 mm to about 2.5 mm, about 0.5 mm to about 0.6 mm, about 0.5 mm to about 0.7 mm, about 0.5 mm to about 0.8 mm, about 0.5 mm to about 0.9 mm, about 0.5 mm to about 1 mm, about 0.5 mm to about 1.5 mm, about 0.5 mm to about 2 mm, about 0.5 mm to about 2.5 mm, about 0.6 mm to about 0.7 mm, about 0.6 mm to about 0.8 mm, about 0.6 mm to about 0.9 mm, about 0.6 mm to about 1 mm, about 0.6 mm to about 1.5 mm, about 0.6 mm to about 2 mm, about 0.6 mm to about 2.5 mm, about 0.7 mm to about 0.8 mm, about 0.7 mm to about 0.9 mm, about 0.7 mm to about 1 mm, about 0.7 mm to about 1.5 mm, about 0.7 mm to about 2 mm, about 0.7 mm to about 2.5 mm, about 0.8 mm to about 0.9 mm, about 0.8 mm to about 1 mm, about 0.8 mm to about 1.5 mm, about 0.8 mm to about 2 mm, about 0.8 mm to about 2.5 mm, about 0.9 mm to about 1 mm, about 0.9 mm to about 1.5 mm, about 0.9 mm to about 2 mm, about 0.9 mm to about 2.5 mm, about 1 mm to about 1.5 mm, about 1 mm to about 2 mm, about 1 mm to about 2.5 mm, about 1.5 mm to about 2 mm, about 1.5 mm to about 2.5 mm, or about 2 mm to about 2.5 mm. In some embodiments, a capillary element of a cryo-storage device of the disclosure has an average diameter over the length of the capillary element of about 0.2 mm, about 0.3 mm, about 0.4 mm, about 0.5 mm, about 0.6 mm, about 0.7 mm, about 0.8 mm, about 0.9 mm, about 1 mm, about 1.5 mm, about 2 mm, or about 2.5 mm. In some embodiments, a capillary element of a cryo-storage device of the disclosure has an average diameter over the length of the capillary element of at least about 0.2 mm, at least about 0.3 mm, at least about 0.4 mm, at least about 0.5 mm, at least about 0.6 mm, at least about 0.7 mm, at least about 0.8 mm, at least about 0.9 mm, at least about 1 mm, at least about 1.5 mm, or at least about 2 mm. In some embodiments, a capillary element of a cryo-storage device of the disclosure has an average diameter over the length of the capillary element of at most about 0.3 mm, at most about 0.4 mm, at most about 0.5 mm, at most about 0.6 mm, at most about 0.7 mm, at most about 0.8 mm, at most about 0.9 mm, at most about 1 mm, at most about 1.5 mm, at most about 2 mm, or at most about 2.5 mm.

A capillary element of the disclosure can have, for example, an elliptical, circular, rectangular, triangular, octagonal, pentangular, hexangular, or heptangular cross section. A capillary element with a small cross-sectional area can promote increased cooling and warming rates of contents (e.g. media, oocytes, embryos) of a capillary element compared to a capillary element with a larger cross-sectional area. In some embodiments, a capillary element of the disclosure has a cross-sectional area of about 0.03 mm² to about 5 mm². In some embodiments, a capillary element of the disclosure has a cross-sectional area of about 0.03 mm² to about 0.05 mm², about 0.03 mm² to about 0.1 mm², about 0.03 mm² to about 0.5 mm², about 0.03 mm² to about 1 mm², about 0.03 mm² to about 1.5 mm², about 0.03 mm² to about 2 mm², about 0.03 mm² to about 2.5 mm², about 0.03 mm² to about 5 mm², about 0.05 mm² to about 0.1 mm², about 0.05 mm² to about 0.5 mm², about 0.05 mm² to about 1 mm², about 0.05 mm² to about 1.5 mm², about 0.05 mm² to about 2 mm², about 0.05 mm² to about 2.5 mm², about 0.05 mm² to about 5 mm², about 0.1 mm² to about 0.5 mm², about 0.1 mm² to about 1 mm², about 0.1 mm² to about 1.5 mm², about 0.1 mm² to about 2 mm², about 0.1 mm² to about 2.5 mm², about 0.1 mm² to about 5 mm² about 0.5 mm² to about 1 mm², about 0.5 mm² to about 1.5 mm², about 0.5 mm² to about 2 mm² about 0.5 mm² to about 2.5 mm², about 0.5 mm² to about 5 mm², about 1 mm² to about 1.5 mm², about 1 mm² to about 2 mm², about 1 mm² to about 2.5 mm², about 1 mm² to about 5 mm², about 1.5 mm² to about 2 mm², about 1.5 mm² to about 2.5 mm², about 1.5 mm² to about 5 mm², about 2 mm² to about 2.5 mm², about 2 mm² to about 5 mm², or about 2.5 mm² to about 5 mm². In some embodiments, a capillary element of the disclosure has a cross-sectional area of about 0.03 mm², about 0.05 mm², about 0.1 mm², about 0.5 mm², about 1 mm², about 1.5 mm², about 2 mm², about 2.5 mm², or about 5 mm². In some embodiments, a capillary element of the disclosure has a cross-sectional area of at least about 0.03 mm², at least about 0.05 mm², at least about 0.1 mm², at least about 0.5 mm², at least about 1 mm², at least about 1.5 mm², at least about 2 mm², or at least about 2.5 mm². In some embodiments, a capillary element of the disclosure has a cross-sectional area of at most about 0.05 mm², at most about 0.1 mm², at most about 0.5 mm², at most about 1 mm², at most about 1.5 mm², at most about 2 mm², at most about 2.5 mm², or at most about 5 mm².

In some embodiments, the volume of a capillary element of the disclosure is about 0.1 µL to about 5 µL. In some embodiments, the volume of a capillary element of the disclosure is about 0.1 µL to about 0.2 µL, about 0.1 µL to about 0.4 µL, about 0.1 µL, to about 0.6 µL, about 0.1 µL to about 0.8 µL, about 0.1 µL to about 1 µL, about 0.1 µL to about 1.2 µL, about 0.1 µL to about 1.4 µL, about 0.1 µL to about 1.6 µL, about 0.1 µL to about 1.8 µL, about 0.1 µL to about 2 µL, about 0.1 µL to about 5 µL, about 0.2 µL to about 0.4 µL, about 0.2 µL to about 0.6 µL, about 0.2 µL to about 0.8 µL, about 0.2 µL to about 1 µL, about 0.2 µL to about 1.2 µL, about 0.2 µL to about 1.4 µL, about 0.2 µL to about 1.6 µL, about 0.2 µL to about 1.8 µL, about 0.2 µL to about 2 µL, about 0.2 µL to about 5 µL, about 0.4 µL to about 0.6 µL, about 0.4 µL to about 0.8 µL, about 0.4 µL to about 1 µL, about 0.4 µL to about 1.2 µL, about 0.4 µL to about 1.4 µL, about 0.4 µL to about 1.6 µL, about 0.4 µL to about 1.8 µL, about 0.4 µL to about 2 µL, about 0.4 µL to about 5 µL, about 0.6 µL to about 0.8 µL, about 0.6 µL to about 1 µL, about 0.6 µL to about 1.2 µL, about 0.6 µL to about 1.4 µL, about 0.6 µL to about 1.6 µL, about 0.6 µL to about 1.8 µL, about 0.6 µL to about 2 µL, about 0.6 µL to about 5 µL, about 0.8 µL to about 1 µL, about 0.8 µL to about 1.2 µL, about 0.8 µL to about 1.4 µL, about 0.8 µL to about 1.6 µL, about 0.8 µL to about 1.8 µL, about 0.8 µL to about 2 µL, about 0.8 µL to about 5 µL, about 1 µL to about 1.2 µL, about 1 µL to about 1.4 µL, about 1 µL to about 1.6 µL, about 1 µL to about 1.8 µL, about 1 µL to about 2 µL, about 1 µL to about 5 µL, about 1.2 µL to about 1.4 µL, about 1.2 µL to about 1.6 µL, about 1.2 µL to about 1.8 µL, about 1.2 µL to about 2 µL, about 1.2 µL to about 5 µL, about 1.4 µL to about 1.6 µL, about 1.4 µL to about 1.8 µL, about 1.4 µL to about 2 µL, about 1.4 µL to about 5 µL, about 1.6 µL to about 1.8 µL, about 1.6 µL to about 2 µL, about 1.6 µL to about 5 µL, about 1.8 µL to about 2 µL, about 1.8 µL to about 5 µL, or about 2 µL to about 5 µL. In some embodiments, the volume of a capillary element of the disclosure is about 0.1 µL, about 0.2 µL, about 0.4 µL, about 0.6 µL, about 0.8 µL, about 1 µL, about 1.2 µL, about 1.4 µL, about 1.6 µL, about 1.8 µL, about 2 µL, or about 5 µL. In some embodiments, the volume of a capillary element of the disclosure is at least about 0.1 µL, at least about 0.2 µL, about 0.4 µL, about 0.6 µL, about 0.8 µL, about 1 µL, about 1.2 µL, about 1.4 µL, about 1.6 µL, about 1.8 µL, or about 2 µL. In some embodiments, the volume of a capillary element of the disclosure is at most about 0.2 µL, at most about 0.4 µL, at most about 0.6 µL, at most about 0.8 µL, at most about 1 µL, at most about 1.2 µL, at most about 1.4 µL, at most about 1.6 µL, at most about 1.8 µL, at most about 2 µL, or at most about 5 µL.

The thickness of the elongated body of a capillary element (i.e. wall thickness of the capillary element), can influence the cooling and warming rates of the contents (e.g. media, oocytes, embryos) of a capillary element. For example, a capillary element with a thinner wall (i.e. smaller wall thickness) can allow for increased heating/cooling rates compared to a capillary element with a thicker wall (i.e. larger wall thickness). Increasing heating/cooling rates can reduce the formation of ice crystals around an embryo and increase embryo viability. In some embodiments, a capillary element has a wall thickness of about 0.25 mm to about 2 mm. In some embodiments, a capillary element has a wall thickness of about 0.25 mm to about 0.5 mm, about 0.25 mm to about 0.75 mm, about 0.25 mm to about 1 mm, about 0.25 mm to about 1.25 mm, about 0.25 mm to about 1.5 mm, about 0.25 mm to about 2 mm, about 0.5 mm to about 0.75 mm, about 0.5 mm to about 1 mm, about 0.5 mm to about 1.25 mm, about 0.5 mm to about 1.5 mm, about 0.5 mm to about 2 mm, about 0.75 mm to about 1 mm, about 0.75 mm to about 1.25 mm, about 0.75 mm to about 1.5 mm, about 0.75 mm to about 2 mm, about 1 mm to about 1.25 mm, about 1 mm to about 1.5 mm, about 1 mm to about 2 mm, about 1.25 mm to about 1.5 mm, about 1.25 mm to about 2 mm, or about 1.5 mm to about 2 mm. In some embodiments, a capillary element has a wall thickness of about 0.25 mm, about 0.5 mm, about 0.75 mm, about 1 mm, about 1.25 mm, about 1.5 mm, or about 2 mm. In some embodiments, a capillary element has a wall thickness of at least about 0.25 mm, at least about 0.5 mm, at least about 0.75 mm, at least about 1 mm, at least about 1.25 mm, or at least about 1.5 mm. In some embodiments, a capillary element has a wall thickness of at most about 0.5 mm, at most about 0.75 mm, at most about 1 mm, at most about 1.25 mm, at most about 1.5 mm, or at most about 2 mm.

Methods of Use.

Provided herein are methods of using a cryo-storage device of the disclosure. A cryo-storage device disclosed herein can be used throughout multiple steps of the vitrification and/or warming process. For example, a device can intake one or more cells/masses of pluralities of cells, be inserted into liquid nitrogen to vitrify the one or more cells/masses of pluralities of cells, undergo warming to de-vitrify the one or more cells/masses of pluralities of cells, and unload the one or more cells/masses of pluralities of cells. In some embodiments, a cryo-storage device of the disclosure can be used without the need for ancillary devices such as custom holders, actuators, or pipettes. In some embodiments, a heat-sealer is used to seal the tip of the capillary element of a cryo-storage device after one or more cells/masses of pluralities of cells are loaded into the device. In some embodiments, a cutting device such as a blade, or pair of scissors is used to cut a previously sealed capillary element just prior to the unloading of one or more cells/masses of pluralities of cells from the device.

In some embodiments, a cryo-storage device of the disclosure is handled manually by a user during the vitrification and/or warming process. Use of a cryo-storage device disclosed herein can reduce the likelihood of human error causing damage to a cell or mass of a plurality of cells during the vitrification or warming process.

Vitrification: High cooling and warming rates can promote a successful vitrification process. High cooling and warming rates can, for example, overcome the problems of ice formation and recrystallization. In some embodiments, use of a cryo-storage device disclosed herein can achieve high cooling rates during the vitrification process. In some embodiments, a method of vitrification disclosed herein comprises:

(A) loading a cryo-storage device of the disclosure by:
  (i) introducing the tip of the capillary element into cryoprotectant media containing one or more cells or masses of pluralities of cells;
  (ii) displacing the slidable plunger so that the capillary element aspirates the media and the cells or masses of pluralities of cells contained therein; thereby generating a loaded section of the capillary element; and
(B) submerging the loaded section of the capillary element into a coolant (e.g. liquid nitrogen).

In some embodiments, a method of vitrification disclosed herein further comprises loading a small volume of air into the capillary element after the media and cells or masses of pluralities of cells have been aspirated and/or sealing a section of the capillary element (e.g. the top of the capillary element) to form a closed system prior to submerging the cryo-storage device into the coolant (e.g. liquid nitrogen). The tip of the capillary element can be sealed by, for example, using heat (heat sealing) or using a cover or sheath. In some embodiments, a capillary element is sealed (e.g. heat sealed) to generate a seal located between the bottom end of the capillary elements and the content within the hollow portion of the capillary element. In some embodiments, the one or more cells/masses of pluralities of cells undergo a cryoprotectant exchange before introduction of the capillary into the cryoprotectant media.

In some embodiments, a small volume of air can be loaded prior to loading the cryo-storage device with one or more cells or masses of pluralities of cells to ensure no direct contact between the plunger and the media. Additionally, or alternatively, a cryo-storage device can be loaded with additional media such as warming media to facilitate the warming process and allow warming media and cells/masses of pluralities of cells to be retrieved together. In some embodiments the cryoprotectant media and the additional media (e.g. warming media) can be buffered by air gaps within a capillary element. In some embodiments, after sealing the device by heating, a sheath or cover can be used to further protect the capillary element.

A method disclosed herein can achieve high average cooling rates, which can facilitate the success of the vitrification process by reducing the formation of ice crystals. For example, a volume of media, when contained within a capillary element of the disclosure can cool at an average rate of about 200° C./minute to about 30,000° C./minute upon submersion of the section of the capillary element containing the media into a coolant such as liquid nitrogen. In some embodiments, submerging a capillary element of the disclosure loaded with media into a coolant cools the media at an average rate of about 200° C./min to about 30,000° C./min. In some embodiments, submerging a capillary element of the disclosure loaded with media into a coolant cools the media at an average rate of about 200° C./min to about 900° C./min, about 200° C./min to about 1,500° C./min, about 200° C./min to about 3,000° C./min, about 200° C./min to about 4,500° C./min, about 200° C./min to about 6,000° C./min, about 200° C./min to about 12,000° C./min, about 200° C./min to about 15,000° C./min, about 200° C./min to about 17,750° C./min, about 200° C./min to about 20,000° C./min, about 900° C./min to about 1,500° C./min, about 900° C./min to about 3,000° C./min, about 900° C./min to about 4,500° C./min, about 900° C./min to about 6,000° C./min, about 900° C./min to about 12,000° C./min, about 900° C./min to about 15,000° C./min, about 900° C./min to about 17,750° C./min, about 900° C./min to about 30,000° C./min, about 1,500° C./min to about 3,000° C./min, about 1,500° C./min to about 4,500° C./min, about 1,500° C./min to about 6,000° C./min, about 1,500° C./min to about 12,000° C./min, about 1,500° C./min to about 15,000° C./min, about 1,500° C./min to about 17,750° C./min, about 1,500° C./min to about 20,000° C./min, about 3,000° C./min to about 4,500° C./min, about 3,000° C./min to about 6,000° C./min, about 3,000° C./min to about 12,000° C./min, about 3,000° C./min to about 15,000° C./min, about 3,000° C./min to about 17,750° C./min, about 3,000° C./min to about 20,000° C./min, about 4,500° C./min to about 6,000° C./min, about 4,500° C./min to about 12,000° C./min, about 4,500° C./min to about 15,000° C./min, about 4,500° C./min to about 17,750° C./min, about 4,500° C./min to about 20,000° C./min, about 6,000° C./min to about 12,000° C./min, about 6,000° C./min to about 15,000° C./min, about 6,000° C./min to about 17,750° C./min, about 6,000° C./min to about 20,000° C./min, about 12,000° C./min to about 15,000° C./min, about 12,000° C./min to about 17,750° C./min, about 12,000° C./min to about 20,000° C./min, about 15,000° C./min to about 17,750° C./min, about 15,000° C./min to about 20,000° C./min, or about 17,750° C./min to about 20,000° C./min. In some embodiments, submerging a capillary element of the disclosure loaded with media into a coolant cools the media at an average rate of about 200° C./min, about 900° C./min, about 1,500° C./min, about 3,000° C./min, about 4,500° C./min, about 6,000° C./min, about 12,000° C./min, about 15,000° C./min, about 17,750° C./min, or about 20,000° C./min. In some embodiments, submerging a capillary element of the disclosure loaded with media into a coolant cools the media at an average rate of at least about 200° C./min, at least about 900° C./min, at least about 1,500° C./min, at least about 3,000° C./min, at least about 4,500° C./min, at least about 6,000° C./min, at least about 12,000° C./min, at least about 15,000° C./min, or at least about 17,750° C./min. In some embodiments, submerging a capillary element of the disclosure loaded with media into a coolant cools the media at an average rate of at most about 900° C./min, at most about 1,500° C./min, at most about 3,000° C./min, at most about 4,500° C./min, at most about 6,000° C./min, at most about 12,000° C./min, at most about 15,000° C./min, at most about 17,750° C./min, or at most about 30,000° C./min.

In some embodiments, a method disclosed herein comprises cooling the media inside of a capillary element at an average rate of about 200° C./min to about 30,000° C./min. In some embodiments, a method disclosed herein comprises cooling the media inside of a capillary element at an average rate of about 200° C./min to about 900° C./min, about 200° C./min to about 1,500° C./min, about 200° C./min to about 3,000° C./min, about 200° C./min to about 4,500° C./min, about 200° C./min to about 6,000° C./min, about 200° C./min to about 12,000° C./min, about 200° C./min to about 15,000° C./min, about 200° C./min to about 17,750° C./min, about 200° C./min to about 20,000° C./min, about 900° C./min to about 1,500° C./min, about 900° C./min to about 3,000° C./min, about 900° C./min to about 4,500° C./min, about 900° C./min to about 6,000° C./min, about 900° C./min to about 12,000° C./min, about 900° C./min to about 15,000° C./min, about 900° C./min to about 17,750° C./min, about 900° C./min to about 30,000° C./min, about 1,500° C./min to about 3,000° C./min, about 1,500° C./min to about 4,500° C./min, about 1,500° C./min to about 6,000° C./min, about 1,500° C./min to about 12,000° C./min, about 1,500° C./min to about 15,000° C./min, about 1,500° C./min to about 17,750° C./min, about 1,500° C./min to about 20,000° C./min, about 3,000° C./min to about 4,500° C./min, about 3,000° C./min to about 6,000° C./min, about 3,000° C./min to about 12,000° C./min, about 3,000° C./min to about 15,000° C./min, about 3,000° C./min to about 17,750° C./min, about 3,000° C./min to about 20,000° C./min, about 4,500° C./min to about 6,000° C./min, about 4,500° C./min to about 12,000° C./min, about 4,500° C./min to about 15,000° C./min, about 4,500° C./min to about 17,750° C./min, about 4,500° C./min to about 20,000° C./min, about 6,000° C./min to about 12,000° C./min, about 6,000° C./min to about 15,000° C./min, about 6,000° C./min to about 17,750° C./min, about 6,000° C./min to about 20,000° C./min, about 12,000° C./min to about 15,000° C./min, about 12,000° C./min to about 17,750° C./min, about 12,000° C./min to about 20,000° C./min, about 15,000° C./min to about 17,750° C./min, about 15,000° C./min to about 20,000° C./min, or about 17,750° C./min to about 20,000° C./min.

In some embodiments, a method disclosed herein comprises cooling the media inside of a capillary element at an average rate of about 200° C./min, about 900° C./min, about 1,500° C./min, about 3,000° C./min, about 4,500° C./min, about 6,000° C./min, about 12,000° C./min, about 15,000° C./min, about 17,750° C./min, or about 20,000° C./min. In some embodiments, a method disclosed herein comprises cooling the media inside of a capillary element at an average rate of at least about 200° C./min, at least about 900° C./min, at least about 1,500° C./min, at least about 3,000° C./min, at least about 4,500° C./min, at least about 6,000° C./min, at least about 12,000° C./min, at least about 15,000° C./min, or at least about 17,750° C./min. In some embodiments, a method disclosed herein comprises cooling the media inside of a capillary element at an average rate of at most about 900° C./min, at most about 1,500° C./min, at most about 3,000° C./min, at most about 4,500° C./min, at most about 6,000° C./min, at most about 12,000° C./min, at most about 15,000° C./min, at most about 17,750° C./min, or at most about 30,000° C./min.

Warming: High warming rates can overcome the problem of recrystallization during the warming process. In some embodiments, use of a cryo-storage device disclosed herein can achieve high warming rates. In some embodiments, a capillary element (or portion thereof) containing vitrified media and a cell or mass of plurality of cells is submerged in a water bath to facilitate warming of the contents of the capillary element. In some embodiments, the capillary element is moved in a repetitive motion while at least partially submerged in the water bath. The water bath can contain a liquid with a temperature of, for example 37° C. In some embodiments, the content of a capillary element is warmed via direct delivery of the contents (e.g. an oocyte or embryo) into an initial thawing solution (e.g. warming solution). Following delivery of the contents to a thawing solution, the contents can be subjected to decreasing concentrations of CPAs in solution. An initial thawing solution can have a volume of, for example, about 1 mL to about 4 mL.

In some embodiments, a method of warming a cell and/or mass of a plurality of cells that are stored in a cry-storage device of the disclosure that is submerged in coolant comprises:

(A) removing the cryo-storage device from the coolant (e.g. liquid nitrogen);
(B) submerging the loaded section of the capillary element directly into a bath of liquid (e.g. heated liquid);
(C) retracting and/or removing any protective cover or sheath that is present; and
(D) expelling the media containing cells or masses of pluralities of cells e.g. by pushing or moving the slidable plunger of the cryo-storage device (e.g. by pushing a displacement mechanism controlling the position of the slidable plunger).

In some embodiments, the media containing one or more cells or masses of pluralities of cells loaded in a of the device is allowed to warm to above 10° C. prior to expelling the media and cells or masses of pluralities of cells from the device. In some embodiments, the cryo-storage device has a sealed tip that is cut through an air volume to allow for the expulsion of media and cells or masses of pluralities of cells from the device. In some embodiments, the method comprises drying the sides of the cryo-storage device.

After warming steps and expulsion, a cell or masses of pluralities of cells can be subjected to the desired method for rehydrating and/or cleaning cells prior subsequent cell processing (e.g. oocyte fertilization, embryo transfer, embryo culture, etc.).

A method disclosed herein can achieve high warming rates, which can facilitate the success of the thawing process following vitrification by preventing recrystallization of liquids during the thawing process. For example, a volume of media, when contained within a capillary element of the disclosure, can warm at an average rate of about 10,000° C./minute to about 50,000° C./minute upon submersion of the section of the capillary element containing the media into a heated liquid. A liquid can have a temperature of, for example about 30° C., or about 37° C. In some embodiments, a liquid can have a temperature of at least about 30° C. or at least about 37° C. In some embodiments, submerging a capillary element of the disclosure loaded with media into a heated liquid warms the media at an average rate of about 10,000° C./min to about 50,000° C./min. In some embodiments, submerging a capillary element of the disclosure loaded with media into a heated liquid warms the media at an average rate of about 10,000° C./min to about 15,000° C./min, about 10,000° C./min to about 20,000° C./min, about 10,000° C./min to about 24,000° C./min, about 10,000° C./min to about 30,000° C./min, about 10,000° C./min to about 35,000° C./min, about 10,000° C./min to about 42,000° C./min, about 10,000° C./min to about 50,000° C./min, about 15,000° C./min to about 20,000° C./min, about 15,000° C./min to about 24,000° C./min, about 15,000° C./min to about 30,000° C./min, about 15,000° C./min to about 35,000° C./min, about 15,000° C./min to about 42,000° C./min, about 15,000° C./min to about 50,000° C./min, about 20,000° C./min to about 24,000° C./min, about 20,000° C./min to about 30,000° C./min, about 20,000° C./min to about 35,000° C./min, about 20,000° C./min to about 42,000° C./min, about 20,000° C./min to about 50,000° C./min, about 24,000° C./min to about 30,000° C./min, about 24,000° C./min to about 35,000° C./min, about 24,000° C./min to about 42,000° C./min, about 24,000° C./min to about 50,000° C./min, about 30,000° C./min to about 35,000° C./min, about 30,000° C./min to about 42,000° C./min, about 30,000° C./min to about 50,000° C./min, about 35,000° C./min to about 42,000° C./min, about 35,000° C./min to about 50,000° C./min, or about 42,000° C./min to about 50,000° C./min. In some embodiments, submerging a capillary element of the disclosure loaded with media into a heated liquid warms the media at an average rate of about 10,000° C./min, about 15,000° C./min, about 20,000° C./min, about 24,000° C./min, about 30,000° C./min, about 35,000° C./min, about 42,000° C./min, or about 50,000° C./min. In some embodiments, submerging a capillary element of the disclosure loaded with media into a heated liquid warms the media at an average rate of at least about 10,000° C./min, at least about 15,000° C./min, at least about 20,000° C./min, at least about 24,000° C./min, at least about 30,000° C./min, at least about 35,000° C./min, or at least about 42,000° C./min. In some embodiments, submerging a capillary element of the disclosure loaded with media into a heated liquid warms the media at an average rate of at most about 15,000° C./min, at most about 20,000° C./min, at most about 24,000° C./min, at most about 30,000° C./min, at most about 35,000° C./min, at most about 42,000° C./min, or at most about 50,000° C./min.

In some embodiments, a method disclosed herein comprises warming the media inside of a capillary element at an average rate of about 10,000° C./min to about 50,000° C./min. In some embodiments, a method disclosed herein comprises warming the media inside of a capillary element at an average rate of about 10,000° C./min to about 15,000° C./min, about 10,000° C./min to about 20,000° C./min, about 10,000° C./min to about 24,000° C./min, about 10,000° C./min to about 30,000° C./min, about 10,000° C./min to about 35,000° C./min, about 10,000° C./min to about 42,000° C./min, about 10,000° C./min to about 50,000° C./min, about 15,000° C./min to about 20,000° C./min, about 15,000° C./min to about 24,000° C./min, about 15,000° C./min to about 30,000° C./min, about 15,000° C./min to about 35,000° C./min, about 15,000° C./min to about 42,000° C./min, about 15,000° C./min to about 50,000° C./min, about 20,000° C./min to about 24,000° C./min, about 20,000° C./min to about 30,000° C./min, about 20,000° C./min to about 35,000° C./min, about 20,000° C./min to about 42,000° C./min, about 20,000° C./min to about 50,000° C./min, about 24,000° C./min to about 30,000° C./min, about 24,000° C./min to about 35,000° C./min, about 24,000° C./min to about 42,000° C./min, about 24,000° C./min to about 50,000° C./min, about 30,000° C./min to about 35,000° C./min, about 30,000° C./min to about 42,000° C./min, about 30,000° C./min to about 50,000° C./min, about 35,000° C./min to about 42,000° C./min, about 35,000° C./min to about 50,000° C./min, or about 42,000° C./min to about 50,000° C./min. In some embodiments, a method disclosed herein comprises warming the media inside of a capillary element at an average rate of about 10,000° C./min, about 15,000° C./min, about 20,000° C./min, about 24,000° C./min, about 30,000° C./min, about 35,000° C./min, about 42,000° C./min, or about 50,000° C./min. In some embodiments, a method disclosed herein comprises warming the media inside of a capillary element at an average rate of at least about 10,000° C./min, at least about 15,000° C./min, at least about 20,000° C./min, at least about 24,000° C./min, at least about 30,000° C./min, at least about 35,000° C./min, or at least about 42,000° C./min. In some embodiments, a method disclosed herein comprises warming the media inside of a capillary element at an average rate of at most about 15,000° C./min, at most about 20,000° C./min, at most about 24,000° C./min, at most about 30,000° C./min, at most about 35,000° C./min, at most about 42,000° C./min, or at most about 50,000° C./min.

Vitrification/warming volumes.

In some embodiments, the vitrification or warming process is performed using cryo-storage device of the disclosure with a capillary element loaded with a content comprising a volume of media and a cell or a mass of a plurality of cells. In some embodiments, the volume of media is about 0.1 μL to about 5 μL. In some embodiments, the volume of media is about 0.2 μL to about 0.4 μL, about 0.2 μL to about 0.6 μL, about 0.2 μL to about 0.8 μL, about 0.2 μL to about 1 μL, about 0.2 μL to about 1.2 μL, about 0.2 μL to about 1.4 μL, about 0.2 μL to about 1.8 μL, about 0.2 μL to about 1.8 μL, about 0.2 μL to about 2 μL, about 0.2 μL to about 5 μL, about 0.4 μL to about 0.6 μL, about 0.4 μL to about 0.8 μL, about 0.4 μL to about 1 μL, about 0.4 μL to about 1.2 μL, about 0.4 μL to about 1.4 μL, about 0.4 μL to about 1.8 μL, about 0.4 μL to about 1.8 μL, about 0.4 μL to about 2 μL, about 0.4 μL to about 5 μL, about 0.6 μL to about 0.8 μL, about 0.6 μL to about 1 μL, about 0.6 μL to about 1.2 μL, about 0.6 μL to about 1.4 μL, about 0.6 μL to about 1.8 μL, about 0.6 μL to about 1.8 μL, about 0.6 μL to about 2 μL, about 0.6 μL to about 5 μL, about 0.8 μL to about 1 μL, about 0.8 μL to about 1.2 μL, about 0.8 μL to about 1.4 μL, about 0.8 μL to about 1.8 μL, about 0.8 μL to about 1.8 μL, about 0.8 μL to about 2 μL about 0.8 μL, to about 5 μL, about 1 μL to about 1.2 μL, about 1 μL to about 1.4 μL, about 1 μL, to about 1.8 μL, about 1 μL, to about 1.8 μL, about 1 μL to about 2 μL, about 1 μL to about 5 μL, about 1.2 μL, to about 1.4 μL, about 1.2 μL to about 1.8 μL, about 1.2 μL to about 1.8 μL, about 1.2 μL to about 1.8 μL, about 1.2 μL to about 2 μL, about 1.2 μL to about 5 μL, about 1.4 μL to about 1.8 μL, about 1.4 μL to about 1.8 μL, about 1.4 μL, to about 2 μL, about 1.4 μL to about 5 μL, about 1.8 μL to about 1.8 μL, about 1.8 μL to about 2 μL, about 1.8 μL to about 5 μL, about 1.8 μL to about 2 μL, about 1.8 μL, to about 5 μL, or about 2 μL, to about 5 μL. In some embodiments, the volume of media is about 0.2 μL, about 0.4 μL, about 0.6 μL, about 0.8 μL, about 1 μL, about 1.2 μL, about 1.4 μL, about 1.8 μL, about 1.8 μL, about 2 μL, or about 5 μL. In some embodiments, the volume of media is at least about 0.2 μL, about 0.4 μL, about 0.6 μL, about 0.8 μL, about 1 μL, about 1.2 μL, about 1.4 μL, about 1.8 μL, about 1.8 μL, or about 2 μL. In some embodiments, the volume of media is at most about 0.4 μL, about 0.6 μL, about 0.8 μL, about 1 μL, about 1.2 μL, about 1.4 μL, about 1.8 μL, about 1.8 μL, about 2 μL, or about 5 μL.

In some embodiments, the volume of contents loaded within the capillary element is about 0.1 μL to about 5 μL. In some embodiments, the volume of contents loaded within the capillary element is about 0.2 μL, to about 0.4 μL, about 0.2 μL to about 0.6 μL, about 0.2 μL to about 0.8 μL, about 0.2 μL to about 1 μL, about 0.2 μL to about 1.2 μL, about 0.2

µL to about 1.4 µL, about 0.2 µL to about 1.8 µL, about 0.2 µL to about 1.8 µL, about 0.2 µL, to about 2 µL, about 0.2 µL to about 5 µL, about 0.4 µL, to about 0.6 µL, about 0.4 µL to about 0.8 µL, about 0.4 µL to about 1 µL, about 0.4 µL to about 1.2 µL, about 0.4 µL to about 1.4 µL, about 0.4 µL to about 1.8 µL, about 0.4 µL to about 1.8 µL, about 0.4 µL to about 2 µL, about 0.4 µL to about 5 µL, about 0.6 µL, to about 0.8 µL, about 0.6 µL to about 1 µL, about 0.6 µL to about 1.2 µL, about 0.6 µL to about 1.4 µL, about 0.6 µL, to about 1.8 µL, about 0.6 µL to about 1.8 µL, about 0.6 µL to about 2 µL, about 0.6 µL to about 5 µL, about 0.8 µL to about 1 µL, about 0.8 µL, to about 1.2 µL, about 0.8 µL to about 1.4 µL, about 0.8 µL, to about 1.8 µL, about 0.8 µL to about 1.8 µL, about 0.8 µL to about 2 µL, about 0.8 µL to about 5 µL, about 1 µL to about 1.2 µL, about 1 µL, to about 1.4 µL, about 1 µL, to about 1.8 µL, about 1 µL to about 1.8 µL, about 1 µL to about 2 µL, about 1 µL to about 5 µL, about 1.2 µL to about 1.4 µL, about 1.2 µL to about 1.8 µL, about 1.2 µL to about 1.8 µL, about 1.2 µL to about 2 µL, about 1.2 µL to about 5 µL, about 1.4 µL to about 1.8 µL, about 1.4 µL to about 1.8 µL, about 1.4 µL to about 2 µL, about 1.4 µL, to about 5 µL, about 1.8 µL to about 1.8 µL, about 1.8 µL, to about 2 µL, about 1.8 µL to about 5 µL, about 1.8 µL to about 2 µL, about 1.8 µL, to about 5 µL, or about 2 µL, to about 5 µL. In some embodiments, the volume of contents loaded within the capillary element is about 0.2 µL, about 0.4 µL, about 0.6 µL, about 0.8 µL, about 1 µL, about 1.2 µL, about 1.4 µL, about 1.8 µL, about 1.8 µL, about 2 µL, or about 5 µL. In some embodiments, the volume of contents loaded within the capillary element is at least about 0.2 µL, about 0.4 µL, about 0.6 µL, about 0.8 µL, about 1 µL, about 1.2 µL, about 1.4 µL, about 1.8 µL, about 1.8 µL, or about 2 µL. In some embodiments, the volume of contents loaded within the capillary element is at most about 0.4 µL, about 0.6 µL, about 0.8 µL, about 1 µL, about 1.2 µL, about 1.4 µL, about 1.8 µL, about 1.8 µL, about 2 µL, or about 5 µL.

Vitrification/warming media: Performing the vitrification process with cells or masses of pluralities of cells suspended in vitrification media can reduce the likelihood of damage to the cell or mass of a plurality of cells. Non-limiting examples of vitrification medias include Kitazato vitrification warming media, and cook medical IVF blastocyst vitrification kit warming media. In some embodiments, a vitrification media contains CPAs such as, for example, ethylene glycol, DMSO, sucrose or trehalose.

Controlled studies.

In some embodiments, a cryo-storage device of the disclosure is used in a controlled study. For example, vitrification media can be loaded into the cryo-storage device to generate a loaded section of the device. After the device is loaded the loaded section can be submerged in liquid nitrogen such that the liquid nitrogen does not contact the vitrification media and moved back and forth in a repetitive motion. Following the submersion and movement of the loaded section in the liquid nitrogen, the vitrification media can cool with an average rate of at least about 900° C./minute, 1,500° C./minute, 2,500° C./minute, or 4,500° C./minute. In some embodiments, a cryo-storage device of the disclosure is loaded with a content.

Kits.

In some embodiments, cryo-storage devices and/or other components disclosed herein are present in a kit. Non-limiting examples of devices and components that can be present in a kit include a cryo-storage device, a vessel containing content, a liquid nitrogen bath, an oocyte, an ovum, an embryo, a zygote, a blastocyst, a cumulus oocyte complex, a pipettor, a capillary element, a slidable plunger, and a capillary element-slidable plunger complex.

Automation of the Vitrification Process.

In some embodiments, a cryo-storage device of the disclosure can be used as part of, and/or interface with, a robotic system. Use of a cryo-storage device disclosed herein in conjunction with a robotic system can allow for automation of the vitrification process, the warming process, and/or subsets of the vitrification and warming processes. Automation of the vitrification and warming processes or subsets thereof can reduce the likelihood of human error occurring during such processes.

A cryo-storage device of the disclosure can interface with automated components to form a system. A system disclosed herein can comprise a cryo-storage device of the disclosure held firmly by an automated system. The automated system can, for example, control the movement of the cryo-storage device to specified. In some embodiments, features that allow the cryo-storage device to interface with automated components can be simple shapes incorporated on molded parts of the device, for example cylindrical portions, flat faces or indents which an automated system could reliably connect to. In some embodiments, a cryo-storage device with a rigid capillary element interfaces with an automated component. In some embodiments, use of a cryo-storage device with a rigid capillary element can allow more deterministic control of the position of the tip with respect to a cell or mass of a plurality of cells compared to a flexible capillary element. In some embodiments, a capillary element interfaced with automated components includes features to facilitate accurate location of the capillary element during the vitrification or warming process by an imaging system. These features can be, for example, fiducial marks or other well-defined features.

In some embodiments, a system of the disclosure allows for the automated unloading or loading of cells or masses of pluralities of cells to or from wells with a known location (e.g. wells of a 96 well plate or biochip) from or to the capillary element of a cryo-storage device of the disclosure. For example, a system of the disclosure can insert the bottom end of a capillary element into a well containing an embryo and a small volume of vitrification media. The design of the well can ensure that the embryo and vitrification media are located in a well-defined location. This feature can allow for reliable loading of the cell or mass of a plurality of cells without the need for an optical system. For example, the bottom of the well can be narrowed compared to the rest of the well, as shown in FIG. 1.

Computer systems: In some embodiments, an automated system of the disclosure is controlled by a computer system. For example, a computer system can control movement of a cryo-storage device by an automated system and accurate actuation of the plunger (e.g. slidable plunger) of the cryo-storage device by the system. In some embodiments, the computer system comprises a processor, a memory device, an operating system, and a software module for monitoring or operating the extruder. In some embodiments, the computer system comprises a digital processing device and includes one or more hardware central processing units (CPU). In further embodiments, the computer system includes an operating system configured to perform executable instructions. In some embodiments, the operating system is software, including programs and data, which manages the device's hardware and provides services for execution of applications. Suitable server operating systems include, by way of non-limiting examples, FreeBSD, OpenBSD, NetBSD®, Linux, Apple® Mac OS X Server®, Oracle® Solaris®, Windows Server®, and Novell® NetWare®. Suitable personal computer operating systems include, by way of non-limiting examples, Microsoft® Windows®, Apple® Mac OS X®, UNIX®, and UNIX-like operating systems such as GNU/Linux®. In some embodiments, the operating system is provided by cloud computing. In some embodiments a mobile smart phone operating system is used. Non-limiting examples of mobile smart phone operating systems include Nokia® Symbian® OS, Apple® iOS®, Research In Motion® BlackBerry OS®, Google® Android®, Microsoft® Windows Phone® OS, Microsoft® Windows Mobile® OS, Linux, and Palm® WebOS. In some embodiments, the computer system includes a storage and/or memory device. In some embodiments, the storage and/or memory device is one or more physical apparatuses used to store data or programs on a temporary or permanent basis. In some embodiments, the device is volatile memory and requires power to maintain stored information. In some embodiments, the device is non-volatile memory and retains stored information when the digital processing device is not powered. In some embodiments, the non-volatile memory comprises flash memory. In some embodiments, the non-volatile memory comprises dynamic random-access memory (DRAM). In some embodiments, the non-volatile memory comprises ferroelectric random access memory (FRAM). In some embodiments, the non-volatile memory comprises phase-change random access memory (PRAM). In some embodiments, the device is a storage device including, by way of non-limiting examples, CD-ROMs, DVDs, flash memory devices, magnetic disk drives, magnetic tapes drives, optical disk drives, and cloud computing-based storage. In some embodiments, the storage and/or memory device is a combination of devices such as those disclosed herein.

In some embodiments, the computer systems described herein include user interfaces. In further embodiments, the user interfaces include graphic user interfaces (GUIs), such as a Repetier-Host graphical user interface. In some embodiments, the user interfaces are interactive and present a user with menus and options for interacting with the computer systems and described herein. In further embodiments, the computer system includes a display screen to send visual information to a user. In some embodiments, the display is a cathode ray tube (CRT). In some embodiments, the display is a liquid crystal display (LCD). In further embodiments, the display is a thin film transistor liquid crystal display (TFT-LCD). In some embodiments, the display is an organic light emitting diode (OLED) display. In some embodiments, an OLED display is a passive-matrix OLED (PMOLED) or active-matrix OLED (AMOLED) display. In some embodiments, the display is a plasma display. In some embodiments, the display is a video projector. In some embodiments, the display is a combination of displays such as those disclosed herein. In some embodiments, the device includes an input device to receive information from a user. In some embodiments, the input device is a keyboard. In some embodiments, the input device is a key pad. In some embodiments, the input device is the display screen, which is a touch screen or a multi-touch screen. In some embodiments, the input device is a microphone to capture voice or other sound input. In some embodiments, the systems, and software modules disclosed herein are intranet-based. In some embodiments, the systems and software modules are Internet-based. In some embodiments, the computer systems and software modules are World Wide Web-based. In some embodiments, the computer systems and software modules are cloud computing-based. In some embodiments, the computer systems and software modules are based on data storage devices including, by way of non-limiting examples, CD-ROMs, DVDs, flash memory devices, RAM (e.g., DRAM, SRAM, etc.), ROM (e.g., PROM, EPROM, EEPROM, etc.), magnetic tape drives, magnetic disk drives, optical disk drives, magneto-optical drives, solid-state drives, and combinations thereof.

EXAMPLES

Example 1: Disposable Storage Device and Use Thereof

Figure 2A:
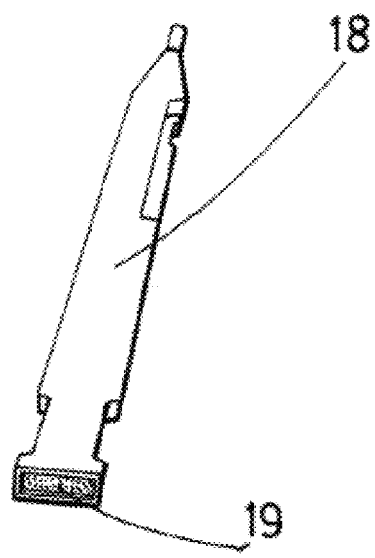
FIG. 2A shows an example of a disposable storage device according to the present disclosure.
Figure 2B:
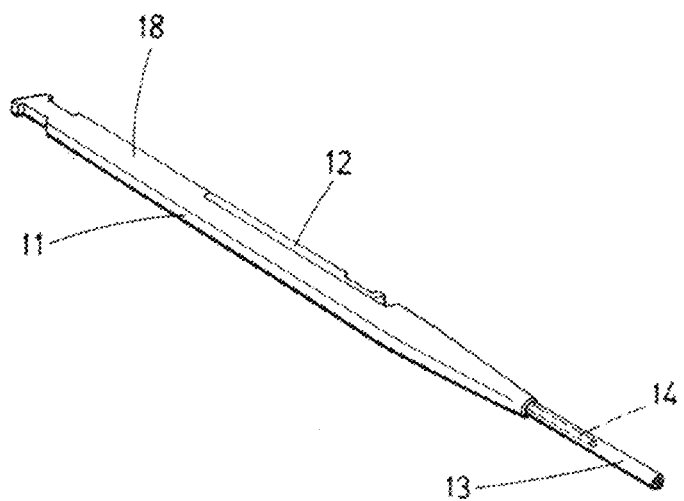
FIG. 2B shows another view of the storage device depicted in FIG. 2A.
Figure 3:
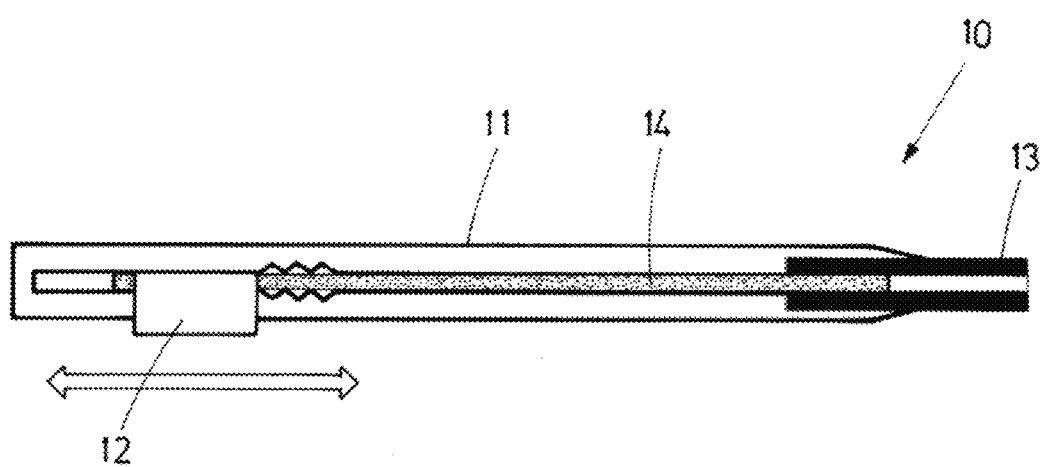
FIG. 3 shows a schematic cross section of the storage device depicted in FIG. 2A and FIG. 2B.

FIG. 2A, FIG. 2B, and FIG. 3 show a first embodiment of a disposable storage device (10) for oocytes and embryos during cryopreservation. The device comprises an elongated casing (11) with a capillary element (13) at one end of the casing (11), determining a volume to be loaded with oocytes, embryos, and/or cells, along with air and/or media. The device comprises a sliding plunger (14) fitting inside the capillary element (13). In some embodiments, the plunger is longer than the capillary therefore extending towards a second end of the casing. The device comprises a displacement mechanism (12) for moving the sliding plunger (14) along the capillary element (13). As shown in FIG. 3, the displacement mechanism (12) can be a sliding clip (12) with a grip for holding the plunger (14) and is movable along the casing (11). Other alternatives for the mechanism 12 can also be used. The device (10) comprises areas (18), (19) on the external surface for including information, for example notes, such as the patient name and date, or codes, such as bar codes that identify the patient and serve for data tracking.

Oocytes and/or embryos are loaded into the device (10). The oocytes and/or embryos are aspirated into the capillary (13) using the sliding clip (12) that is connected directly to the plunger (14). The sliding clip (12) is moved up and down the casing (11) within a limited range to control the aspiration. After the aspiration, the tip of the capillary element (13) on the first end of the casing is heated to seal the capillary element (13) and volume within. The capillary element (13) is made of plastic which facilitates the heat sealing. A cover or sheath can be used to protect further the capillary element (13).

Example 2: Spring-Loaded Storage Device

Figure 4:
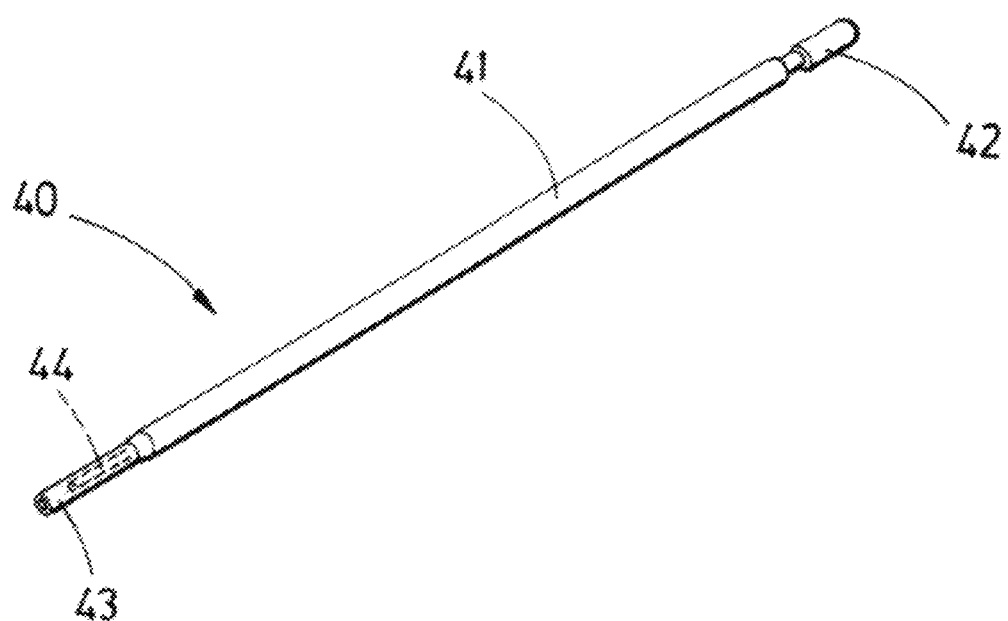
FIG. 4 shows a second example of a disposable storage device of the disclosure.
Figure 5:
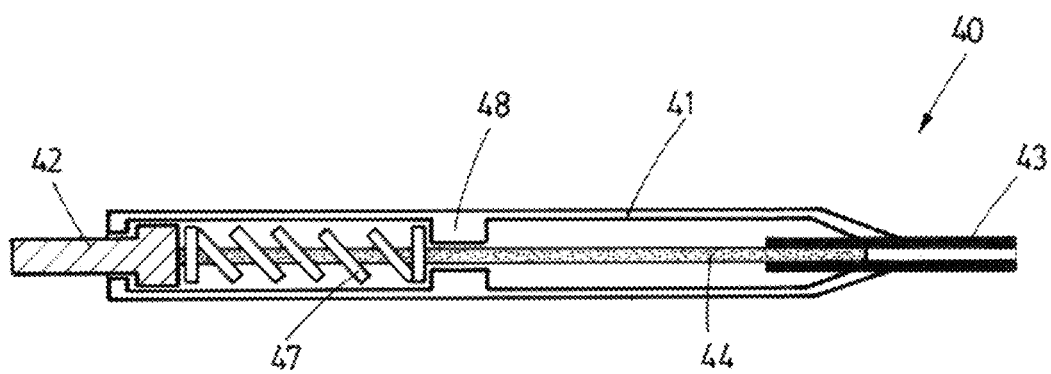
FIG. 5 shows a schematic cross section of the disposable storage device depicted in FIG. 4.

FIG. 4 and FIG. 5, show a second embodiment of a disposable storage device (40). The device is similar to the device depicted in FIG. 2A, FIG. 2B, and FIG. 3, but instead of being controlled by a sliding clip, the plunger is actuated by pressing a button (42). This storage device (40) comprises a casing (41), a latch mechanism with a pressing button (42), a plunger (44), a spring (47), a support (48) inside the casing (41) for the spring (47), and a capillary element (43). By pressing the button (42) the plunger moves and loads or unloads the volume in the capillary (43) in a controlled way.

Example 3: Storage Device with a Sliding Sheath

Figure 6A:
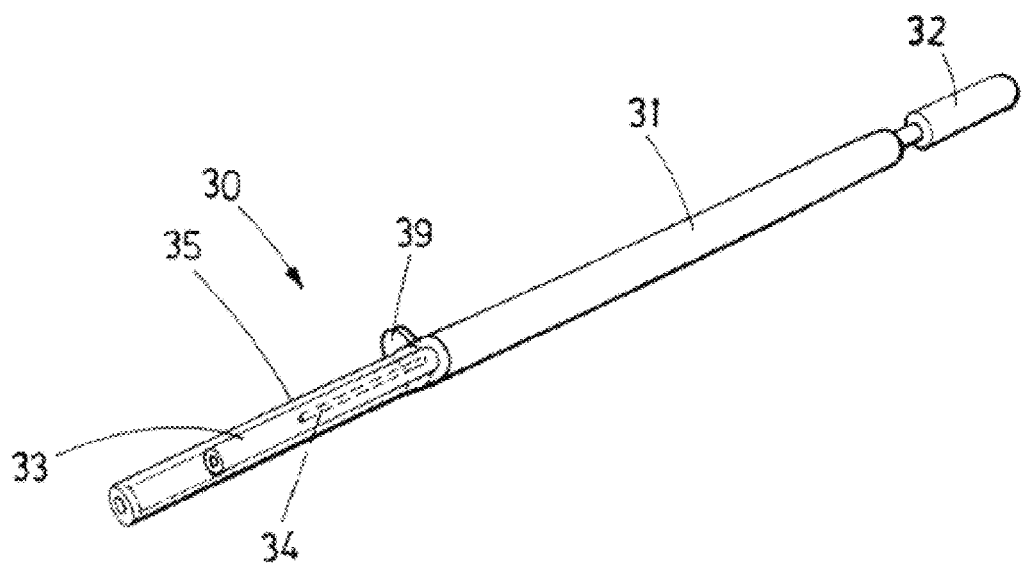
FIG. 6A shows a third example of a disposable storage device of the disclosure.
Figure 6B:
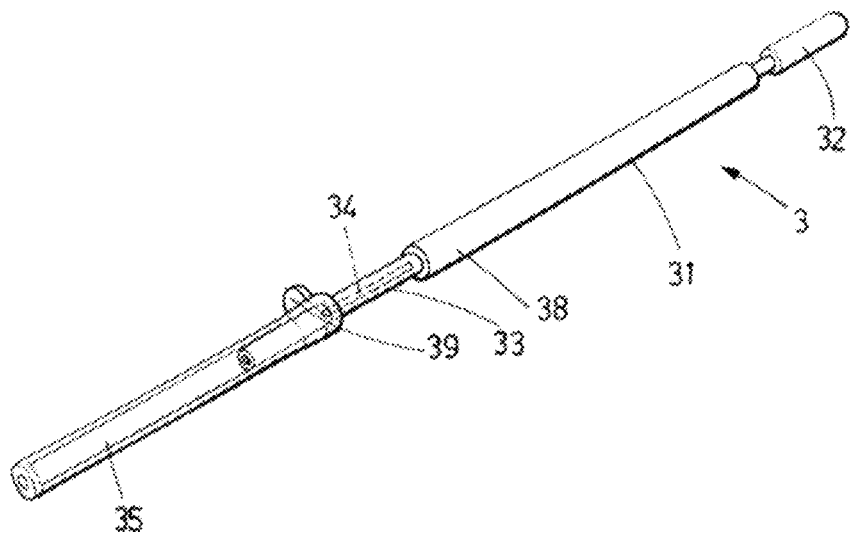
FIG. 6B shows the embodiment of FIG. 6A in the elongated state.
Figure 7:
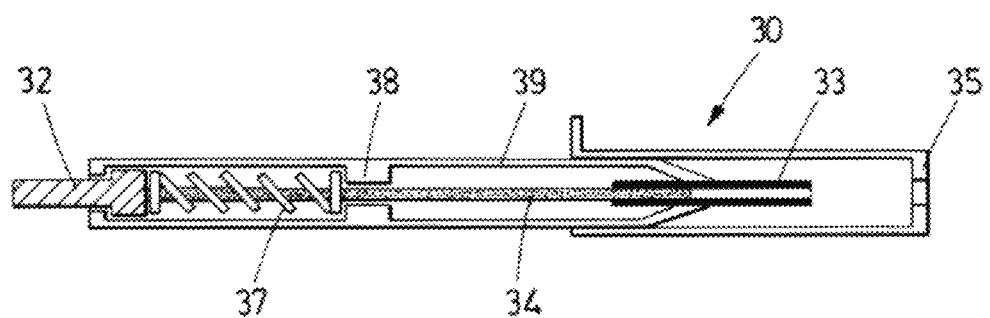
FIG. 7 shows a schematic cross section of the storage device depicted in FIG. 6A and FIG. 6B.

FIG. 6A, FIG. 6B, and FIG. 7 show a third embodiment of a disposable storage device (30) similar to the ones in the previous FIG. 4 and FIG. 5. This device (30) includes, in addition to the casing (31), a pressing button (32) connected to the plunger (34), a capillary element (33), a plunger (34), and a sliding sheath or cover (35) to move over the capillary element (33) and protect the same. The sliding sheath (35) comprises an appendage (39) to help the user to displace the sheath (35) along the casing (31). FIG. 6A shows the device (30) with the sheath (35) retracted, therefore not covering the capillary element (33) and FIG. 6B shows the device with the sheath (35) covering the capillary element (33).

Example 4: Device with a Reusable Component

Figure 8A:
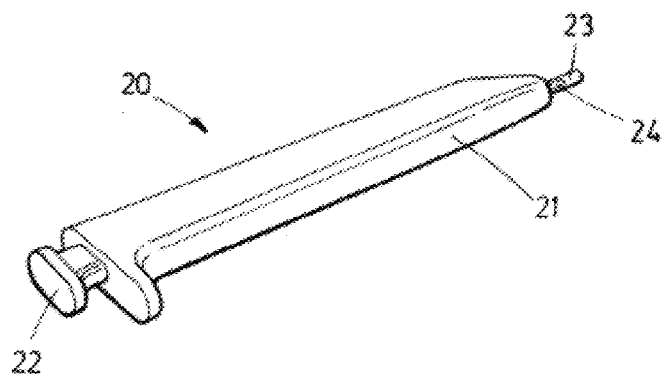
FIG. 8A shows an example of storage device with a disposable element inserted in a re-usable pipettor.
Figure 8B:
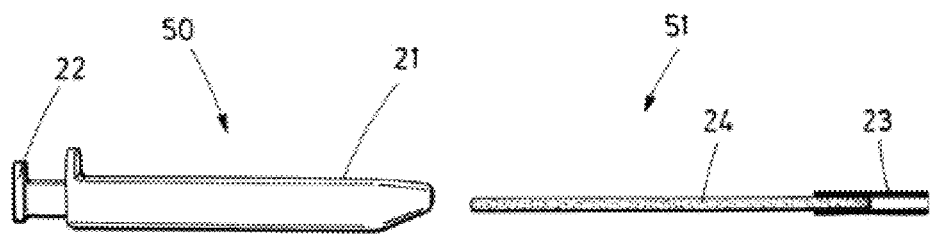
FIG. 8B shows the disposable element outside the re-usable pipettor of FIG. 8A.

In FIG. 8A, FIG. 8B, FIG. 8C, and FIG. 9 a fourth embodiment (20) of the invention is shown. This embodiment 20 interfaces a re-usable pipettor (50) with a disposable component (51). The disposable cryo-storage component (51) can have different constructions. A first construction is shown in FIG. 8B and comprises a plunger (24) sliding along the capillary element (23). The plunger (24) connects to a button (22) in the pipettor (50). A second embodiment of a disposable component (51), shown in FIG. 8C comprises a casing (52), a capillary element (53) on one end of the casing (52), and a plunger (54) inside the capillary element (53) and inside the casing (52). The disposable component (51) of the device in FIG. 8C comprises areas (53), (54) on its external surface for including information, for example notes, such as the patient name and date, or codes, such as bar codes that identify the patient and serve for data tracking.

Figure 8C:
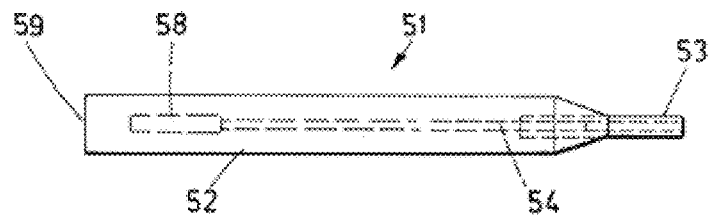
FIG. 8C shows an alternative disposable element for the example device of FIG. 8A.
Figure 9:
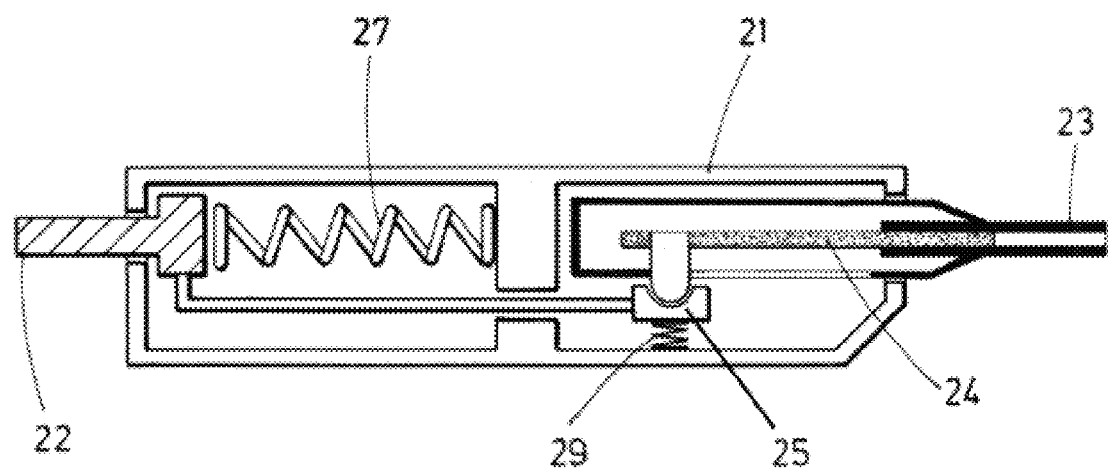
FIG. 9 shows the cross section of the storage device depicted in FIGS. 8A and 8B with the pipettor and an alternative embodiment of a disposable element.

FIG. 9 shows a cross section of re-usable pipettor (50) and a disposable component (51) different from the two previously described and shown in FIG. 8B and FIG. 8C. The pipettor (21) comprises a displacement mechanism that connects to the plunger (24) of the disposable device (51). The displacement mechanism is a latch mechanism comprising a first spring (27) pressing a button (22) that connects to a holder pressed by a second spring (29). The holder receives a grip device (25) connected to the plunger (24). The first spring (27) is placed between the button (22) and a supporting surface inside the casing (21). When the button (22) is pressed, the holder receiving the grip device (25) forces the displacement of the plunger (24) along the capillarity element (23). When the button (22) is released, the plunger (24) forces the aspiration of the media comprising the oocytes and/or embryos through the tip of the capillarity element. After the pipettor (50) and disposable device (51) have been used, the disposable component (51), containing the plunger (24) and the capillary element (23) can be removed and substituted by a new disposable component (51). As in the devices of previous EXAMPLES, the tip of the disposable capillary element (23) can be heated to seal the volume within the capillary element (23). Further, or alternatively, a cover or sheath can be added to protect the capillary element (23).

Example 5: Loading Cells into a Device of the Disclosure

Figure 10:
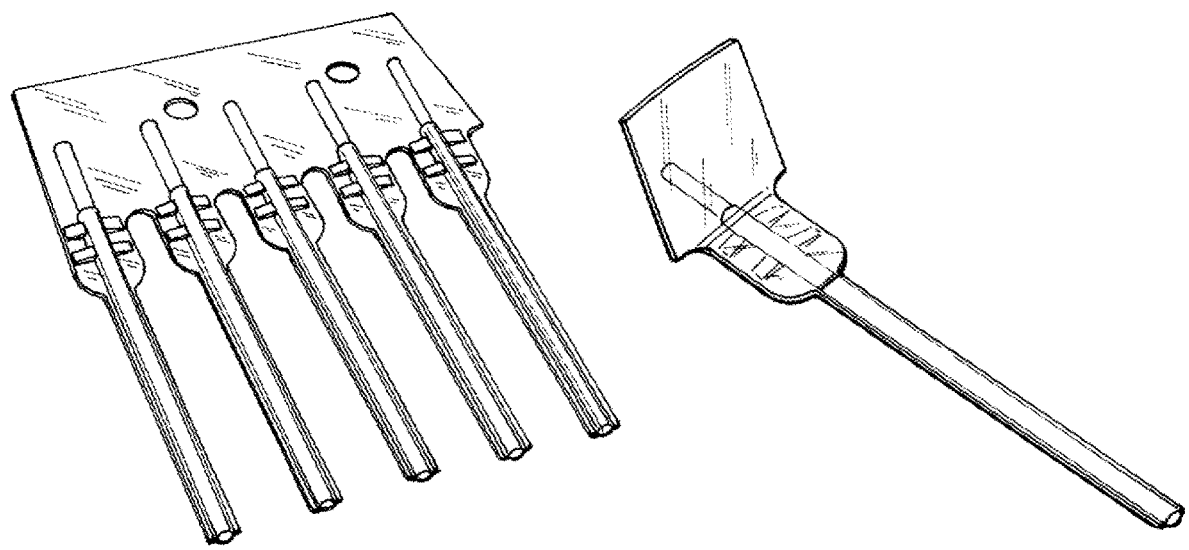
FIG. 10 shows images of capillary element-slidable plunger complexes attached to a tab to facilitate use with a pipettor in a cryo-storage device.
Figure 11:
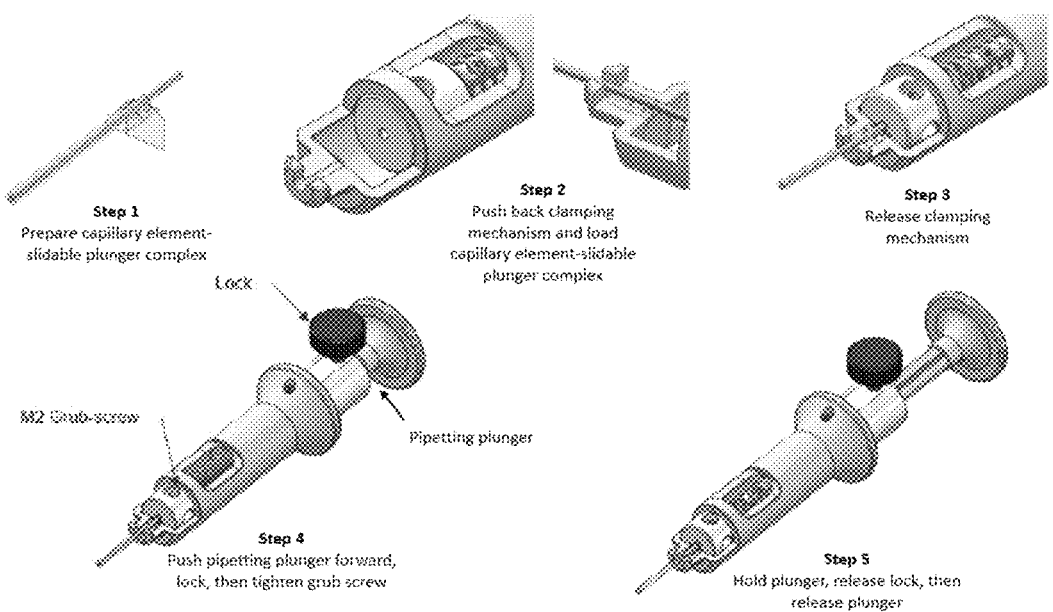
FIG. 11 shows a schematic used for a process of loading a capillary element-slidable plunger complex into a pipettor.

The ability of a cryo-storage device to effectively load and unload cumulus oocyte complexes (COCs) or oocytes. The device comprised a pipettor as well as a capillary element, slidable plunger (together forming a capillary element-slidable plunger complex), and a tab for interfacing the capillary element and slidable plunger with the pipettor as shown in FIG. 10. To interface the capillary element and slidably plunger with the pipettor and form the cryo-storage device, a clamping mechanism was used to clamp the tab and hold the slidable plunger and capillary element in place, as shown in FIG. 11. A screw was then tightened to hold the plunger and capillary element securely in place a shown in FIG. 11. A plunger of the pipettor was then moved backwards to aspirate a small amount of air, followed by oocytes or COCs into the capillary element. The capillary element-slidable plunger complex was then unloaded form the device and submerged in liquid nitrogen. After submersion in liquid nitrogen, the capillary element/slidable plunger was removed from liquid nitrogen and loaded back into the pipettor. The plunger of the pipettor was then used to drive the slidable plunger (within the capillary element) downward to expel the loaded fluid and oocytes or COCs. After expulsion oocytes or COCs were observed under a microscope. Results showed that 6/21 tested COCs were recovered. Trimming off a tip of the capillary element with a sharp scalpel improved COC recovery rate. Loading and unloading of oocytes from the device was successful.

Example 6: Vitrification of Oocytes Inside a Cryo-Storage Device

Figure 12:
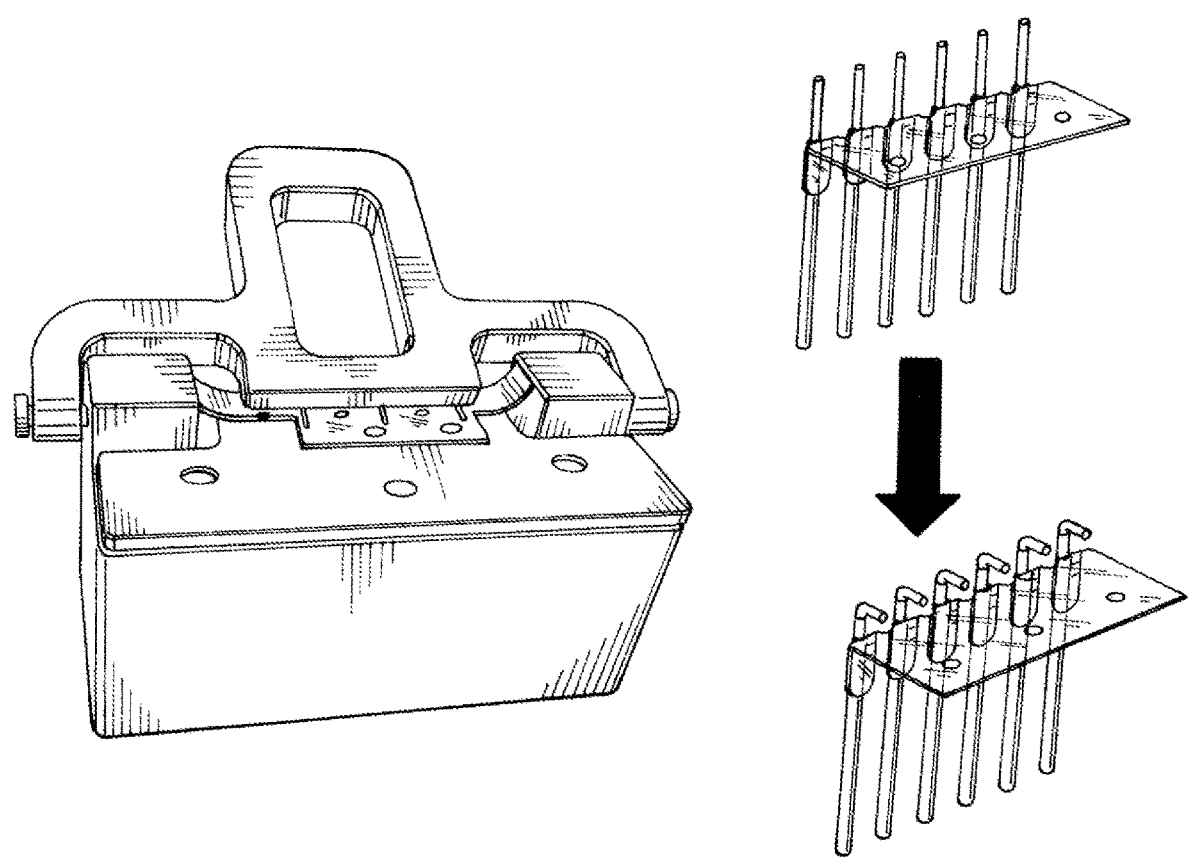
FIG. 12 shows a custom slidable plunger bender (left) and a schematic of slidable plungers with bent ends (right).
Figure 13:
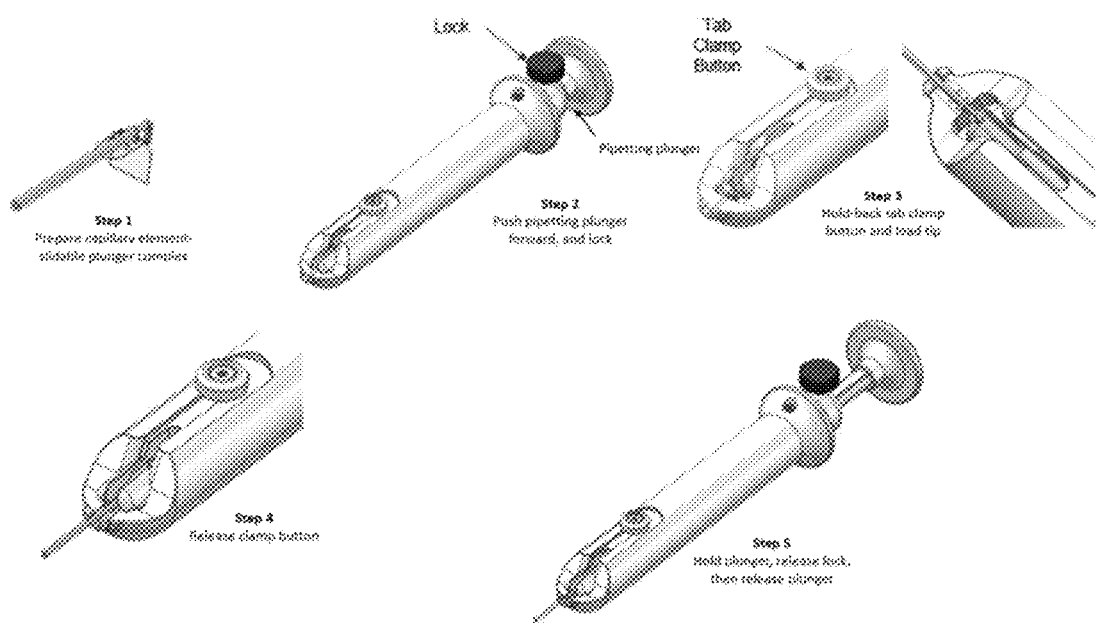
FIG. 13 shows a schematic used for a process of loading a capillary element-slidable plunger complex into a pipettor.
Figure 14:
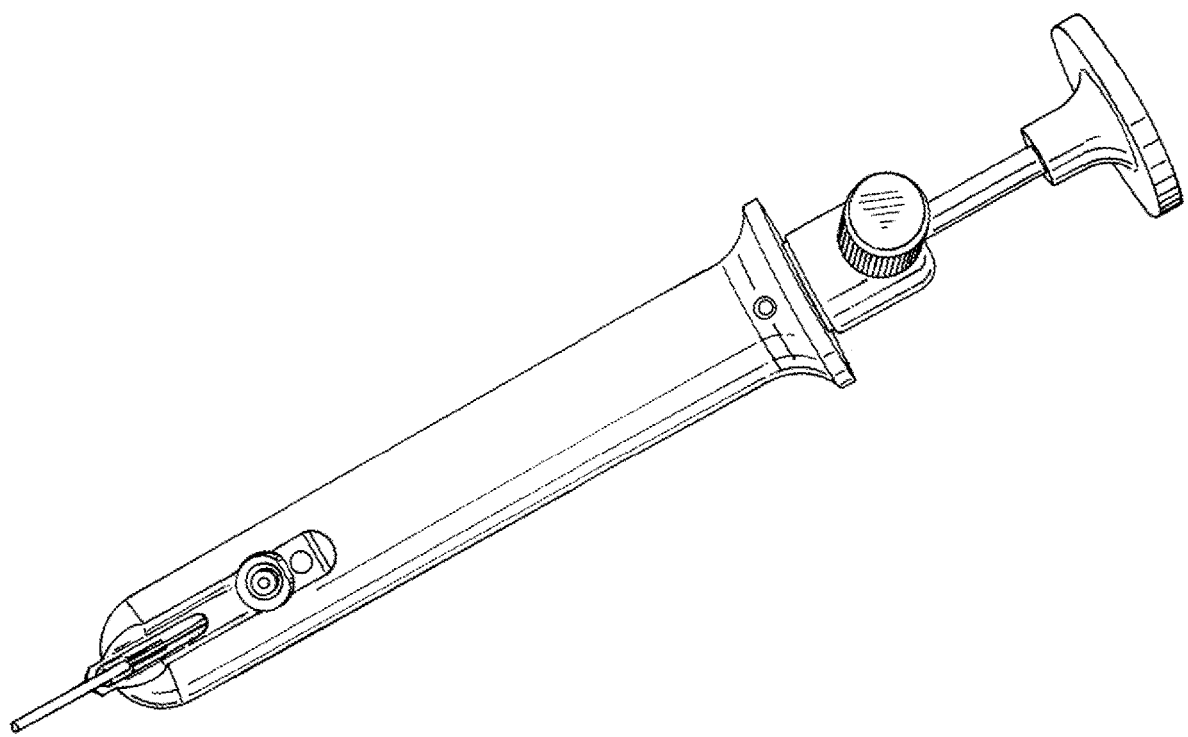
FIG. 14 shows an image of a cryo-storage device of the disclosure.

Oocytes were vitrified within a cryo-storage device of the disclosure. The cryo-storage device comprises a capillary element, a slidable plunger with a top end that was bent at a 90 degree angle, a pipettor, and a tab to interface the capillary element and slidable plunger with the pipettor. To load the capillary element-slidable plunger complex into the pipettor, the top end of the slidable plunger was bent using a custom tip bender, as shown in FIG. 12. Next, the plunger of the pipettor (pipetting plunger) was locked into a position to facilitate interfacing the capillary element-slidable plunger complex with the pipettor. The capillary element-plunger complex was then inserted into the pipettor and a clamping mechanism of the pipettor was used to secure the capillary element-plunger complex in place such that the pipetting plunger was able to control the movement of the slidable plunger. An overview of the capillary element-slidable plunger loading process is shown in FIG. 13. An image of the cryo-storage device is shown in FIG. 14.

Figure 15:
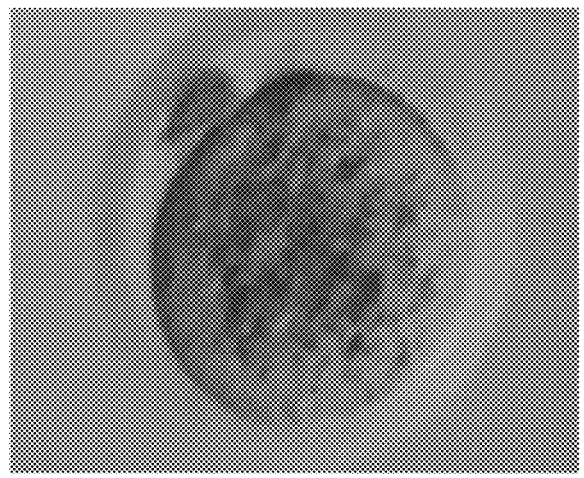
FIG. 15 shows an image of a re-warmed oocyte following vitrification in a cryo-storage device.

Prior to loading of the device with oocytes the oocytes underwent a manual cryo-exchange process. Following the cryo-exchange process, oocytes were loaded into the capillary elements, with two oocytes being loaded per capillary element. Oocytes were loaded such that an air gap formed both above and below the oocytes in the capillary element. The capillary element was then heat sealed below the area containing the oocytes by pressing of the capillary element against a hot surface. After the capillary was sealed the capillary element-slidable plunger complex was submerged in a bath of liquid nitrogen. After allowing the contents of the capillary element to vitrify within the liquid nitrogen, the capillary element-slidable plunger complex was removed from the liquid nitrogen so that the oocyte solution could warm. The oocyte solution and oocytes were then expelled from the capillary element by sliding the slidable plunger toward the bottom end of the capillary element. Following expulsion, oocytes underwent a warming protocol. Overall, the process was repeated 4 times, with two oocytes undergoing the process each time. Of the 8 retrieved oocytes, 7 were observed to be healthy by embryologists immediately after warming. Several hours later the 7 healthy oocytes were inspected under a polarized light microscope. Spindles were visible in all 7 oocytes, suggesting that the vitrification and warming processes had been successful. An image of a re-warmed oocyte can be seen in FIG. 15.

Example 7: Cooling Rate of Vitrification Media in a Device of the Disclosure

Figure 16:
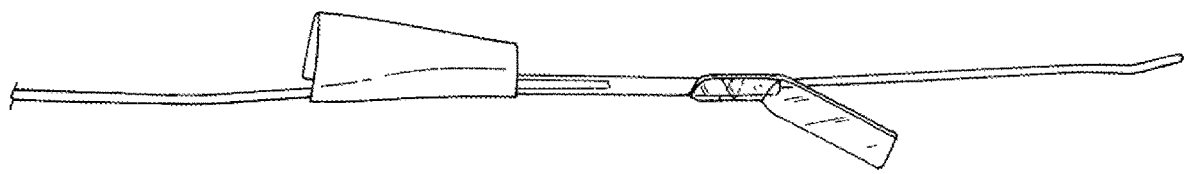
FIG. 16 shows an image of a thermocouple inserted inside a capillary element of the disclosure.

The cooling rate of vitrification media inside a cryo-storage device based on a capillary element-slidable plunger complex is determined. Vitrification media is loaded into a capillary element. A thermocouple is inserted into the open end of the capillary element (displacing some of the vitrification media). Kapton® tape is used to hold the thermocouple in place as shown in FIG. 16. The capillary element is then submerged in liquid nitrogen and moved back and forth. The temperature of the vitrification media over time is recorded using the thermocouple.

Figure 17:
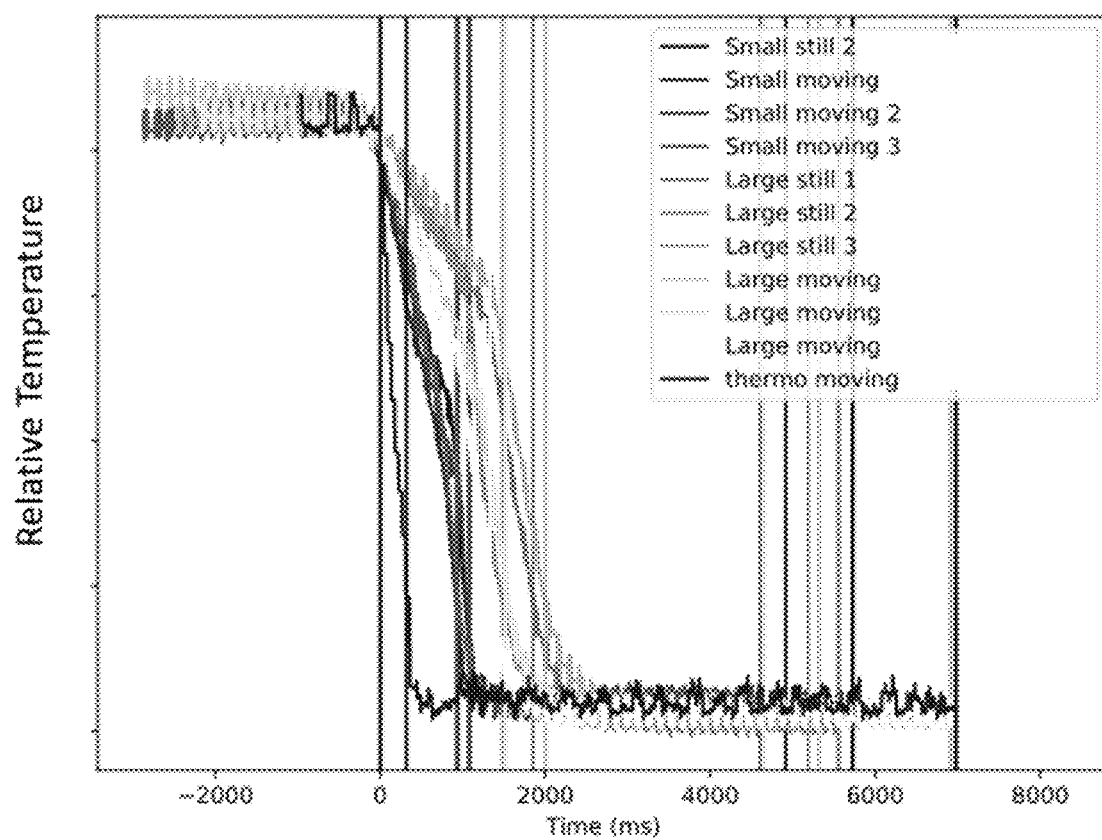
FIG. 17 shows relative cooling rates of vitrification media inside a capillary element-slidable plunger complex-based cryo-storage device.

Example 8: Relative Cooling Rates of Vitrification Media Inside a Capillary Element-Slidable Plunger Complex-Based Cryo-Storage Device To determine relative cooling rates, a thermocouple was placed into the open end of a capillary element and used to record the temperature of vitrification media over time following submersion of the capillary element into liquid nitrogen, as described in EXAMPLE 7. Four relative conditions were tested: a small diameter capillary element that was held still in liquid nitrogen, a small diameter capillary element that was moved in a repetitive motion while submerged in liquid nitrogen, a large diameter capillary element that was held still in liquid nitrogen, and a large diameter capillary element that was moved in a repetitive motion while submerged in liquid nitrogen. Results showed that a small diameter capillary element that was moved while submerged in liquid nitrogen achieved the greatest relative cooling rate, as shown in FIG. 17. As a control the thermocouple alone was submerged into the liquid nitrogen and moved in a repetitive motion (line labeled "thermo moving" in FIG. 17).

Example 9: Performing IVF After Long Term Storage of Embryos in a Cryo-Storage Device of the Disclosure Follicular fluid containing the cumulus oocyte complex (COC) is retrieved from a female subject that has previously undergone follicle stimulation. A COC is isolated from the follicular fluid and washed. Following COC isolation and washing the COC is placed in a microdrop containing fertilization medium. Oil is used to cover the well and maintain stable conditions for cells. After about 2 to about 6 hours in fertilization medium sperm is added to the well and incubated with the COC for about 16 hours. Following the 16 hour incubation, the sperm and fertilization media (which contains detached cumulus cells) are removed and replaced with embryo culture media. In some cases, the additional washes are performed with culture media containing small concentrations of hyaluronidase (10-100 IU). Oil is added to the well to maintain stable conditions for the embryo. Throughout the fertilization and culture process, environmental control is provided by an incubator, and on day 3 of embryo culture the embryo culture media is replaced.

After 5 days of embryo culture, vitrification solution is added to the well such that the concentration of the vitrification solution in the well increases from 0% to 100% over a 15 minute period. After wells are filled with 100% vitrification solution, the bottom end of a capillary element of a cryo-storage device of the disclosure is inserted into the well. The embryo and approximately 1 μL of vitrification solution are loaded into the capillary element by displacing the plunger so that the capillary element aspirates the vitrification solution and embryo. Following embryo loading, a small volume of air is loaded into the capillary element by once again displacing the plunger. The capillary element is then heat sealed just below the location where the volume of air has been loaded. The capillary element, sealed on one side through the heat-sealing process and on the other side via a seal formed between the plunger and the capillary element, is then submerged into liquid nitrogen causing the contents of the capillary element to vitrify. The capillary element remains in liquid nitrogen for storage until the embryo is ready to be transferred into a patient.

Once the embryo is ready to be transferred into a patient, the cryo-storage device is removed from liquid nitrogen and submerged directly into a water bath at a temperature of 37° C. until the contents of the capillary element thaw. A scissor is used to cut through the volume of air loaded in the capillary element. The plunger is then displaced to expel the embryo and vitrification solution into a dish where the embryo rehydration and cleaning process can take place. Following embryo rehydration, the embryo is incubated for a few hours in culture media and transferred into the patient.

Example 10: Performing IVF After Long Term Storage of Oocytes in a Cryo-Storage Device of the Disclosure Follicular fluid containing the cumulus oocyte complex (COC) is retrieved from a female subject that has previously undergone follicle stimulation. A COC is isolated from the follicular fluid and washed. Oocytes are then denuded from so that they are isolated from cumulus cells and placed in a well. Oocytes then undergo a cryoprotectant exchange protocol until they are in vitrification solution. The bottom end of a capillary element of a cryo-storage device of the disclosure is then inserted into the well. The oocyte and approximately 1 nt of vitrification solution are loaded into the capillary element by displacing the plunger so that the capillary element aspirates the vitrification solution and oocyte. Following embryo loading, a small volume of air is loaded into the capillary element by once again displacing the plunger. The capillary element is then heat sealed just below the location where the volume of air has been loaded. The capillary element, sealed on one side through the heat-sealing process and on the other side via a seal formed between the plunger and the capillary element, is then submerged into liquid nitrogen causing the contents of the capillary element to vitrify. The capillary element remains in liquid nitrogen for storage until the oocyte is ready to be fertilized.

Once the oocyte is ready to be fertilized, the cryo-storage device is removed from liquid nitrogen and submerged directly into a bath of liquid heated to a temperature of 37° C. until the contents of the capillary element thaw. A scissor is used to cut through the volume of air loaded in the capillary element. The plunger is then displaced to expel the oocyte and into a well containing warming solution for oocyte rehydration. The oocyte is then placed into a well containing fertilization media. Downstream procedures for oocyte fertilization and the embryo transfer process can then proceed.

Embodiments

The following non-limiting embodiments provide illustrative examples of the devices, systems, and methods disclosed herein, but do not limit the scope of the disclosure.

Embodiment A1. A cryo-storage device comprising:
(a) a capillary element comprising a first elongated body, wherein the first elongated body comprises:

(i) a bottom opening located at a bottom end of the first elongated body;
(ii) a top opening located at a top end of the first elongated body; and
(iii) a hollow portion inside the first elongated body connecting the top opening to the bottom opening, wherein the hollow portion has a diameter that is regular over a length of a region of the hollow portion;
(b) a slidable plunger comprising a top end, a bottom end, and a second elongated body connecting the top end of the slidable plunger to the bottom end of the slidable plunger,
wherein:
at least a portion of the slidable plunger is within the hollow portion of the capillary element;
the slidable plunger is configured to actuate through the top opening;
a diameter of the slidable plunger is regular over a length of a portion of the slidable plunger; and
the diameter of the slidable plunger is no greater than the diameter of the hollow portion; and
(c) a content comprising:
(i) a cell; and
(ii) a volume of media;
wherein:
the content is within a section of the hollow portion located between the bottom opening and the bottom end of the slidable plunger; and
the volume of media, which when contained in the section of the hollow portion, cools at an average rate of at least about 200° C./minute upon submersion of the section of the hollow portion into a coolant.

Embodiment A2. The cryo-storage device of embodiment A1, further comprising a seal that seals the slidable plunger to the hollow portion.

Embodiment A3. The cryo-storage device of embodiment A2, wherein the seal is formed by a fit of the slidable plunger into the hollow portion.

Embodiment A4. The cryo-storage device of embodiment A2, wherein the seal is formed by a sealing device.

Embodiment A5. The cryo-storage device of any one of embodiments A1-A4, wherein a closed system is formed upon sealing of a second section of the hollow portion, wherein the content is located between the second section of the hollow portion and the bottom end of the slidable plunger.

Embodiment A6. The cryo-storage device of any one of embodiments A1-A5, further comprising a seal in the hollow portion, wherein the content is located between the seal in the hollow portion and the bottom end of the slidable plunger.

Embodiment A7. The cryo-storage device of any one of embodiments A1-A6, wherein the capillary element is about cylindrical.

Embodiment A8. The cryo-storage device of any one of embodiments A1-A7, wherein the hollow portion is about cylindrical.

Embodiment A9. The cryo-storage device of any one of embodiments A1-A8, wherein the slidable plunger is about cylindrical.

Embodiment A10. The cryo-storage device of any one of embodiments A1-A9, wherein the capillary element is rigid.

Embodiment A11. The cryo-storage device of any one of embodiments A1-A10, wherein the capillary element has a cross-sectional area that is about constant across a length of the capillary element, wherein the length of the capillary element is a region between the bottom end of the first elongated body to the top end of the first elongated body.

Embodiment A12. The cryo-storage device of any one of embodiments A1-A11, wherein the diameter of the hollow portion is about 0.1 mm to about 2 mm.

Embodiment A13. The cryo-storage device of any one of embodiments A1-A12, wherein the capillary element has a cross-sectional area of about 0.03 $mm^2$ to about 5 $mm^2$.

Embodiment A14. The cryo-storage device of any one of embodiments A1-A13, wherein the capillary element has a wall thickness of at most 1.5 mm.

Embodiment A15. The cryo-storage device of any one of embodiments A1-A14, wherein the content has a volume of about 0.2 μL, to about 5 μL.

Embodiment A16. The cryo-storage device of any one of embodiments A1-A15, wherein the content has a volume of about 2 μL.

Embodiment A17. The cryo-storage device of any one of embodiments A1-A16, wherein the cell is an oocyte.

Embodiment A18. The cryo-storage device of any one of embodiments A1-A16, wherein the cell is an ovum.

Embodiment A19. The cryo-storage device of any one of embodiments A1-A16, wherein the cell is part of a mass of a plurality of cells.

Embodiment A20. The cryo-storage device of embodiment A19, wherein the mass of the plurality of cells is an embryo.

Embodiment A21. The cryo-storage device of embodiment A19, wherein the mass of the plurality of cells is a zygote.

Embodiment A22. The cryo-storage device of embodiment A19, wherein the mass of the plurality of cells is a blastocyst.

Embodiment A23. The cryo-storage device of embodiment A19, wherein the mass of the plurality of cells is a cumulus oocyte complex.

Embodiment A24. The cryo-storage device of any one of embodiments A1-A23, wherein the volume of media is about 0.2 μL, to about 5 μL.

Embodiment A25. The cryo-storage device of any one of embodiments A1-A24, wherein the volume of media is about 1 μL.

Embodiment A26. The cryo-storage device of any one of embodiments A1-A25, wherein, when the content is vitrified, the volume of media, when contained within the section of the hollow portion, warms at an average rate of at least about 10,000° C./minute upon submersion of the section of the hollow portion into a liquid with a temperature of at least about 30° C.

Embodiment A27. The cryo-storage device of embodiment A26, wherein the liquid has a temperature of about 37° C.

Embodiment A28. The cryo-storage device of any one of embodiments A1-A27, wherein the capillary element has a thermal conductivity of at least about 0.05 W/m·K.

Embodiment A29. The cryo-storage device of any one of embodiments A1-A28, wherein the capillary element has a thermal conductivity of about 0.2 W/m·K to about 0.5 W/m·K.

Embodiment A30. The cryo-storage device of any one of embodiments A1-A29, wherein the first elongated body is heat sealed.

Embodiment A31. The cryo-storage device of any one of embodiments A1-A30, further comprising an elongated casing, wherein the top end of the first elongated body and the top end of the slidable plunger are contained within a first end of the elongated casing.

Embodiment A32. The cryo-storage device of embodiment A31, further comprising a tab connecting the capillary element to the first end of the elongated casing.

Embodiment A33. The cryo-storage device of embodiment A31 or A32, further comprising a displacement mechanism attached to the elongated casing, wherein the displacement mechanism is configured so that actuation of the displacement mechanism controls movement of the slidable plunger.

Embodiment A34. The cryo-storage device of any one of embodiments A1-A33, wherein:
the bottom end of the slidable plunger is within the capillary element; and
the top end of the slidable plunger is outside of the capillary element.

Embodiment A35. The cryo-storage device of embodiment A34, wherein the top end of the slidable plunger is bent at an angle of about 15 degrees to about 100 degrees to form a bent end.

Embodiment A36. The cryo-storage device of embodiment A35, wherein the top end of the slidable plunger is bent at an angle of about 90 degrees to form the bent end.

Embodiment A37. The cryo-storage device of any one of embodiments A1-A30, further comprising a pipettor, wherein the pipettor comprises:
(I) an elongated casing comprising a top end and a bottom end, wherein the top end of the first elongated body and the top end of the slidable plunger are contained within the bottom end of the elongated casing;
(II) a clamping mechanism, wherein the clamping mechanism is clamped onto a tab that connects the capillary element to the bottom end of the elongated casing;
(III) a pipetting plunger comprising a top end, a bottom end, and a third elongated body connecting the top end of the pipetting plunger and the bottom end of the pipetting plunger; and
(IV) an actuation element connecting the pipetting plunger to the elongated casing and configured to actuate the pipetting plunger;
wherein:
the bottom end of the pipetting plunger is within the elongated casing;
the top end of the pipetting plunger is outside the elongated casing; and
the pipetting plunger is configured so that actuation of the pipetting plunger controls movement of the slidable plunger.

Embodiment A38. The cryo-storage device of embodiment A37, wherein:
the pipetting plunger further comprises a protrusion on the third elongated body;
the pipettor further comprises a spring;
the spring is wrapped around the third elongated body and located between the bottom end of the pipetting plunger and the protrusion;
the spring is in contact with the protrusion;
the protrusion is configured to hold the spring in place; and
the spring is configured to dampen motion of the pipetting plunger.

Embodiment A39. The cryo-storage device of embodiment A37 or A38, further comprising a button operatively connected to the top end of the pipetting plunger, wherein the button is configured so that pushing of the button causes the pipetting plunger to actuate through the elongated casing.

Embodiment A40. The cryo-storage device of any one of embodiments A37-A39, wherein the bottom end of the pipetting plunger is directly connected to the top end of the slidable plunger.

Embodiment A41. The cryo-storage device of any one of embodiments A37-A39, wherein the bottom end of the pipetting plunger is indirectly connected to the top end of the slidable plunger.

Embodiment A42. The cryo-storage device of any one of embodiments A1-A41, further comprising an identifier located on the first elongated body.

Embodiment A43. The cryo-storage device of any one of embodiments A1-A42, further comprising a cover comprising an outer structure and an inner void, wherein at least a portion of the first elongated body is within the inner void of the cover.

Embodiment A44. A method comprising:
(a) inserting a portion of a cryo-storage device into a vessel containing a content,
wherein:
the content comprises:
a volume of media; and
a cell; and
the cryo-storage device comprises:
(I) a capillary element comprising a first elongated body, wherein the first elongated body comprises:
(i) a bottom opening located at a bottom end of the first elongated body;
(ii) a top opening located at a top end of the first elongated body; and
(iii) a hollow portion inside the first elongated body connecting the top opening to the bottom opening, wherein the hollow portion has a diameter that is regular over a length of a region of the hollow portion;
(II) a slidable plunger comprising a top end, a bottom end, and a second elongated body connecting the top end of the slidable plunger to the bottom end of the slidable plunger, wherein:
at least a portion of the slidable plunger is within the hollow portion of the capillary element;
the slidable plunger is configured to actuate through the top opening;
a diameter of the slidable plunger is regular over a length of a portion of the slidable plunger; and
the diameter of the slidable plunger is no greater than the diameter of the hollow portion; and
(b) after step (a), loading the capillary element with the content, thereby generating a loaded section of the capillary element.

Embodiment A45. The method of embodiment A44, wherein loading the capillary element comprises sliding the slidable plunger along a longitudinal axis of the capillary element, such that the bottom end of the slidable plunger moves away from the bottom opening and toward the top opening.

Embodiment A46. The method of embodiment A44 or A45, further comprising, before step (a), generating an upper air space by loading a first volume of air into the capillary element.

Embodiment A47. The method of embodiment A46, wherein loading a first volume of air into the capillary element comprises sliding the slidable plunger along a longitudinal axis of the capillary element such that the bottom end of the slidable plunger moves away from the bottom opening of and toward the top opening.

Embodiment A48. The method of embodiment A46 or A47, wherein the upper air space is located between the bottom end of the slidable plunger and the loaded section of the capillary element.

Embodiment A49. The method of any one of embodiments A44-A48, further comprising, after step (b):
(c) removing the portion of the cryo-storage device from the vessel; and
(d) after step (c), vitrifying the content by submerging the loaded section of the capillary element into a coolant.

Embodiment A50. The method of embodiment A49, further comprising, after step (c) and before step (d), generating a lower air space by loading a volume of air into the capillary element.

Embodiment A51. The method of embodiment A50, wherein loading a volume of air into the capillary element comprises sliding the slidable plunger along a longitudinal axis of the capillary element, such that the bottom end of the slidable plunger moves away from the bottom opening and toward the top opening.

Embodiment A52. The method of embodiment A50 or A50, wherein the lower air space is between the bottom opening and the loaded section of the capillary element.

Embodiment A53. The method of any one of embodiments A49-A52, further comprising, after step (c) and before step (d):
heating the first elongated body at a location, thereby generating a heat seal at the location, wherein the loaded section of the capillary element is between the heat seal and the bottom end of the slidable plunger.

Embodiment A54. The method of any one of embodiments A49-A53, wherein vitrifying the content comprises cooling the volume of media at an average rate of at least about 200° C./minute.

Embodiment A55. The method of any one of embodiments A49-A54, wherein the coolant is liquid nitrogen.

Embodiment A56. The method of any one of embodiments A49-A55, further comprising, after step (d):
(e) removing the loaded section of the capillary element from the coolant; and
(f) warming the volume of media at an average rate of at least about 10,000° C./minute by submerging the loaded section of the capillary element into a liquid with a temperature of at least about 30° C.

Embodiment A57. The method of embodiment A56, wherein the liquid has a temperature of about 37° C.

Embodiment A58. The method of any one of embodiments A44-A57, wherein the cryo-storage device further comprises a seal that seals the slidable plunger to the hollow portion.

Embodiment A59. The method of embodiment A58, wherein the seal is formed by a fit of the slidable plunger into the hollow portion.

Embodiment A60. The method of embodiment A60, wherein the seal is formed by a sealing device.

Embodiment A61. The method of any one of embodiments A44-A60, wherein the capillary element is cylindrical.

Embodiment A62. The method of any one of embodiments A44-A61, wherein the hollow portion is about cylindrical.

Embodiment A63. The method of any one of embodiments A44-A62, wherein the slidable plunger is about cylindrical.

Embodiment A64. The method of any one of embodiments A44-A63, wherein the capillary element is rigid.

Embodiment A65. The method of any one of embodiments A44-A64, wherein the capillary element has a cross-sectional area that is about constant across a length of the capillary element, wherein the length of the capillary element is a region between the bottom end of the first elongated body to the top end of the first elongated body.

Embodiment A66. The method of any one of embodiments A44-A65, wherein the diameter of the hollow portion is about 0.1 mm to about 2 mm.

Embodiment A67. The method of any one of embodiments A44-A66, wherein the capillary element has a cross-sectional area of about 0.03 mm$^2$ to about 5 mm$^2$.

Embodiment A68. The method of any one of embodiments A44-A67, wherein the capillary element has a wall thickness of at most 1.5 mm.

Embodiment A69. The method of any one of embodiments A44-A68, wherein the content has a volume of about 0.2 µL, to about 5 µL.

Embodiment A70. The method of any one of embodiments A44-A69, wherein the content has a volume of about 2 µL.

Embodiment A71. The method of any one of embodiments A44-A70, wherein the cell is an oocyte.

Embodiment A72. The method of any one of embodiments A44-A70, wherein the cell is an ovum.

Embodiment A73. The method of any one of embodiments A44-A70, wherein the cell is part of a mass of a plurality of cells.

Embodiment A74. The method of embodiment A73, wherein the mass of the plurality of cells is an embryo.

Embodiment A75. The method of embodiment A73, wherein the mass of the plurality of cells is a zygote.

Embodiment A76. The method of embodiment A73, wherein the mass of the plurality of cells is a blastocyst.

Embodiment A77. The method of embodiment A73, wherein the mass of the plurality of cells is a cumulus oocyte complex.

Embodiment A78. The method of any one of embodiments A44-A77, wherein the volume of media is about 0.2 µL, to about 5 µL.

Embodiment A79. The method of any one of embodiments A44-A78, wherein the volume of media is about 1 µL.

Embodiment A80. The method of any one of embodiments A44-A79, wherein the capillary element has a thermal conductivity of at least 0.05 W/m·K.

Embodiment A81. The method of any one of embodiments A44-A80, wherein the capillary element has a thermal conductivity about 0.2 W/m·K to about 0.5 W/m·K.

Embodiment A82. The method of any one of embodiments A44-A81, wherein the capillary element has a thermal conductivity of about 0.33 W/m·K.

Embodiment A83. The method any one of embodiments A44-A82, wherein the cryo-storage device further comprises an elongated casing, wherein the top end of the first elongated body and a top end of the slidable plunger are contained within a first end of the elongated casing.

Embodiment A84. The method of embodiment A83, further comprising, after step (b):
(c) removing the portion of the cryo-storage device from the vessel;
(d) disassembling at least a subset of the cryo-storage device by removing the capillary element and the slidable plunger from the elongated casing; and
(e) vitrifying the content by submerging the loaded section of the capillary element into a coolant.

Embodiment A85. The method of embodiment A83 or A84, wherein the cryo-storage device further comprises a tab connecting the capillary element to the first end of the elongated casing.

Embodiment A86. The method of any one of embodiments A83-A85, wherein the cryo-storage device further comprises a displacement mechanism attached to the elongated casing, wherein the displacement mechanism is configured so that actuation of the displacement mechanism controls movement of the slidable plunger.

Embodiment A87. The method of any one of embodiments A44-A86, wherein:
 the bottom end of the slidable plunger is within the capillary element; and
 the top end of the slidable plunger is outside of the capillary element.

Embodiment A88. The method of embodiment A87, wherein the top end of the slidable plunger is bent at an angle of about 15 degrees to about 100 degrees to form a bent end.

Embodiment A89. The method of embodiment A88, wherein the top end of the slidable plunger is bent at an angle of about 90 degrees to form the bent end.

Embodiment A90. The method of any one of embodiments A44-A82, wherein the cryo-storage device further comprises a pipettor, wherein the pipettor comprises:
 (I) an elongated casing comprising a top end and a bottom end, wherein the top end of the first elongated body and the top end of the slidable plunger are each inserted into the bottom end of the elongated casing;
 (II) a clamping mechanism, wherein the clamping mechanism is clamped onto a tab that connects the capillary element to the bottom end of the elongated casing;
 (III) a pipetting plunger comprising a top end, a bottom end, and a third elongated body connecting the top end of the pipetting plunger and the bottom end of the pipetting plunger, and
 (IV) an actuation element connecting the pipetting plunger to the elongated casing and configured to actuate the pipetting plunger;
wherein:
 the bottom end of the pipetting plunger is within the elongated casing;
 the top end of the pipetting plunger is outside the elongated casing; and
 the pipetting plunger is configured so that actuation of the pipetting plunger controls movement of the slidable plunger.

Embodiment A91. The method of embodiment A90, wherein:
 the pipetting plunger further comprises a protrusion on the third elongated body;
 the pipettor further comprises a spring;
 the spring is wrapped around the third elongated body and located between the bottom end of the pipetting plunger and the protrusion;
 the spring is in contact with the protrusion;
 the protrusion is configured to hold the spring in place; and
 the spring is configured to dampen motion of the pipetting plunger.

Embodiment A92. The method of embodiment A90 or A91 wherein the cryo-storage device further comprises a button operatively connected to the top end of the pipetting plunger, wherein the button is configured so that pushing of the button causes the pipetting plunger to actuate through the elongated casing.

Embodiment A93. The method of any one of embodiments A90-A92, further comprising, after step (b):
 (c) removing the portion of the cryo-storage device from the vessel;
 (d) disassembling at least a subset of the cryo-storage device by removing the capillary element and the slidable plunger from the elongated casing; and
 (e) vitrifying the content by submerging the loaded section of the capillary element into a coolant.

Embodiment A94. The method of any one of embodiments A90-A93, wherein the bottom end of the pipetting plunger is directly connected to the top end of the slidable plunger.

Embodiment A95. The method of any one of embodiments A90-A93, wherein the bottom end of the pipetting plunger is indirectly connected to the top end of the slidable plunger.

Embodiment B1. A cryo-storage device comprising: (a) a capillary element comprising a first elongated body, wherein the first elongated body comprises:
 (i) a bottom opening located at a bottom end of the first elongated body;
 (ii) a top opening located at a top end of the first elongated body; and
 (iii) a hollow portion inside the first elongated body connecting the top opening to the bottom opening, wherein the hollow portion has a diameter that is regular over a length of a region of the hollow portion;
(b) a slidable plunger comprising a top end, a bottom end, and a second elongated body connecting the top end of the slidable plunger to the bottom end of the slidable plunger,
wherein:
 at least a portion of the slidable plunger is within the hollow portion of the capillary element;
 the slidable plunger is configured to actuate through the top opening;
 a diameter of the slidable plunger is regular over a length of a portion of the slidable plunger; and
 the diameter of the slidable plunger is no greater than the diameter of the hollow portion; and
(c) a content comprising:
 (i) a cell; and
 (ii) a volume of media;
wherein:
 the content is within a section of the hollow portion located between the bottom opening and the bottom end of the slidable plunger; and
 when the section of the hollow portion containing the content is contacted with a coolant:
  the content vitrifies; and
  a membrane of the cell does not rupture.

Embodiment B2. The cryo-storage device of embodiment B1, further comprising a seal that seals the slidable plunger to the hollow portion.

Embodiment B3. The cryo-storage device of embodiment B2, wherein the seal is formed by a fit of the slidable plunger into the hollow portion.

Embodiment B4. The cryo-storage device of embodiment B2, wherein the seal is formed by a sealing device.

Embodiment B5. The cryo-storage device of any one of embodiments B1-B4, wherein a closed system is formed upon sealing of a second section of the hollow portion, wherein the content is located between the second section of the hollow portion and the bottom end of the slidable plunger.

Embodiment B6. The cryo-storage device of any one of embodiments B1-B5, further comprising a seal in the hollow portion, wherein the content is located between the seal in the hollow portion and the bottom end of the slidable plunger.

Embodiment B7. The cryo-storage device of any one of embodiments B1-B6, wherein the capillary element is cylindrical.

Embodiment B8. The cryo-storage device of any one of embodiments B1-B6, wherein the hollow portion is about cylindrical.

Embodiment B9. The cryo-storage device of any one of embodiments B1-B8, wherein the slidable plunger is about cylindrical.

Embodiment B10. The cryo-storage device of any one of embodiments B1-B9, wherein the capillary element is rigid.

Embodiment B11. The cryo-storage device of any one of embodiments B1-B10, wherein the capillary element has a cross-sectional area that is about constant across a length of the capillary element, wherein the length of the capillary element is a region between the bottom end of the first elongated body to the top end of the first elongated body.

Embodiment B12. The cryo-storage device of any one of embodiments B1-B11, wherein the diameter of the hollow portion is about 0.1 mm to about 2 mm.

Embodiment B13. The cryo-storage device of any one of embodiments B1-B12, wherein the capillary element has a cross-sectional area of about 0.03 mm$^2$ to about 5 mm$^2$.

Embodiment B14. The cryo-storage device of any one of embodiments B1-B13, wherein wherein the capillary element has a wall thickness of at most 1.5 mm.

Embodiment B15. The cryo-storage device of any one of embodiments B1-B14, wherein the content has a volume of about 0.2 μL, to about 5 μL.

Embodiment B16. The cryo-storage device of any one of embodiments B1-B14, wherein the content has a volume of about 2 μL.

Embodiment B17. The cryo-storage device of any one of embodiments B1-B16, wherein the cell is an oocyte.

Embodiment B18. The cryo-storage device of any one of embodiments B1-B16, wherein the cell is an ovum.

Embodiment B19. The cryo-storage device of any one of embodiments B1-B16, wherein the cell is part of a mass of a plurality of cells.

Embodiment B20. The cryo-storage device of embodiment B19, wherein the mass of the plurality of cells is an embryo.

Embodiment B21. The cryo-storage device of embodiment B19, wherein the mass of the plurality of cells is a zygote.

Embodiment B22. The cryo-storage device of embodiment B19, wherein the mass of the plurality of cells is a blastocyst.

Embodiment B23. The cryo-storage device of embodiment B19, wherein the mass of the plurality of cells is a cumulus oocyte complex.

Embodiment B24. The cryo-storage device of any one of embodiments B1-B23, wherein the volume of media is about 0.2 μL to about 5 μL.

Embodiment B25. The cryo-storage device of any one of embodiments B1-B23, wherein the volume of media is about 1 μL Embodiment B26. The cryo-storage device of any one of embodiments B1-B25, wherein, when the content is vitrified, the volume of media, when contained within the section of the hollow portion, warms at an average rate of at least about 10,000° C./minute upon submersion of the section of the hollow portion into a liquid with a temperature of at least about 30° C.

Embodiment B27. The cryo-storage device of embodiment B26, wherein the liquid has a temperature of about 37° C.

Embodiment B28. The cryo-storage device of any one of embodiments B1-B27, wherein the capillary element has a thermal conductivity of at least about 0.05 W/m·K.

Embodiment B29. The cryo-storage device of any one of embodiments B1-B28, wherein the capillary element has a thermal conductivity of about 0.2 W/m·K to about 0.5 W/m·K.

Embodiment B30. The cryo-storage device of any one of embodiments B1-B29, wherein the first elongated body is heat sealed.

Embodiment B31. The cryo-storage device of any one of embodiment B1-B30, further comprising an elongated casing, wherein the top end of the first elongated body and the top end of the slidable plunger are contained within a first end of the elongated casing.

Embodiment B32. The cryo-storage device of embodiment B31, further comprising a tab connecting the capillary element to the first end of the elongated casing.

Embodiment B33. The cryo-storage device of embodiment B31 or embodiment 32, further comprising a displacement mechanism attached to the elongated casing, wherein the displacement mechanism is configured so that actuation of the displacement mechanism controls movement of the slidable plunger.

Embodiment B34. The cryo-storage device of any one of embodiments B1-B34,
wherein:
  the bottom end of the slidable plunger is within the capillary element; and
  the top end of the slidable plunger is outside of the capillary element.

Embodiment B35. The cryo-storage device of embodiment B34, wherein the top end of the slidable plunger is bent at an angle of about 15 degrees to about 100 degrees to form a bent end.

Embodiment B36. The cryo-storage device of embodiment B35, wherein the top end of the slidable plunger is bent at an angle of about 90 degrees to form the bent end.

Embodiment B37. The cryo-storage device of any one of embodiments B1-B30, further comprising a pipettor, wherein the pipettor comprises:
  (I) an elongated casing comprising a top end and a bottom end, wherein the top end of the first elongated body and the top end of the slidable plunger are contained within the bottom end of the elongated casing;
  (II) a clamping mechanism, wherein the clamping mechanism is clamped onto a tab that connects the capillary element to the bottom end of the elongated casing;
  (III) a pipetting plunger comprising a top end, a bottom end, and a third elongated body connecting the top end of the pipetting plunger and the bottom end of the pipetting plunger; and
  (IV) an actuation element connecting the pipetting plunger to the elongated casing and configured to actuate the pipetting plunger;
wherein:
  the bottom end of the pipetting plunger is within the elongated casing;
  the top end of the pipetting plunger is outside the elongated casing; and the pipetting plunger is configured so that actuation of the pipetting plunger controls movement of the slidable plunger.

Embodiment B38. The cryo-storage device of embodiment B37, wherein:
the pipetting plunger further comprises a protrusion on the third elongated body;
the pipettor further comprises a spring;
the spring is wrapped around the third elongated body and located between the bottom end of the pipetting plunger and the protrusion;
the spring is in contact with the protrusion;
the protrusion is configured to hold the spring in place; and
the spring is configured to dampen motion of the pipetting plunger.

Embodiment B39. The cryo-storage device of embodiment B37 or B38, further comprising a button operatively connected to the top end of the pipetting plunger, wherein the button is configured so that pushing of the button causes the pipetting plunger to actuate through the elongated casing.

Embodiment B40. The cryo-storage device of any one of embodiments B37-B39, wherein the bottom end of the pipetting plunger is directly connected to the top end of the slidable plunger.

Embodiment B41. The cryo-storage device of any one of embodiments B37-B39, wherein the bottom end of the pipetting plunger is indirectly connected to the top end of the slidable plunger.

Embodiment B42. The cryo-storage device of any one of embodiments B1-B41, further comprising an identifier located on the first elongated body.

Embodiment B43. The cryo-storage device of any one of embodiments B1-B42, further comprising a cover comprising an outer structure and an inner void, wherein at least a portion of the first elongated body is within the inner void of the cover.

Embodiment C1. A method comprising:
(a) cooling a loaded section of a cryo-storage device, wherein:
the loaded section contains a content comprising:
a volume of media; and
a cell; and
the cryo-storage device comprises:
(I) a capillary element comprising a first elongated body, wherein the first elongated body comprises:
(i) a bottom opening located at a bottom end of the first elongated body;
(ii) a top opening located at a top end of the first elongated body; and
(iii) a hollow portion inside the first elongated body connecting the top opening to the bottom opening, wherein the hollow portion has a diameter that is regular over a length of a region of the hollow portion;
(II) a slidable plunger comprising a top end, a bottom end, and a second elongated body connecting the top end of the slidable plunger to the bottom end of the slidable plunger, wherein:
at least a portion of the slidable plunger is within the hollow portion of the capillary element;
the slidable plunger is configured to actuate through the top opening;
a diameter of the slidable plunger is regular over a length of a portion of the slidable plunger; and
the diameter of the slidable plunger is no greater than the diameter of the hollow portion.

Embodiment C2. The method of embodiment C1, wherein the cryo-storage device further comprises a seal that seals the slidable plunger to the hollow portion.

Embodiment C3. The method of embodiment C2, wherein the seal is formed by a fit of the slidable plunger into the hollow portion.

Embodiment C4. The method of embodiment C2, wherein the seal is formed by a sealing device.

Embodiment C5. The method of any one of embodiments C1-C4, wherein the capillary element is cylindrical.

Embodiment C6. The method of any one of embodiments C1-C5, wherein the hollow portion is about cylindrical.

Embodiment C7. The method of any one of embodiments C1-C6, wherein the slidable plunger is about cylindrical.

Embodiment C8. The method of any one of embodiments C1-C7, wherein the capillary element is rigid.

Embodiment C9. The method of any one of embodiments C1-C8, wherein the capillary element has a cross-sectional area that is about constant across a length of the capillary element, wherein the length of the capillary element is a region between the bottom end of the first elongated body to the top end of the first elongated body.

Embodiment C10. The method of any one of embodiments C1-C9, wherein the diameter of the hollow portion is about 0.1 mm to about 2 mm.

Embodiment C11. The method of any one of embodiments C1-C10, wherein the capillary element has a cross-sectional area of about 0.03 mm$^2$ to about 5 mm$^2$.

Embodiment C12. The method of any one of embodiments C1-C11, wherein the capillary element has a wall thickness of at most 1.5 mm.

Embodiment C13. The method of any one of embodiments C1-C12, wherein the content has a volume of about 0.2 μL to about 5 μL.

Embodiment C14. The method of any one of embodiments C1-C13, wherein the content has a volume of about 2 μL.

Embodiment C15. The method of any one of embodiments C1-C13, wherein the cell is an oocyte.

Embodiment C16. The method of any one of embodiments C1-C13, wherein the cell is an ovum.

Embodiment C17. The method of any one of embodiments C1-C13, wherein the cell is part of a mass of a plurality of cells.

Embodiment C17. The method of embodiment C17, wherein the mass of the plurality of cells is an embryo.

Embodiment C18. The method of embodiment C17, wherein the mass of the plurality of cells is a zygote.

Embodiment C19. The method of embodiment C17, wherein the mass of the plurality of cells is a blastocyst.

Embodiment C20. The method of embodiment C17, wherein the mass of the plurality of cells is a cumulus oocyte complex.

Embodiment C21. The method of embodiment any one of embodiments C1-C20, wherein the volume of media is about 0.2 μL, to about 5 μL.

Embodiment C22. The method of any one of embodiments C1-C21, wherein the volume of media is about 1 μL.

Embodiment C23. The method of any one of embodiments C1-C22, wherein the capillary element has a thermal conductivity of at least 0.05 W/m·K.

Embodiment C24. The method of any one of embodiments C1-C23, wherein the capillary element has a thermal conductivity of about 0.2 W/m·K to about 0.5 W/m·K.

Embodiment C25. The method of any one of embodiments C1-C24, wherein the capillary element has a thermal conductivity of about 0.33 W/m·K.

Embodiment C26. The method of any one of embodiments C1-C25, wherein the cryo-storage device further comprises an elongated casing, wherein the top end of the first elongated body and a top end of the slidable plunger are contained within a first end of the elongated casing.

Embodiment C27. The method of embodiment C26, wherein the cryo-storage device further comprises a tab connecting the capillary element to the first end of the elongated casing.

Embodiment C28. The method of embodiment C26, wherein the cryo-storage device further comprises a displacement mechanism attached to the elongated casing, wherein the displacement mechanism is configured so that actuation of the displacement mechanism controls movement of the slidable plunger.

Embodiment C29. The method of any one of embodiments C1-C28, wherein:
the bottom end of the slidable plunger is within the capillary element; and
the top end of the slidable plunger is outside of the capillary element.

Embodiment C30. The method of embodiment C29, wherein the top end of the slidable plunger is bent at an angle of about 15 degrees to about 100 degrees to form a bent end.

Embodiment C31. The method of embodiment C30, wherein the top end of the slidable plunger is bent at an angle of about 90 degrees to form the bent end.

Embodiment C32. The method of any one of embodiments C1-C25, wherein the cryo-storage device further comprises a pipettor, wherein the pipettor comprises:
(I) an elongated casing comprising a top end and a bottom end, wherein the top end of the first elongated body and the top end of the slidable plunger are each inserted into the bottom end of the elongated casing;
(II) a clamping mechanism, wherein the clamping mechanism is clamped onto a tab that connects the capillary element to the bottom end of the elongated casing;
(III) a pipetting plunger comprising a top end, a bottom end, and a third elongated body connecting the top end of the pipetting plunger and the bottom end of the pipetting plunger, and
(IV) an actuation element connecting the pipetting plunger to the elongated casing and configured to actuate the pipetting plunger;
wherein:
the bottom end of the pipetting plunger is within the elongated casing;
the top end of the pipetting plunger is outside the elongated casing; and
the pipetting plunger is configured so that actuation of the pipetting plunger controls movement of the slidable plunger.

Embodiment C33. The method of embodiment C32, wherein:
the pipetting plunger further comprises a protrusion on the third elongated body;
the pipettor further comprises a spring;
the spring is wrapped around the third elongated body and located between the bottom end of the pipetting plunger and the protrusion;
the spring is in contact with the protrusion;
the protrusion is configured to hold the spring in place; and
the spring is configured to dampen motion of the pipetting plunger.

Embodiment C34. The method of embodiment C32 or C33, wherein the bottom end of the pipetting plunger is directly connected to the top end of the slidable plunger.

Embodiment C34. The method of embodiment C32 or C33, wherein the bottom end of the pipetting plunger is indirectly connected to the top end of the slidable plunger.

Embodiment C35. The method of any one of embodiments C32-C34, wherein the cryo-storage device further comprises a button operatively connected to the top end of the pipetting plunger, wherein the button is configured so that pushing of the button causes the pipetting plunger to actuate through the elongated casing.

Embodiment D1. A method comprising:
(a) loading a portion of a cryo-storage device with a content; and
(b) after (a), cooling the content by submerging the portion of the cryo-storage device into liquid nitrogen;
wherein when, in a controlled study:
vitrification media is loaded into the cryo-storage device to generate a loaded section of the cryo-storage device;
the loaded section of the cryo-storage device is submerged in liquid nitrogen such that the liquid nitrogen does not contact the vitrification media;
the loaded section of the cryo-storage device moves in a repetitive motion while submerged in liquid nitrogen; and
the vitrification media cools with an average rate of at least about 900° C./minute as measured by a thermocouple in contact with the vitrification media.

Embodiment D2. The method of embodiment D1, wherein the cryo-storage device comprises:
(a) a capillary element comprising a first elongated body, wherein the first elongated body comprises:
(i) a bottom opening located at a bottom end of the first elongated body;
(ii) a top opening located at a top end of the first elongated body; and
(iii) a hollow portion inside the first elongated body connecting the top opening to the bottom opening, wherein the hollow portion has a diameter that is regular over a length of a region of the hollow portion;
(b) a slidable plunger comprising a top end, a bottom end and a second elongated body connecting the top end of the slidable plunger to the bottom end of the slidable plunger, wherein:
at least a portion of the slidable plunger is within the hollow portion of the capillary element;
the slidable plunger is configured to actuate through the top opening;
a diameter of the slidable plunger is regular over a length of a portion the slidable plunger; and
the diameter of the slidable plunger is no greater than the diameter of the hollow portion.

Embodiment D3. The method of embodiment D1 or D2, wherein the vitrification media cools with an average rate of at least about 1,500° C./minute.

Embodiment D4. The method of embodiment D1 or D2 wherein the vitrification media cools with an average rate of at least about 3,000° C./minute.

Embodiment D5. The method of embodiment D1 or D2 wherein the vitrification media cools with an average rate of at least about 4,500° C./minute.

Embodiment E1. A cryo-storage device, wherein when, in a controlled study:

vitrification media is loaded into the cryo-storage device to generate a loaded section of the cryo-storage device;

the loaded section of the cryo-storage device is submerged in liquid nitrogen such that the liquid nitrogen does not contact the vitrification media;

the loaded section of the cryo-storage device moves in a repetitive motion while submerged in liquid nitrogen; and the vitrification media cools with an average rate of at least about 900° C./minute as measured by a thermocouple in contact with the vitrification media.

Embodiment E2. The cryo-storage device of embodiment E1, wherein the cryo-storage device further comprises:
(a) a capillary element comprising a first elongated body, wherein the first elongated body comprises:
(i) a bottom opening located at a bottom end of the first elongated body;
(ii) a top opening located at a top end of the first elongated body; and
(iii) a hollow portion inside the first elongated body connecting the top opening to the bottom opening, wherein the hollow portion has a diameter that is regular over a length of a region of the hollow portion; and
(b) a slidable plunger comprising a top end, a bottom end, and a second elongated body connecting the top end of the slidable plunger to the bottom end of the slidable plunger,
wherein:
at least a portion of the slidable plunger is within the hollow portion of the capillary element;
the slidable plunger is configured to actuate through the top opening;
a diameter of the slidable plunger is regular over a length of a portion of the slidable plunger; and
the diameter of the slidable plunger is no greater than the diameter of the hollow portion.

Embodiment E3. The cryo-storage device of embodiment E1 or E2, wherein the vitrification media cools with an average rate of at least about 1,500° C./minute.

Embodiment E4. The cryo-storage device of embodiment E1 or E2, wherein the vitrification media cools with an average rate of at least about 3,000° C./minute.

Embodiment E5. The cryo-storage device of embodiment E1 or E2, wherein the vitrification media cools with an average rate of at least about 4,500° C./minute.

Embodiment F1. A kit comprising:
the cryo-storage device of any one of claims 103-107;
a vessel containing a content, wherein the content comprises a volume of media and a cell;
a liquid nitrogen bath.

Embodiment F2. The kit of embodiment F1, further comprising a heat sealer.

Embodiment G1. A cryo-storage device for oocytes and embryos during cryopreservation, comprising: (a) an elongated handle, (b) a capillary element in a first end of the elongated handle, determining a volume to be loaded with the oocytes and/or embryos, along with air and/or media and/or cells, and (c) a slidable plunger fitting inside the capillary element.

Embodiment G2. The device, according to embodiment G1, wherein the slidable plunger has an external perimeter, the capillary element has an inside perimeter/diameter, and the external perimeter of the slidable plunger fits into the inside perimeter/diameter of the capillary element.

Embodiment G3. The device, according to embodiment G1 or G2, comprising a displacement mechanism for moving the slidable plunger along the capillary element.

Embodiment G4. The device, according to embodiment G3, wherein the displacement mechanism is a sliding clip with a grip for holding the slidable plunger, and wherein the sliding clip is movable along the elongated handle.

Embodiment G5. The device, according to embodiment G3, wherein the displacement mechanism is a latch mechanism comprising a button connected to the slidable plunger and a spring placed between the button and a support inside the elongated handle.

Embodiment G6. The device, according to embodiment G5, wherein the slidable plunger is connected to the button through an elongated element with a grip holding the slidable plunger.

Embodiment G7. The device, according to any one of embodiments G3-G6, wherein the displacement mechanism is integrated mechanically with the plunger and moveable along the elongated handle.

Embodiment G8. The device, according to any one of embodiments G1-G7, wherein the elongated handle contains a slidable sheath/cover to move over the capillary element.

Embodiment G9. The device, according to any one of embodiments G1-G8, wherein the elongated handle comprises an exterior surface, and the exterior surface has at least one area for including printed information.

Embodiment G10. The device, according to embodiment G5, wherein the capillary element is of plastic that is suitable for heat sealing.

Embodiment G11. The device, according to any of embodiments G1-G10, comprising a sheath or cover fitted to the end of the device for sealing the capillary element and contents of the capillary element from external liquids.

What is claimed is:

1. A cryo-storage device comprising:
(a) a capillary element comprising a first elongated body, wherein the first elongated body comprises:
(i) a bottom opening located at a bottom end of the first elongated body;
(ii) a top opening located at a top end of the first elongated body; and
(iii) a hollow portion inside the first elongated body connecting the top opening to the bottom opening, wherein the hollow portion has a diameter that is regular over a length of a region of the hollow portion;
(b) a slidable plunger comprising a top end, a bottom end, and a second elongated body connecting the top end of the slidable plunger to the bottom end of the slidable plunger, wherein:
at least a portion of the slidable plunger is within the hollow portion of the capillary element;
the slidable plunger is configured to actuate through the top opening;
a diameter of the slidable plunger is regular over a length of a portion of the slidable plunger; and
the diameter of the slidable plunger is no greater than the diameter of the hollow portion of the capillary element; and
(c) a content comprising:
(i) a cell; and
(ii) a volume of media;
wherein:
the content is within a section of the hollow portion of the capillary element located between the bottom opening and the bottom end of the slidable plunger;

the volume of media, which when contained in the section of the hollow portion of the capillary element, cools at an average rate of at least about 200° C./minute upon submersion of the section of the hollow portion of the capillary element into a coolant; and (d) a pipettor comprising:
   (I) an elongated casing comprising a top end and a bottom end, wherein the top end of the first elongated body and the top end of the slidable plunger are contained within the bottom end of the elongated casing;
   (II) a clamping mechanism, wherein the clamping mechanism is clamped onto a tab that connects the capillary element to the bottom end of the elongated casing;
   (III) a pipetting plunger comprising a top end, a bottom end, and a third elongated body connecting the top end of the pipetting plunger and the bottom end of the pipetting plunger; and
   (IV) an actuation element connecting the pipetting plunger to the elongated casing and configured to actuate the pipetting plunger;

wherein:
   the bottom end of the pipetting plunger is within the elongated casing;
   the top end of the pipetting plunger is outside the elongated casing; and
   the pipetting plunger is configured so that actuation of the pipetting plunger controls movement of the slidable plunger.

2. The cryo-storage device of claim 1, further comprising a seal that seals the slidable plunger to the hollow portion of the capillary element.

3. The cryo-storage device of claim 2, wherein the seal is formed by a fit of the slidable plunger into the hollow portion of the capillary element.

4. The cryo-storage device of claim 1, wherein a closed system is formed upon sealing of a second section of the hollow portion of the capillary element, wherein the content is located between the second section of the hollow portion of the capillary element and the bottom end of the slidable plunger.

5. The cryo-storage device of claim 1, wherein the hollow portion of the capillary element is about cylindrical.

6. The cryo-storage device of claim 1, wherein the slidable plunger is about cylindrical.

7. The cryo-storage device of claim 1, wherein the capillary element is rigid.

8. The cryo-storage device of claim 1, wherein, when the content is vitrified, the volume of media, when contained within the section of the hollow portion of the capillary element, warms at an average rate of at least about 10,000° C./minute upon submersion of the section of the hollow portion of the capillary element into a liquid with a temperature of at least about 30° C.

9. The cryo-storage device of claim 8, wherein the liquid has a temperature of about 37° C.

10. The cryo-storage device of claim 1, wherein the capillary element has a thermal conductivity of at least about 0.05 W/m·K.

11. The cryo-storage device of claim 1, further comprising a cover comprising an outer structure and an inner void, wherein at least a portion of the first elongated body is within the inner void of the cover.

12. The cryo-storage device of claim 1, wherein the capillary element has a cross-sectional area that is about constant across a length of the capillary element, wherein the length of the capillary element is a region between the bottom end of the first elongated body to the top end of the first elongated body.

13. The cryo-storage device of claim 1, wherein the content has a volume of about 0.2 µL to about 5 µL.

14. The cryo-storage device of claim 1, further comprising a displacement mechanism attached to the elongated casing, wherein the displacement mechanism is configured so that actuation of the displacement mechanism controls movement of the slidable plunger.

15. The cryo-storage device of claim 1, wherein the top end of the slidable plunger is bent at an angle of about 15 degrees to about 100 degrees to form a bent end.

16. The cryo-storage device of claim 1, wherein the top end of the slidable plunger is bent at an angle of about 90 degrees to form the bent end.

17. The cryo-storage device of claim 1, wherein:
   the pipetting plunger further comprises a protrusion on the third elongated body;
   the pipettor further comprises a spring;
   the spring is wrapped around the third elongated body and located between the bottom end of the pipetting plunger and the protrusion;
   the spring is in contact with the protrusion;
   the protrusion is configured to hold the spring in place; and
   the spring is configured to dampen motion of the pipetting plunger.

18. The cryo-storage device of claim 1, further comprising a button operatively connected to the top end of the pipetting plunger, wherein the button is configured so that pushing of the button causes the pipetting plunger to actuate through the elongated casing.

19. The cryo-storage device of claim 1, wherein the bottom end of the pipetting plunger is directly connected to the top end of the slidable plunger.

20. The cryo-storage device of claim 1, wherein the bottom end of the pipetting plunger is indirectly connected to the top end of the slidable plunger.

* * * * *